United States Patent
Seger, Jr. et al.

(10) Patent No.: US 11,221,980 B2
(45) Date of Patent: Jan. 11, 2022

(54) LOW VOLTAGE DRIVE CIRCUIT OPERABLE TO CONVEY DATA VIA A BUS

(71) Applicant: SIGMASENSE, LLC., Wilmington, DE (US)

(72) Inventors: Richard Stuart Seger, Jr., Belton, TX (US); Daniel Keith Van Ostrand, Leander, TX (US); Gerald Dale Morrison, Redmond, WA (US); Timothy W. Markison, Mesa, AZ (US)

(73) Assignee: SIGMASENSE, LLC., Wilmington, DE (US)

( * ) Notice: Subject to any disclaimer, the term of this patent is extended or adjusted under 35 U.S.C. 154(b) by 0 days.

(21) Appl. No.: 16/670,370

(22) Filed: Oct. 31, 2019

(65) Prior Publication Data

US 2021/0133133 A1    May 6, 2021

(51) Int. Cl.
*G06F 13/36* (2006.01)
(52) U.S. Cl.
CPC .......... *G06F 13/36* (2013.01); *G06F 2213/40* (2013.01)
(58) Field of Classification Search
CPC ... G06F 13/36; G06F 2213/40; G06F 13/4063
USPC ......................................................... 710/305
See application file for complete search history.

(56) References Cited

U.S. PATENT DOCUMENTS

| | | | | | |
|---|---|---|---|---|---|
| 2,721,897 | A | * | 10/1955 | Schneckloth | H04J 1/14 370/485 |
| 2,877,290 | A | * | 3/1959 | Le Blan | H04N 9/00 348/385.1 |
| 3,289,083 | A | * | 11/1966 | Barr | H04L 27/26 375/275 |
| 3,422,431 | A | * | 1/1969 | Hafner | G01S 13/04 342/27 |

(Continued)

FOREIGN PATENT DOCUMENTS

KR    102032325 B1    10/2019

OTHER PUBLICATIONS

Basic Radio Awareness Modulation and radio Building blocks How does modulation work? Jul. 1, 2018 (Year: 2018).*

(Continued)

*Primary Examiner* — Paul R. Myers
(74) *Attorney, Agent, or Firm* — Garlick & Markison

(57) ABSTRACT

A low voltage drive circuit (LVDC) operable to convey data via a bus and includes a signal generator operable to convert transmit digital data into analog outbound data. The LVDC also includes an analog to digital output circuit operable to convert analog inbound data into received digital data. The LVDC further includes a drive circuit operable to convert the analog outbound data into an analog transmit signal and drive the analog transmit signal on to the bus, where the analog outbound data is represented within the analog transmit signal as variances in loading of the bus at a first frequency. The LVDC further includes a sense circuit oper- (Continued)

able to receive an analog receive signal from the bus and convert the analog receive signal into the analog inbound data, where the analog inbound data is represented within the analog receive signal as variances in loading of the bus at a second frequency.

17 Claims, 36 Drawing Sheets

(56) References Cited

U.S. PATENT DOCUMENTS

| | | | | |
|---|---|---|---|---|
| 3,715,496 | A * | 2/1973 | Jones, Jr. | H04L 5/143 370/295 |
| 4,021,737 | A * | 5/1977 | Trask | H04B 5/00 455/41.2 |
| 4,190,802 | A * | 2/1980 | Levine | H04L 27/2337 329/306 |
| 4,193,055 | A * | 3/1980 | Barnum | G01S 7/529 342/28 |
| 4,233,565 | A * | 11/1980 | Chmura | H04L 27/2275 329/310 |
| 4,435,824 | A * | 3/1984 | Dellande | H04L 27/2014 375/273 |
| 4,980,687 | A * | 12/1990 | Newell | H03D 5/00 329/323 |
| 5,051,981 | A * | 9/1991 | Kline | H03H 17/0294 370/290 |
| 5,200,930 | A * | 4/1993 | Rouquette | G01V 1/22 367/76 |
| 5,575,242 | A * | 11/1996 | Davis | A01K 15/023 119/721 |
| 5,650,777 | A * | 7/1997 | Westfield | G05B 19/0423 340/870.11 |
| 5,811,897 | A * | 9/1998 | Spaude | B60R 25/2027 307/149 |
| 5,959,365 | A * | 9/1999 | Mantini | B60C 23/0408 180/197 |
| 6,038,251 | A * | 3/2000 | Chen | H04L 27/0008 375/222 |
| 6,097,338 | A * | 8/2000 | Rupprecht | G01S 1/18 342/412 |
| 6,218,972 | B1 | 4/2001 | Groshong | |
| 6,487,614 | B2 * | 11/2002 | Nobutani | G09G 5/006 345/10 |
| 6,665,013 | B1 | 12/2003 | Fossum et al. | |
| 6,804,262 | B1 * | 10/2004 | Vogel | H04L 12/2801 348/E17.001 |
| 7,333,781 | B1 * | 2/2008 | Stockstad | H03F 1/0205 330/129 |
| 7,528,629 | B2 * | 5/2009 | Farjadrad | H04L 25/028 326/86 |
| 7,528,755 | B2 | 5/2009 | Hammerschmidt | |
| 8,031,094 | B2 | 10/2011 | Hotelling | |
| 8,089,289 | B1 | 1/2012 | Kremin et al. | |
| 8,120,507 | B2 * | 2/2012 | Rouquette | H04B 3/36 340/850 |
| 8,279,180 | B2 | 10/2012 | Hotelling et al. | |
| 8,547,114 | B2 | 10/2013 | Kremin | |
| 8,625,726 | B2 | 1/2014 | Kuan | |
| 9,201,547 | B2 | 12/2015 | Elias | |
| 9,203,665 | B1 * | 12/2015 | Haran | H04L 25/40 |
| 9,686,609 | B1 | 6/2017 | O'Connor et al. | |
| 9,887,863 | B2 * | 2/2018 | Chen | H04L 27/0002 |
| 2004/0120405 | A1 * | 6/2004 | Jaussi | H04L 25/0292 375/257 |
| 2004/0192229 | A1 * | 9/2004 | Morris | H04B 1/0483 455/91 |
| 2006/0017607 | A1 * | 1/2006 | Hayata | G01S 7/282 342/41 |
| 2007/0177679 | A1 * | 8/2007 | Sovenyi | H04L 12/407 375/257 |
| 2008/0036636 | A1 | 2/2008 | Khorram | |
| 2009/0237284 | A1 * | 9/2009 | Rheinfelder | H03M 7/3042 341/143 |
| 2010/0057970 | A1 * | 3/2010 | Kashi | H04W 52/0283 710/305 |
| 2010/0211921 | A1 | 8/2010 | Hu et al. | |
| 2011/0037863 | A1 * | 2/2011 | Mihota | H02J 50/12 348/208.99 |
| 2013/0278447 | A1 | 10/2013 | Kremin | |
| 2014/0365702 | A1 * | 12/2014 | Ray | G06F 13/4068 710/305 |
| 2016/0188049 | A1 | 6/2016 | Yang et al. | |
| 2019/0165803 | A1 * | 5/2019 | Aboushady | H03M 3/424 |
| 2019/0171331 | A1 | 6/2019 | Gray et al. | |

OTHER PUBLICATIONS

Baker; How delta-sigma ADCs work, Part 1; Analog Applications Journal; Oct. 1, 2011; 6 pgs.

Brian Pisani, "Digital Filter Types in Delta-Sigma ADCs", Application Report SBAA230, May 2017, pp. 1-8, Texas Instruments Incorporated, Dallas, Texas.

International Searching Authority; International Search Report and Written Opinion; International Application No. PCT/US2020/058353; dated Mar. 5, 2021; 7 pgs.

* cited by examiner data communication system 10 data communication system 10 computing device 12 wireless computing device 14

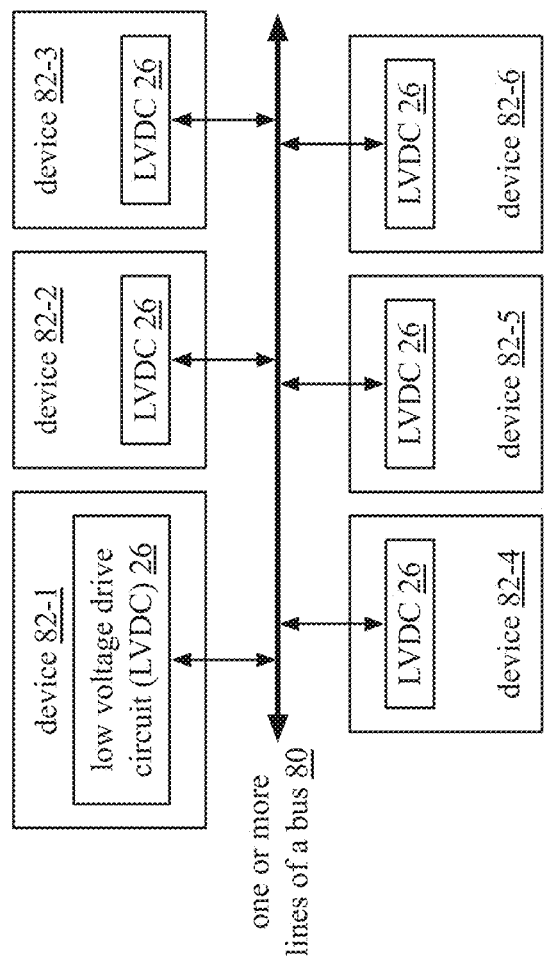

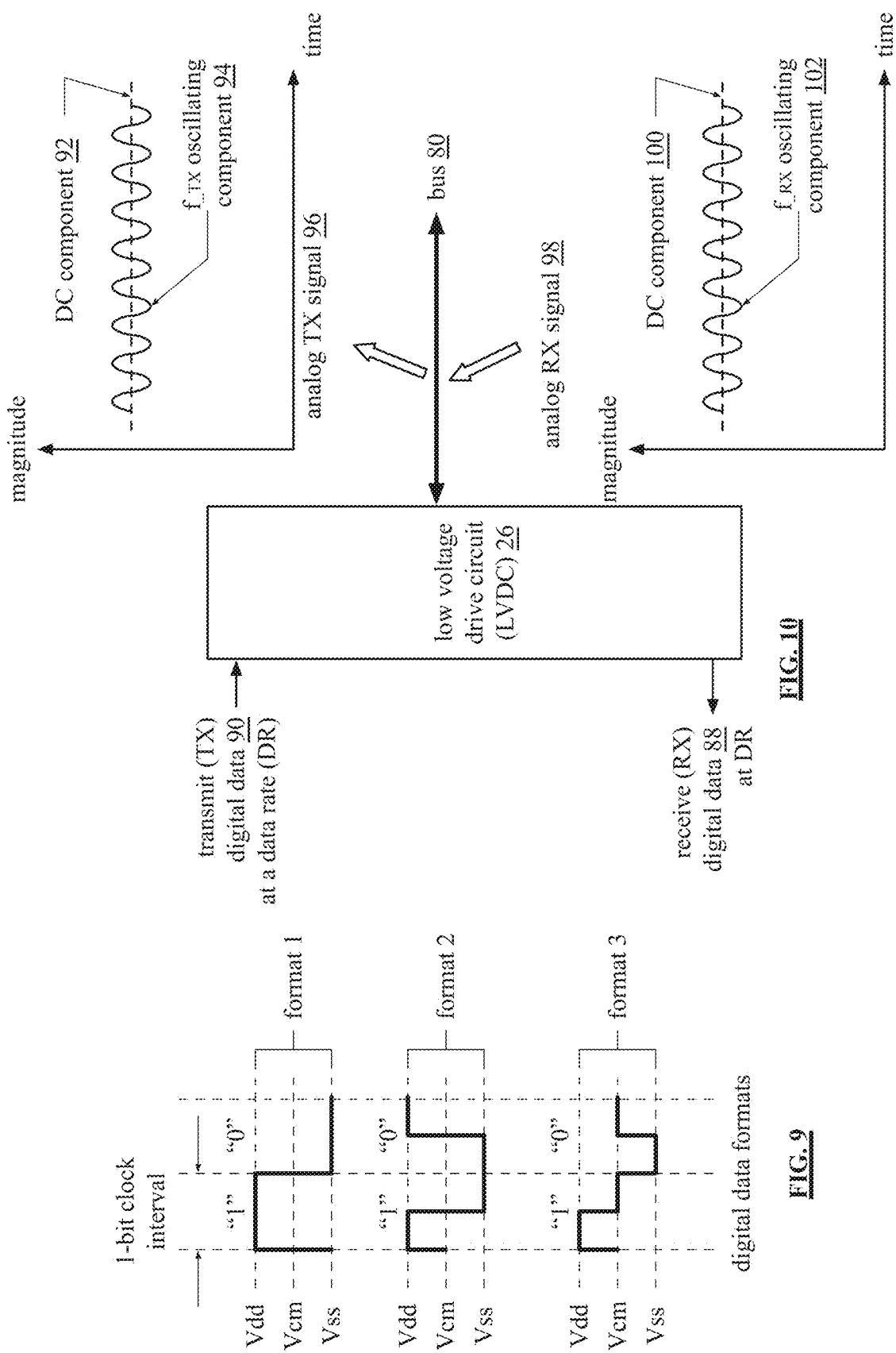

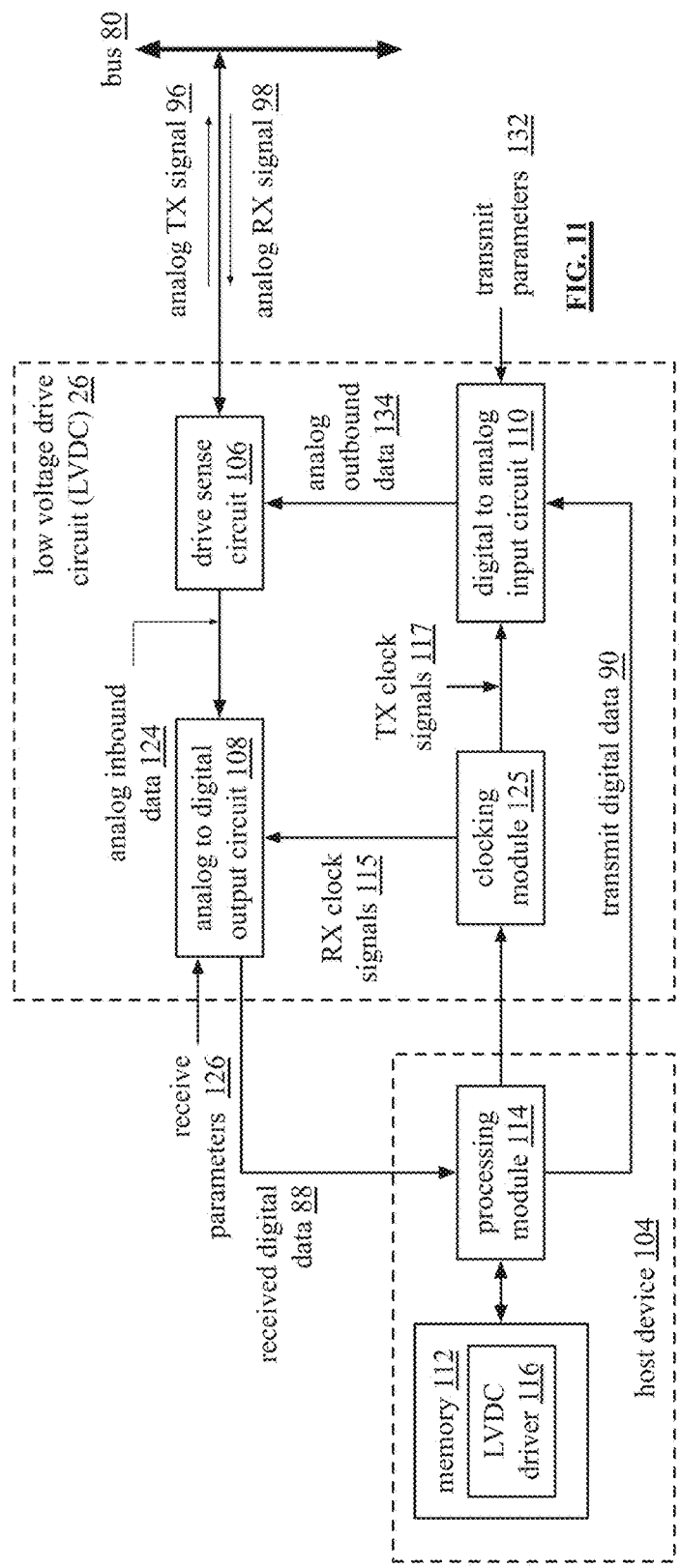
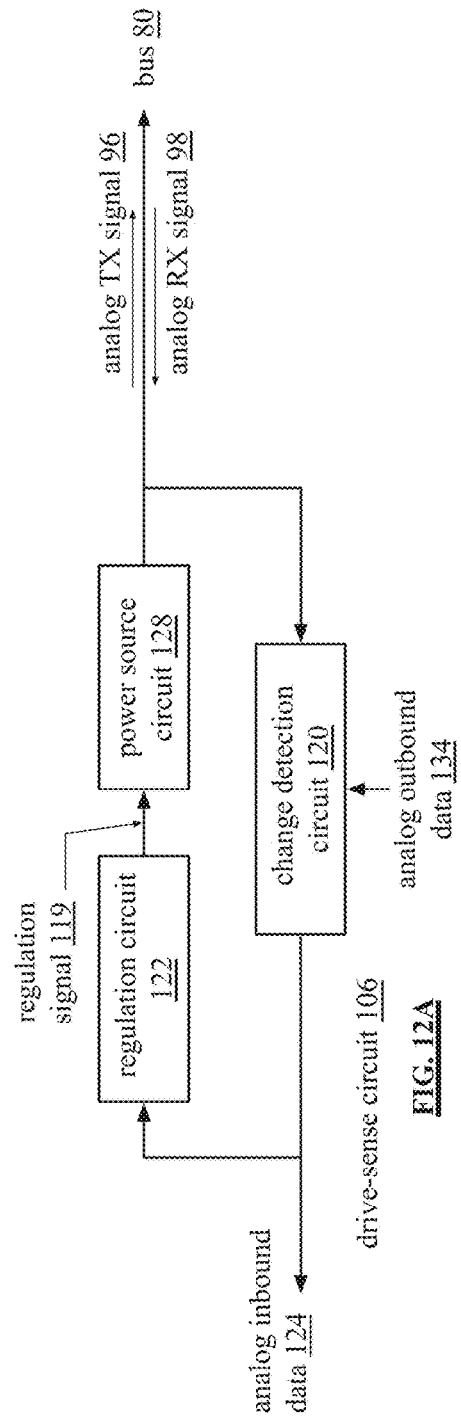
FIG. 11
FIG. 12A

LVDC 26

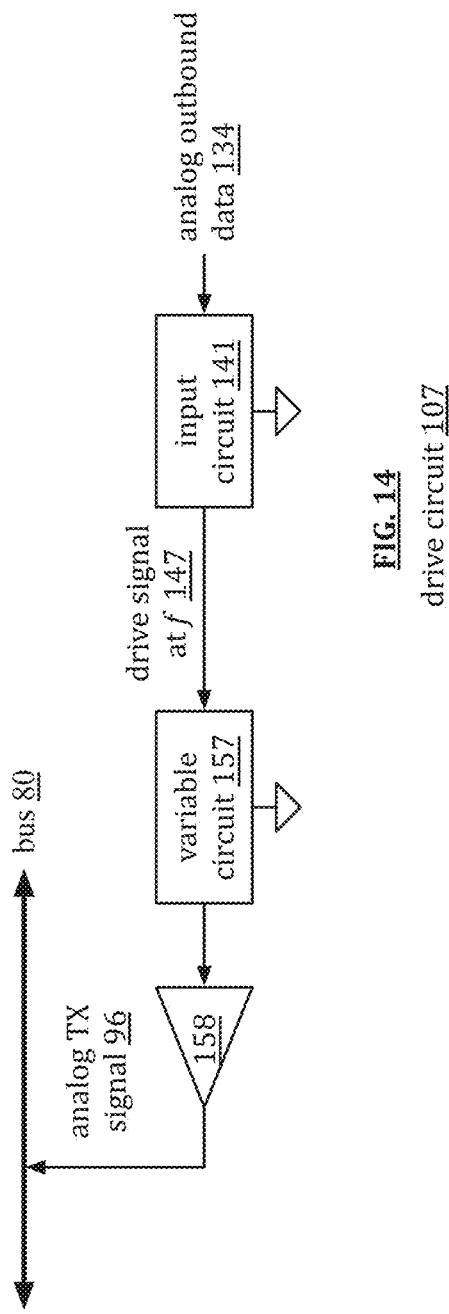
FIG. 14
drive circuit 107
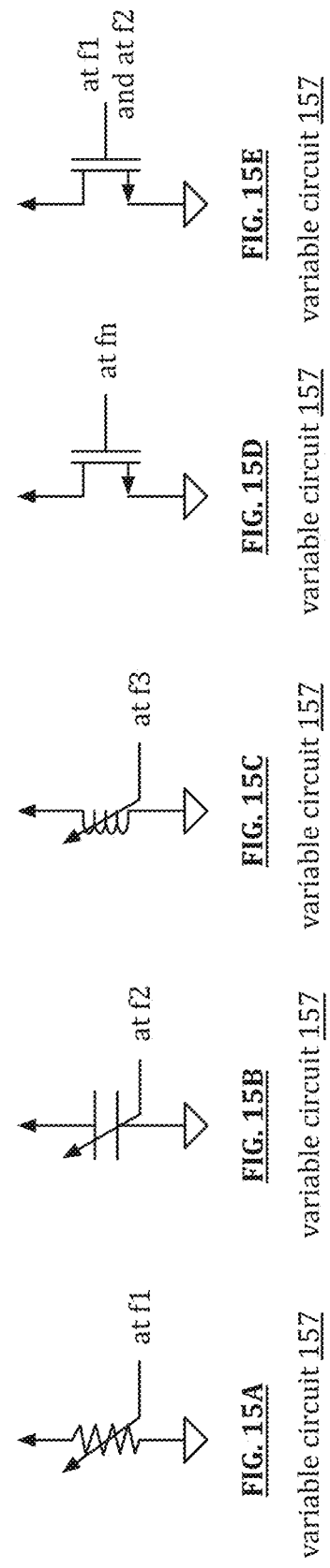
FIG. 15E
variable circuit 157
FIG. 15D
variable circuit 157
FIG. 15C
variable circuit 157
FIG. 15B
variable circuit 157
FIG. 15A
variable circuit 157 drive sense circuit 106 signal generator 182

TX buffer 182

TX buffer 182

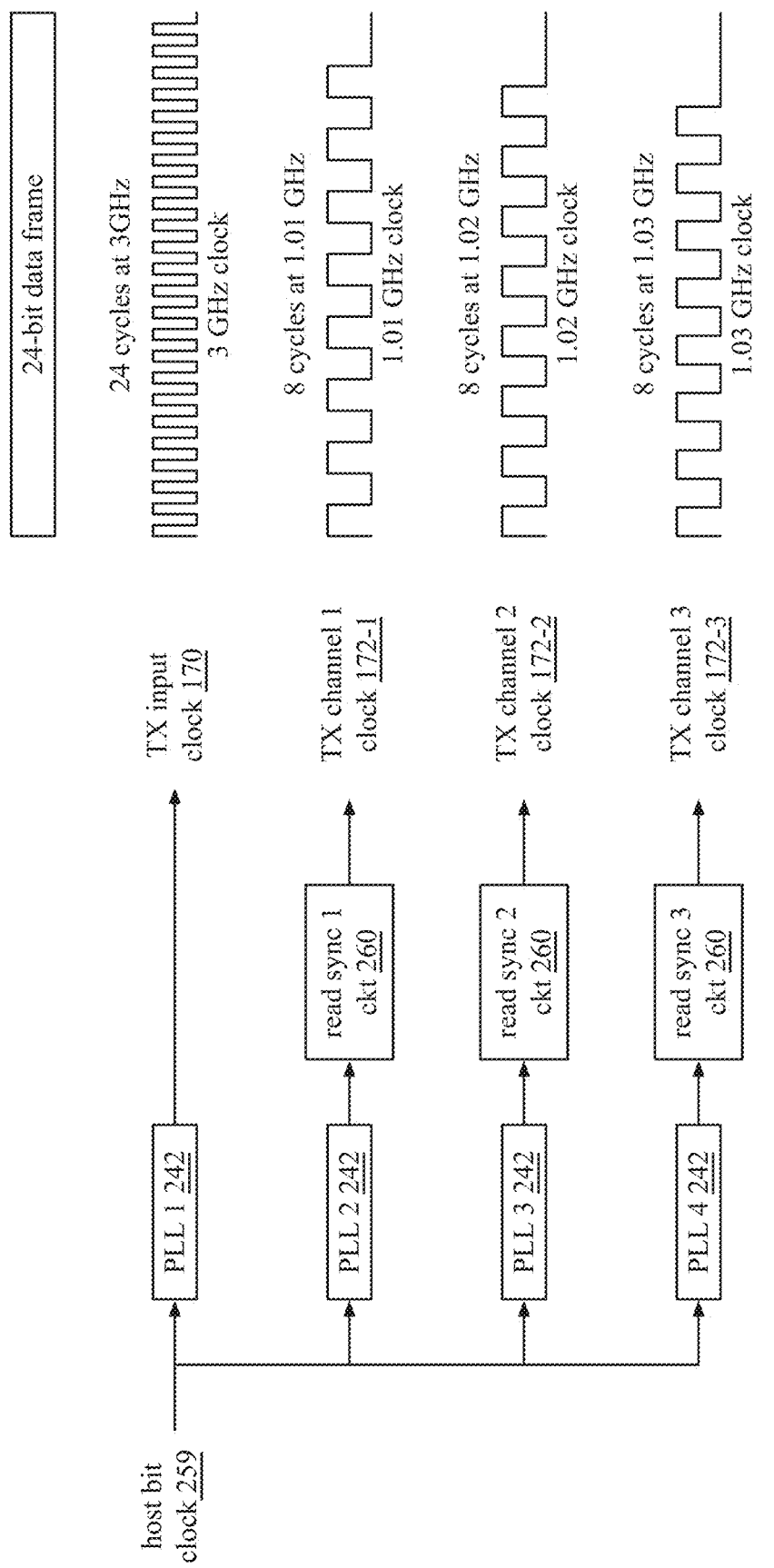

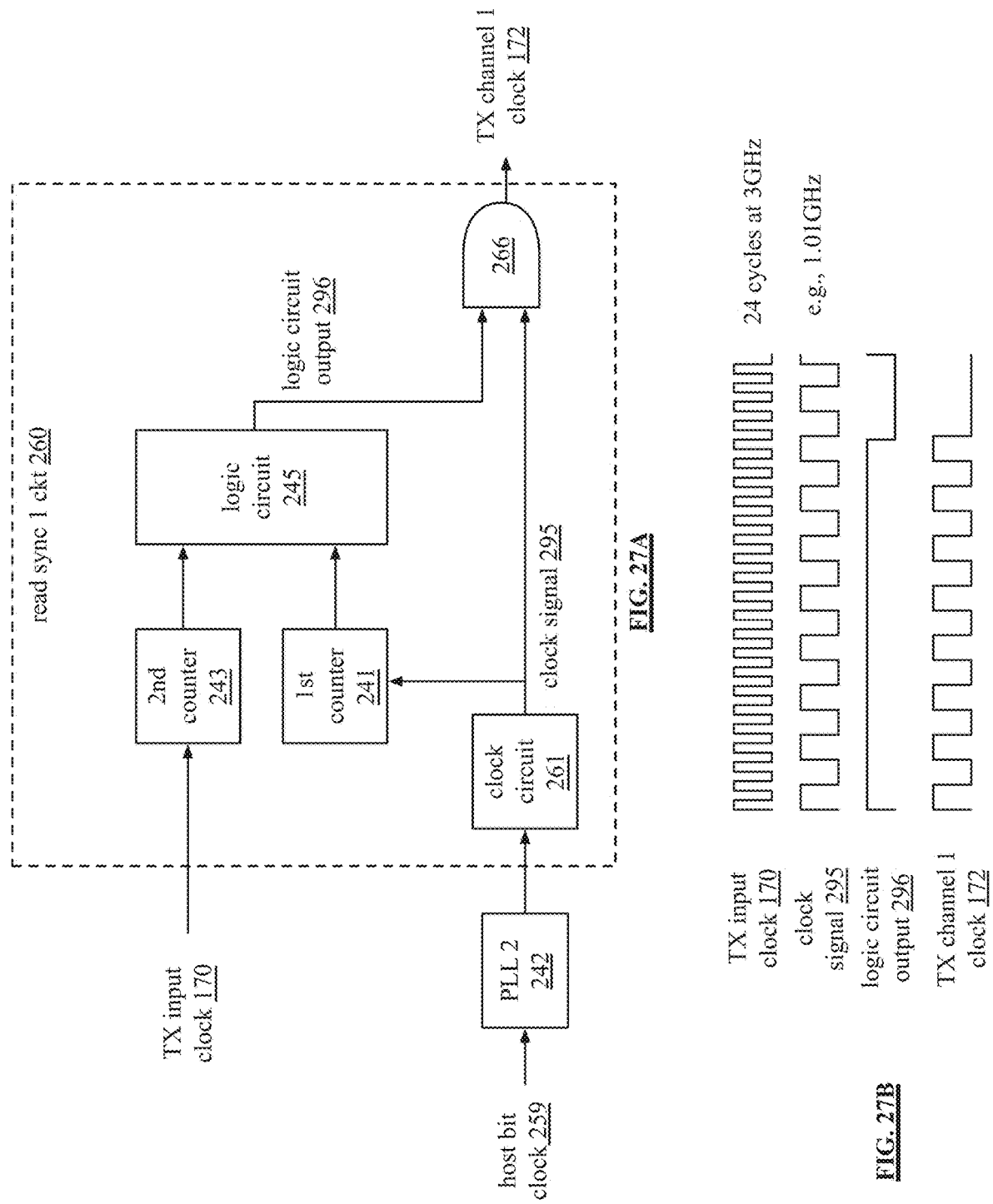

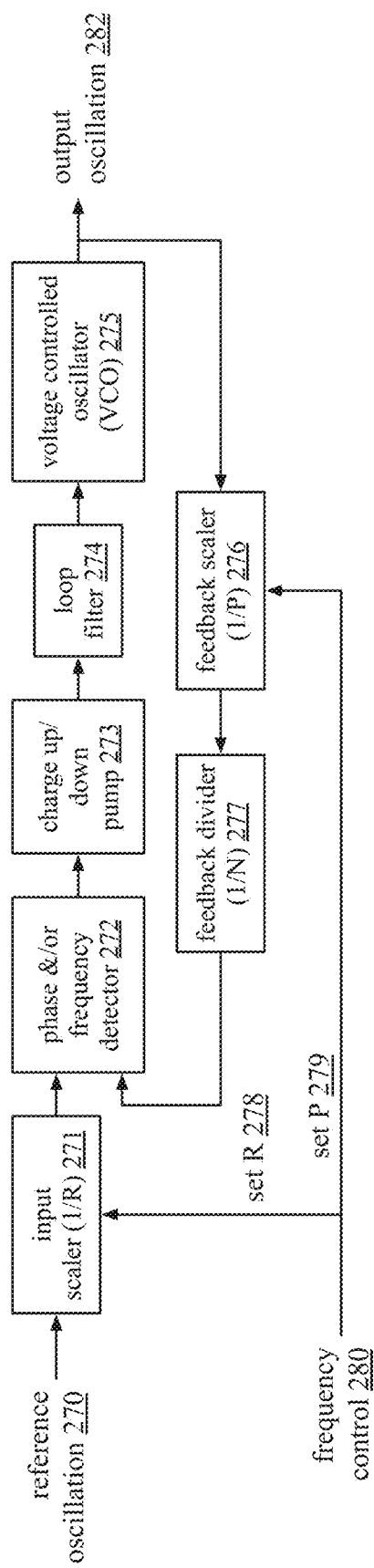
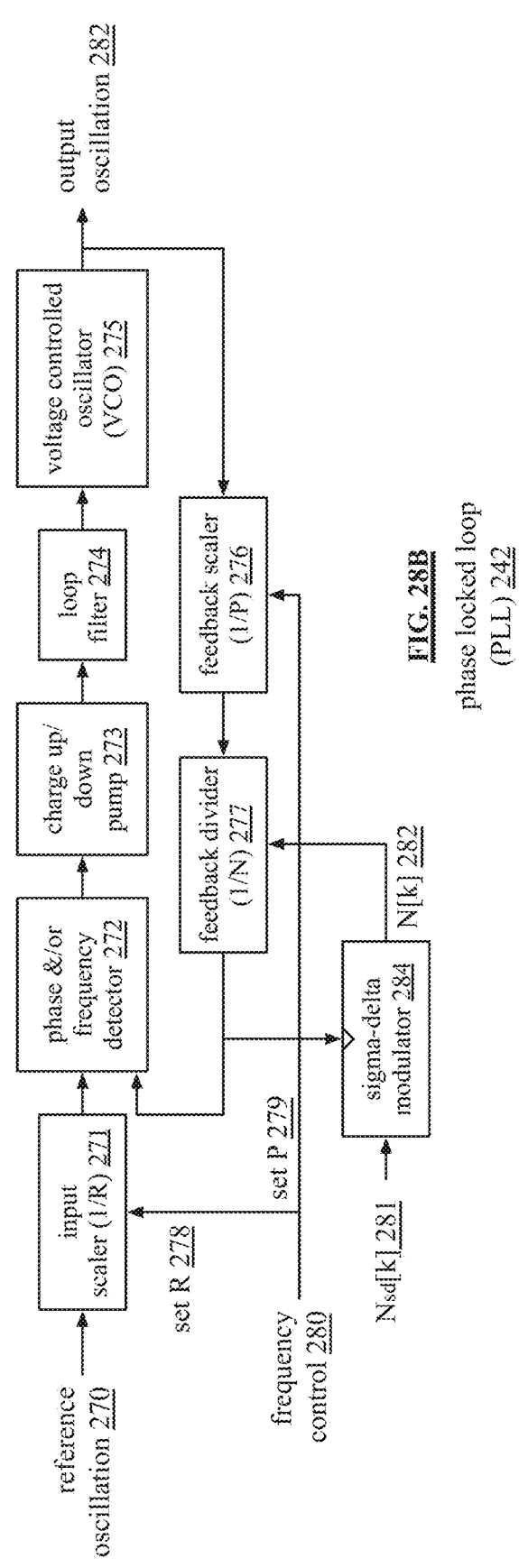

RX clocking module 125-2

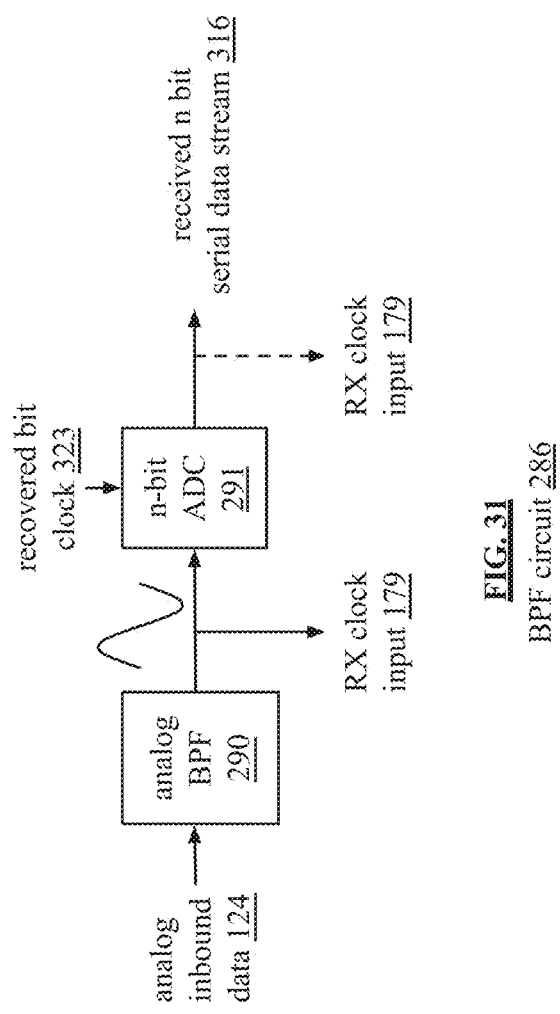

RX input clocking module 125-4 data detection ckt 320

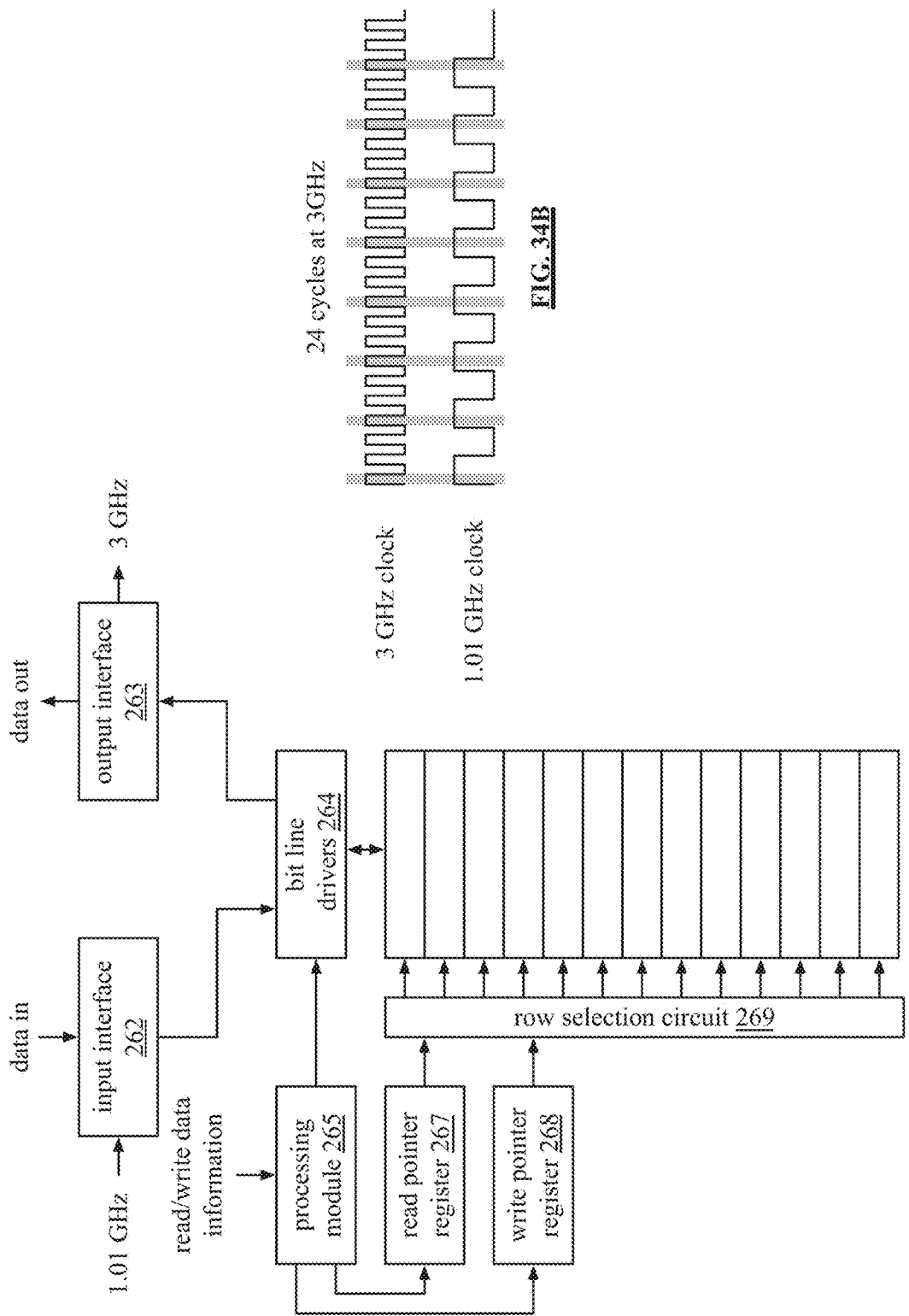

LOW VOLTAGE DRIVE CIRCUIT OPERABLE TO CONVEY DATA VIA A BUS

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to data communication systems and more particularly to sending and receiving data via a common bus.

Description of Related Art

Data communication involves sending data from one device to another device via a communication medium (e.g., a wire, a trace, a twisted pair, a coaxial cable, air, etc.). The devices range from dies within an integrated circuit (IC), to ICs on a printed circuit board (PCB), to PCBs within a computer, to computers, to networks of computers, and so on.

Data is communicated via a wired and/or a wireless connection and is done so in accordance with a data communication protocol. Data communication protocols dictate how the data is to be formatted, encoded/decoded, transmitted, and received. For example, a wireless data communication protocol such as IEEE 802.11 dictates how wireless communications are to be done via a wireless local area network. As another example, Sony/Philips Digital Interface Format (SPDIF) dictates how digital audio signals are transmitted and received. As yet another example, Inter-Integrated Circuit ($I^2C$) is a two-wire serial protocol to connect devices such as microcontrollers, digital to analog converters, analog to digital converters, peripheral devices to a computer, and so on.

In addition, data communication protocols dictate how transmission errors are to be handled. For example, wireless communications often experience data errors, so the protocol dictates a form of forward error correction (e.g., Reed Solomon encoding, Turbo encoded, etc.) be used. As another example, wired communications typically experience much less data errors than wireless communications so the protocol often dictates a form of feedback error correction (e.g., resend request, etc.) be used.

For some data communications, digital data is modulated with an analog carrier signal and transmitted/received via a modulated radio frequency (RF) signal. For other data communications, the digital data is transmitted "as is" via a wire or metal trace on a PCB. Regardless of the data communication protocol within many typical prior art communication systems, digital data is in binary form where a logic "1" value is represented by a voltage that is at least 90% of one rail voltage (e.g., positive) and a logic "0" is represented by a second voltage that is at most 10% of another rail voltage (e.g., negative), or vice versa.

BRIEF DESCRIPTION OF THE SEVERAL VIEWS OF THE DRAWING(S)

FIG. 7 is a schematic block diagram of another embodiment of a data communication system in accordance with the present invention;

FIG. 9 is a schematic block diagram of examples of digital data formats;

FIG. 10 is a functional diagram of an embodiment of an LVDC in accordance with the present invention;

FIG. 11 is a schematic block diagram of an embodiment of a Low Voltage Drive Circuit (LVDC) in accordance with the present invention;

FIG. 12A is a schematic block diagram of an embodiment of a drive sense circuit in accordance with the present invention;

FIG. 14 is a schematic block diagram of an embodiment of a drive circuit in accordance with the present invention;

Figure 16:
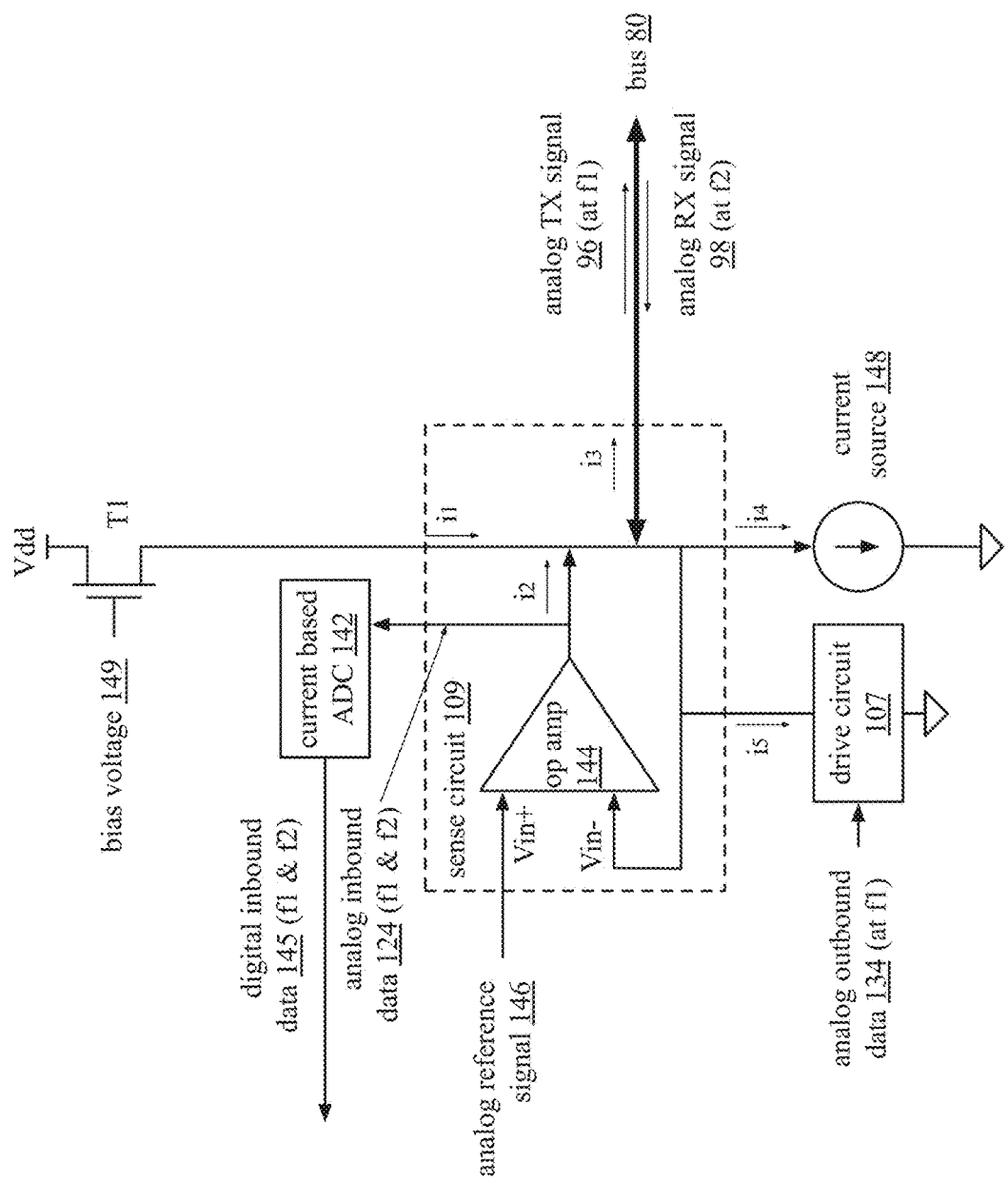
Figure 17:
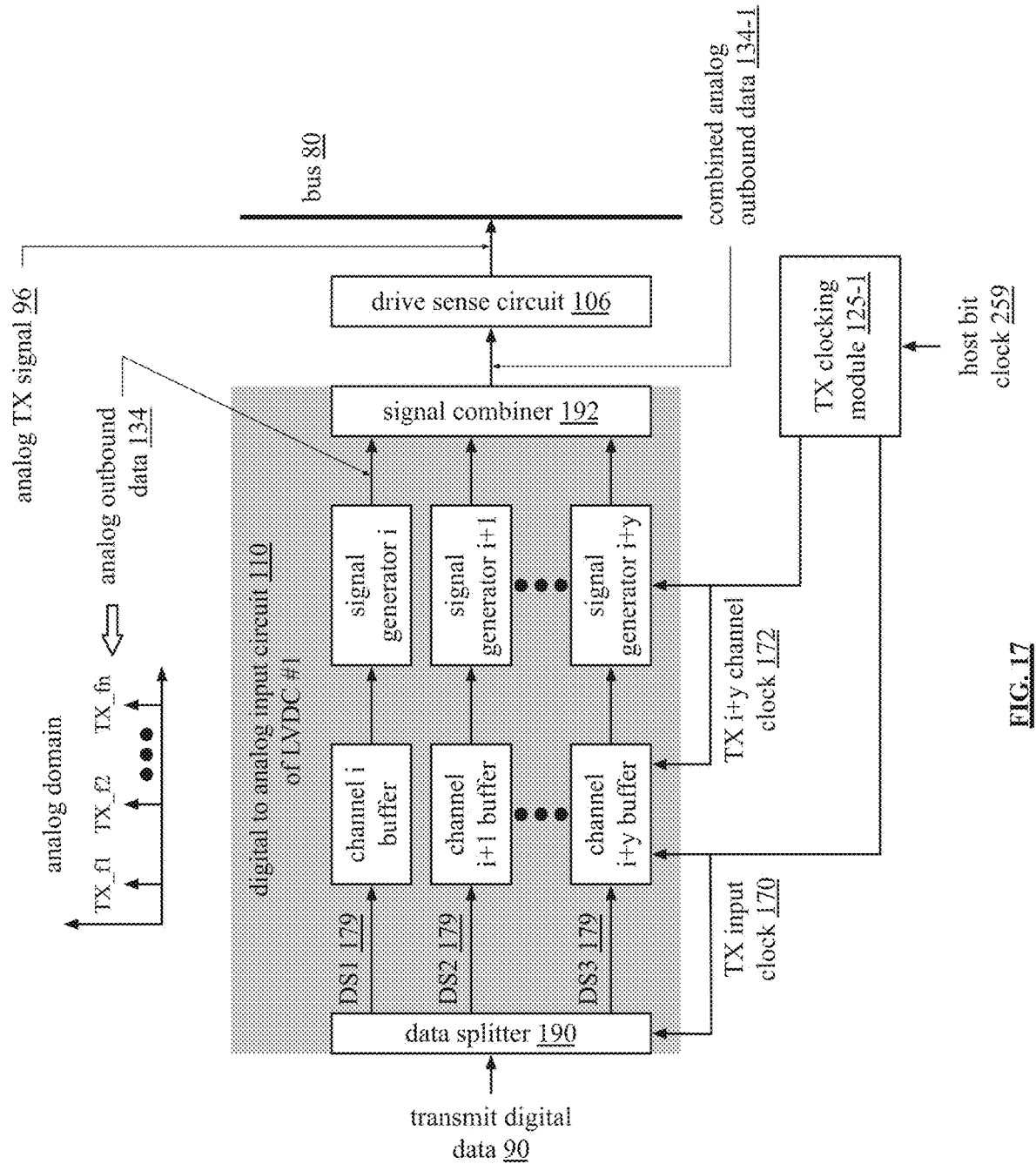
Figure 18:
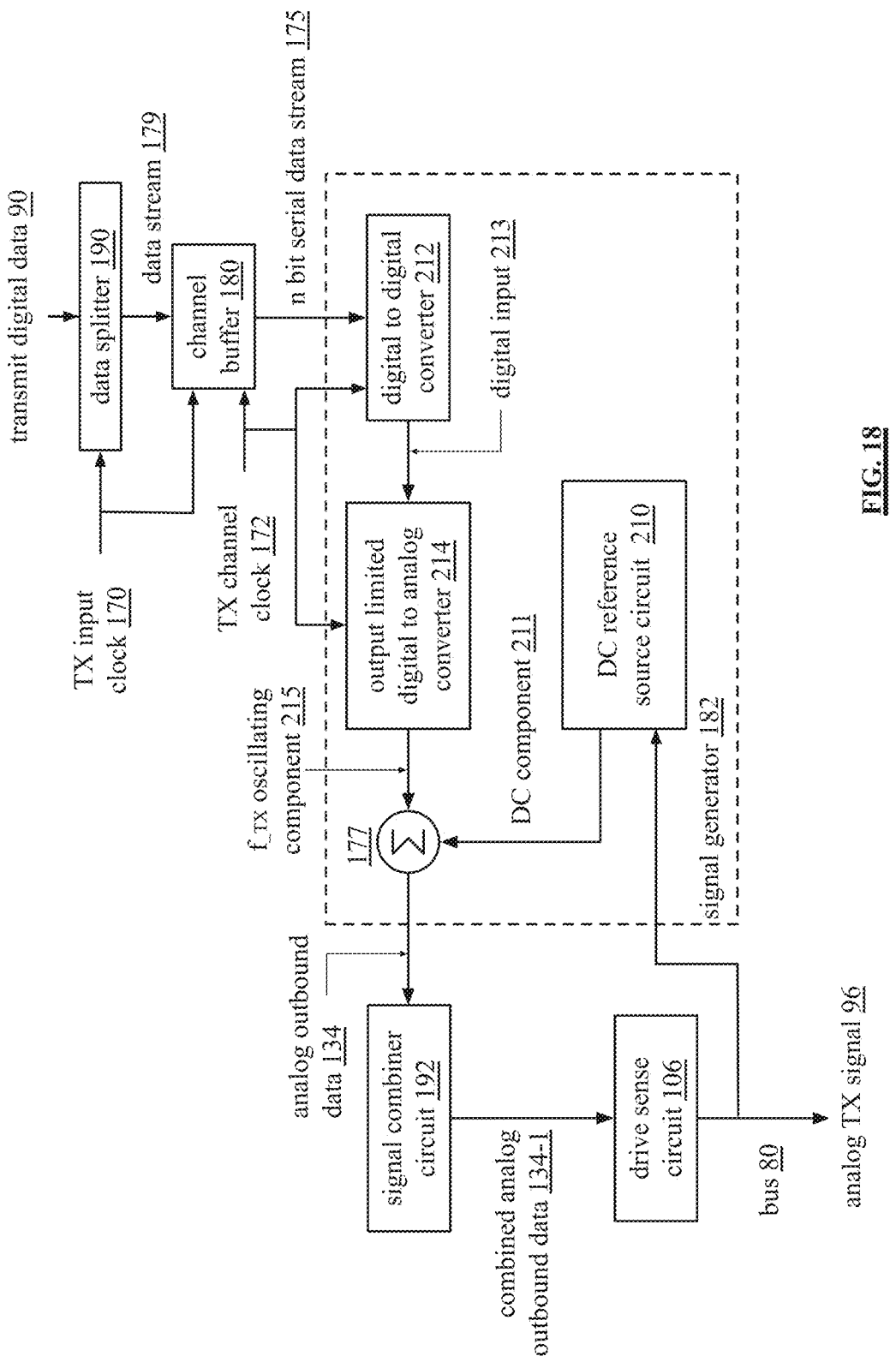
Figure 19:
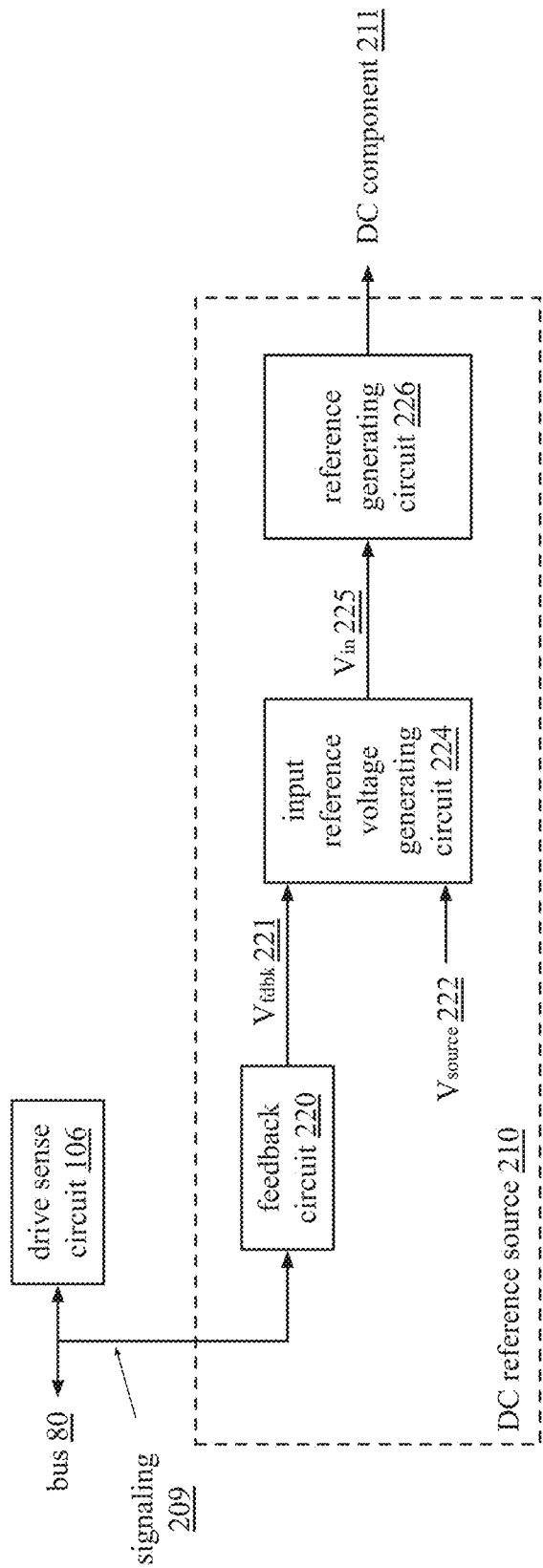
Figure 20:
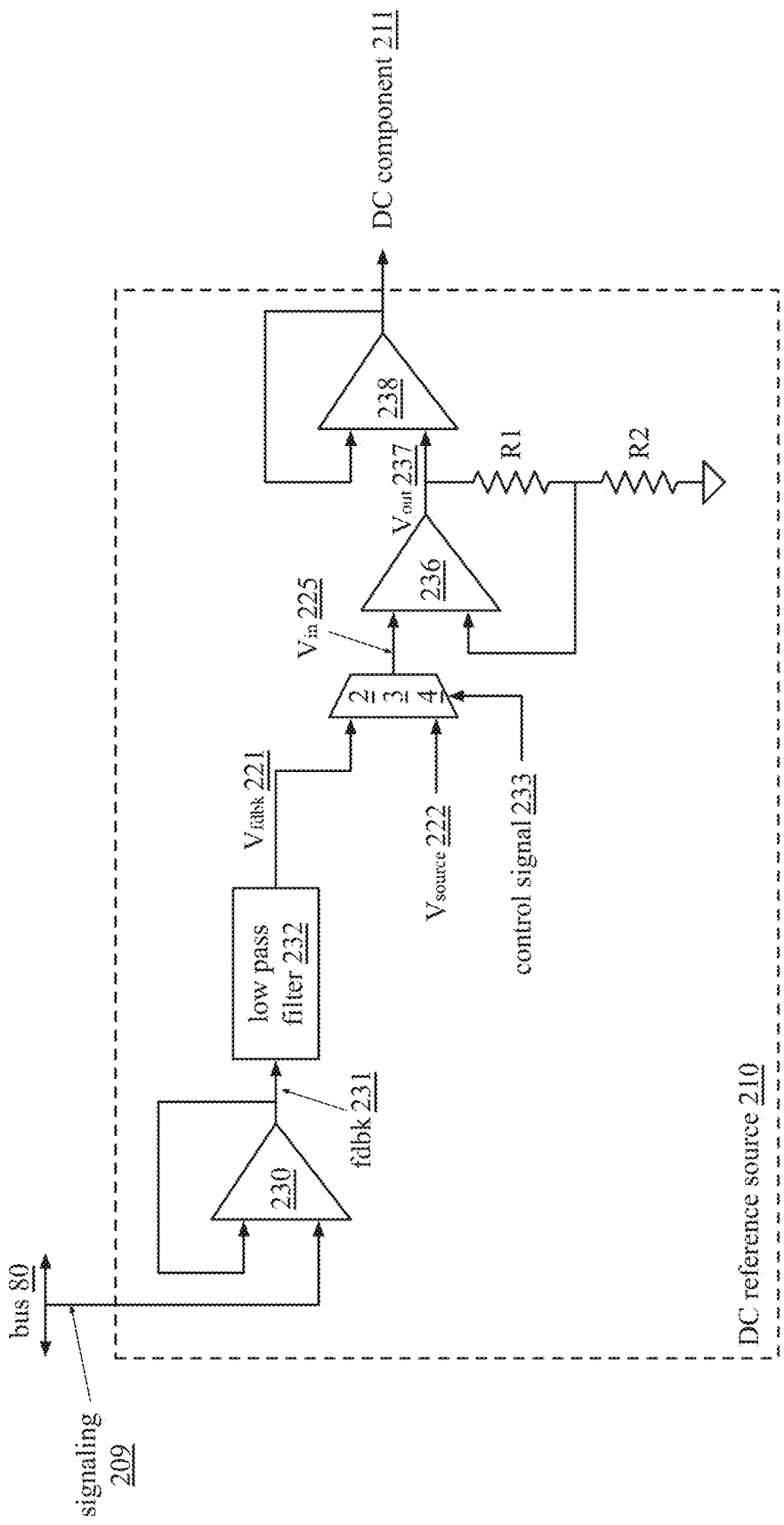
Figure 21:
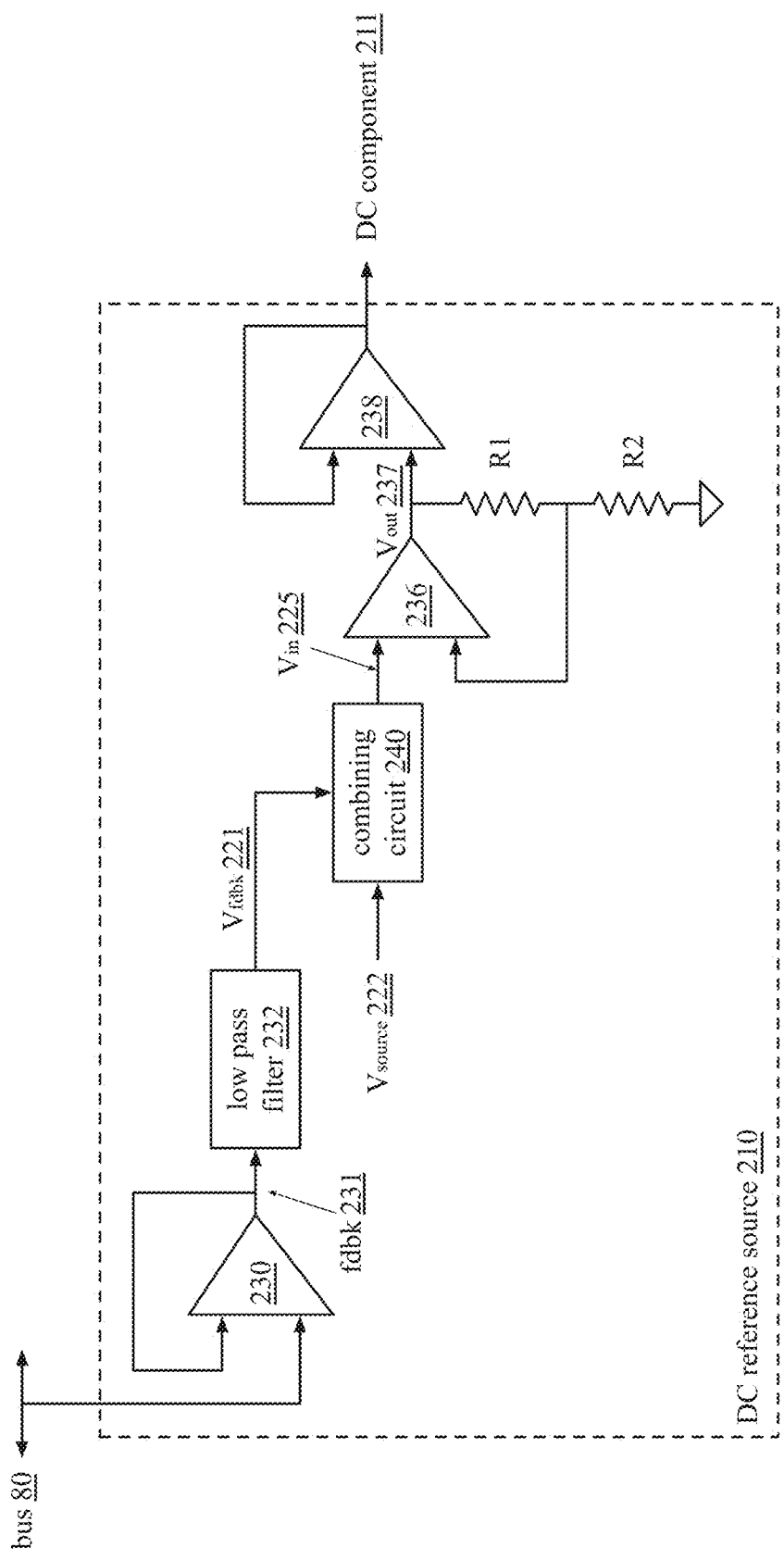
Figure 22:
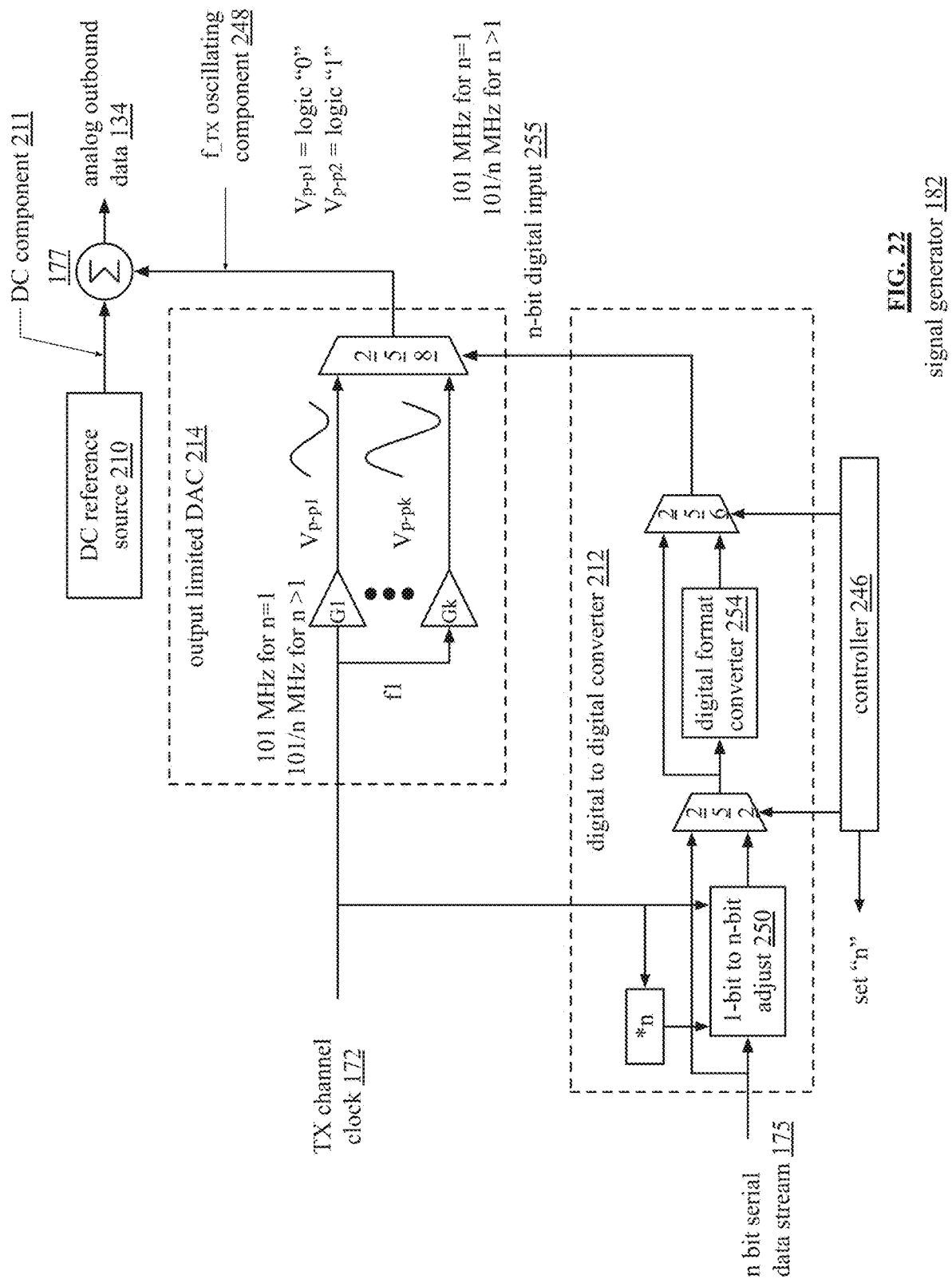
Figure 23:
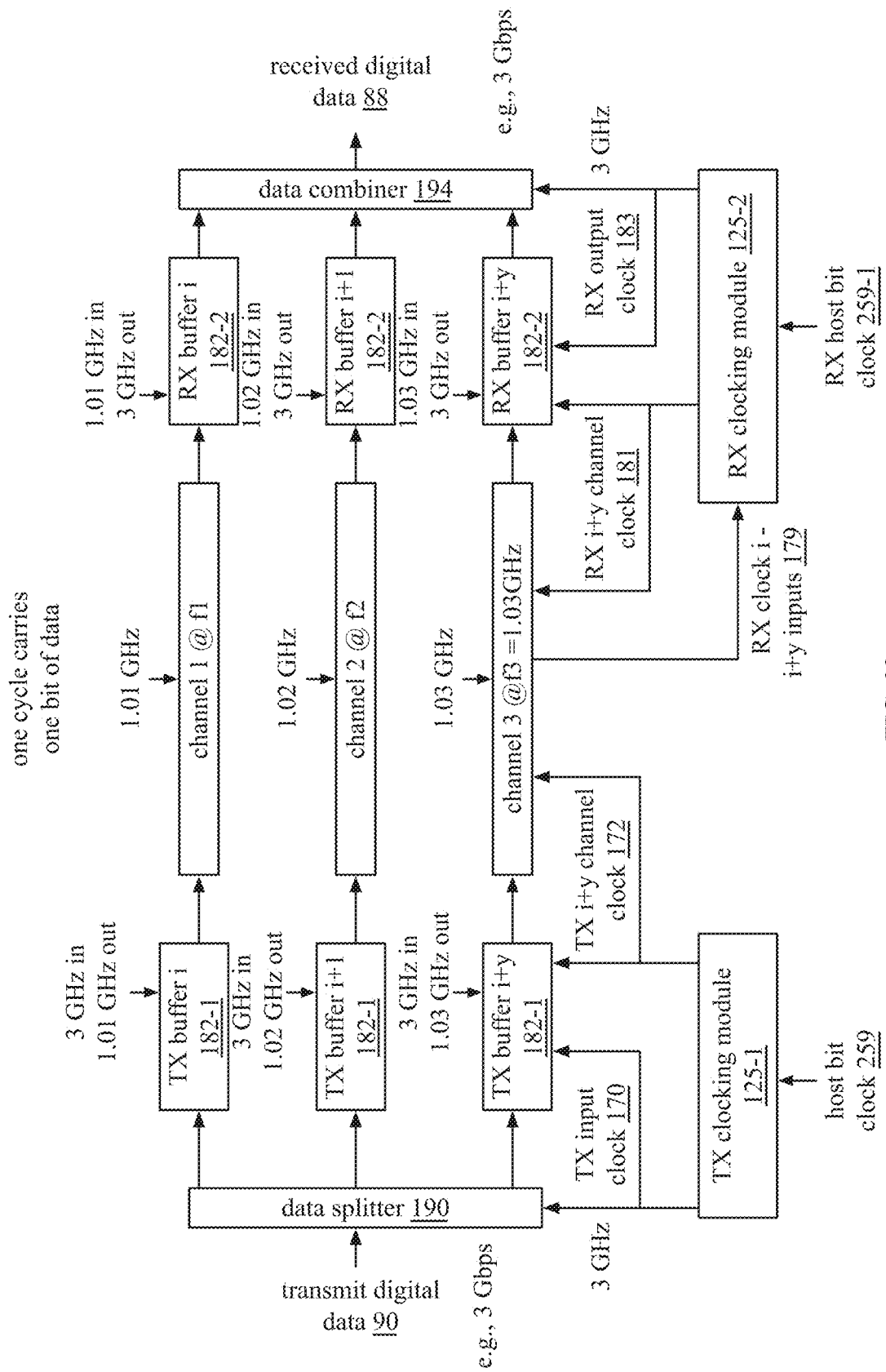
Figure 24A:
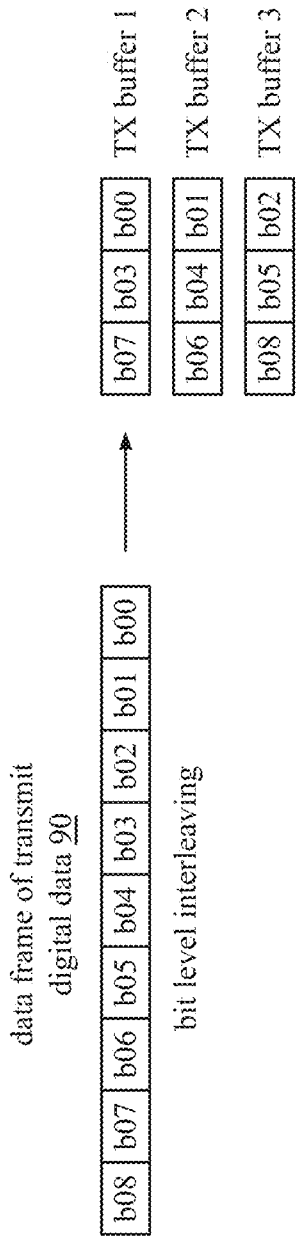
Figure 24B:
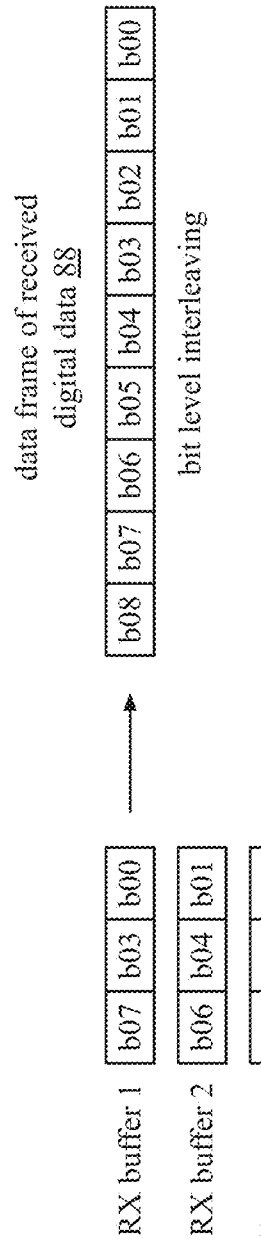
Figures 25A, 25B:
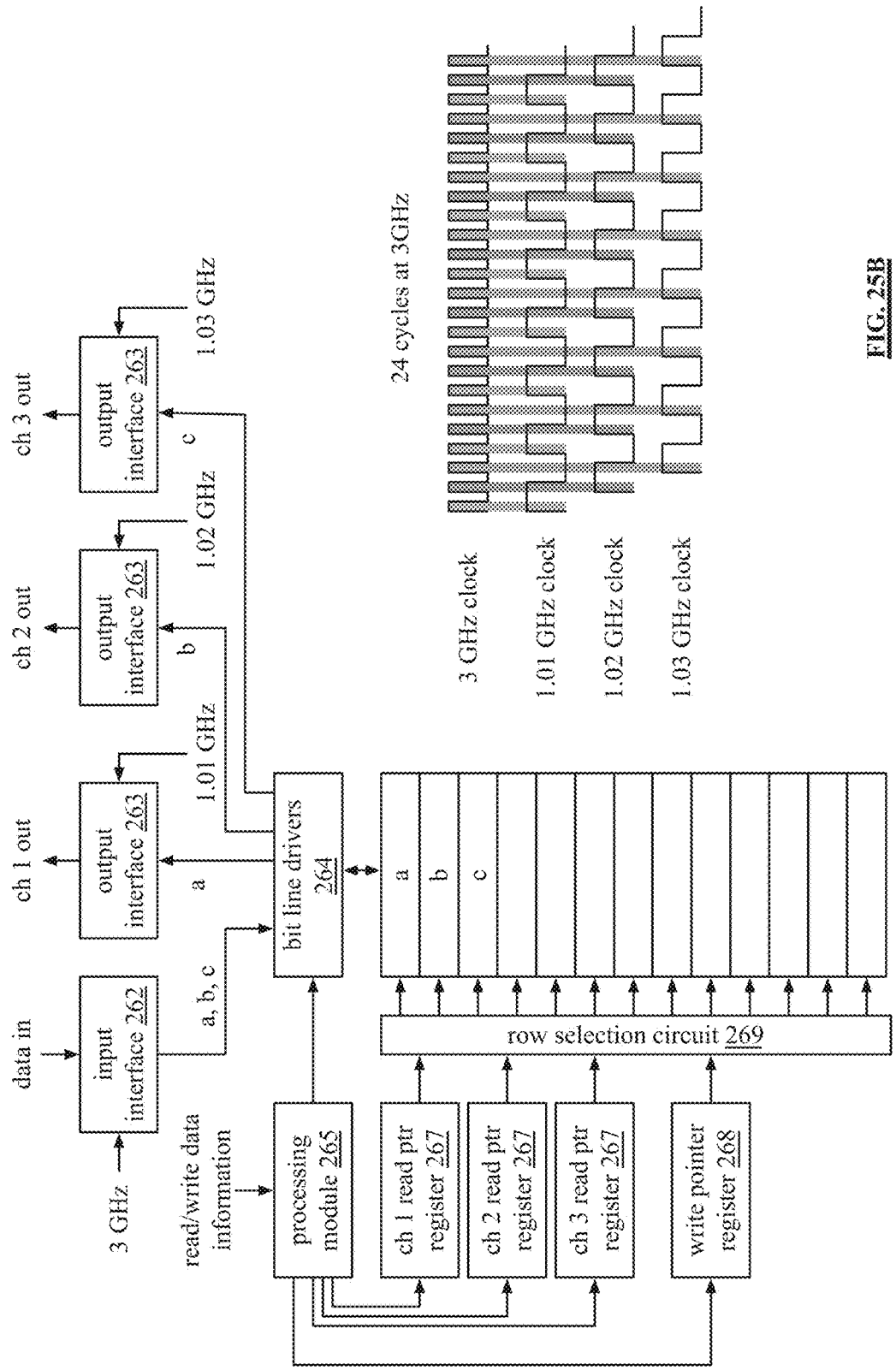
Figure 25C:
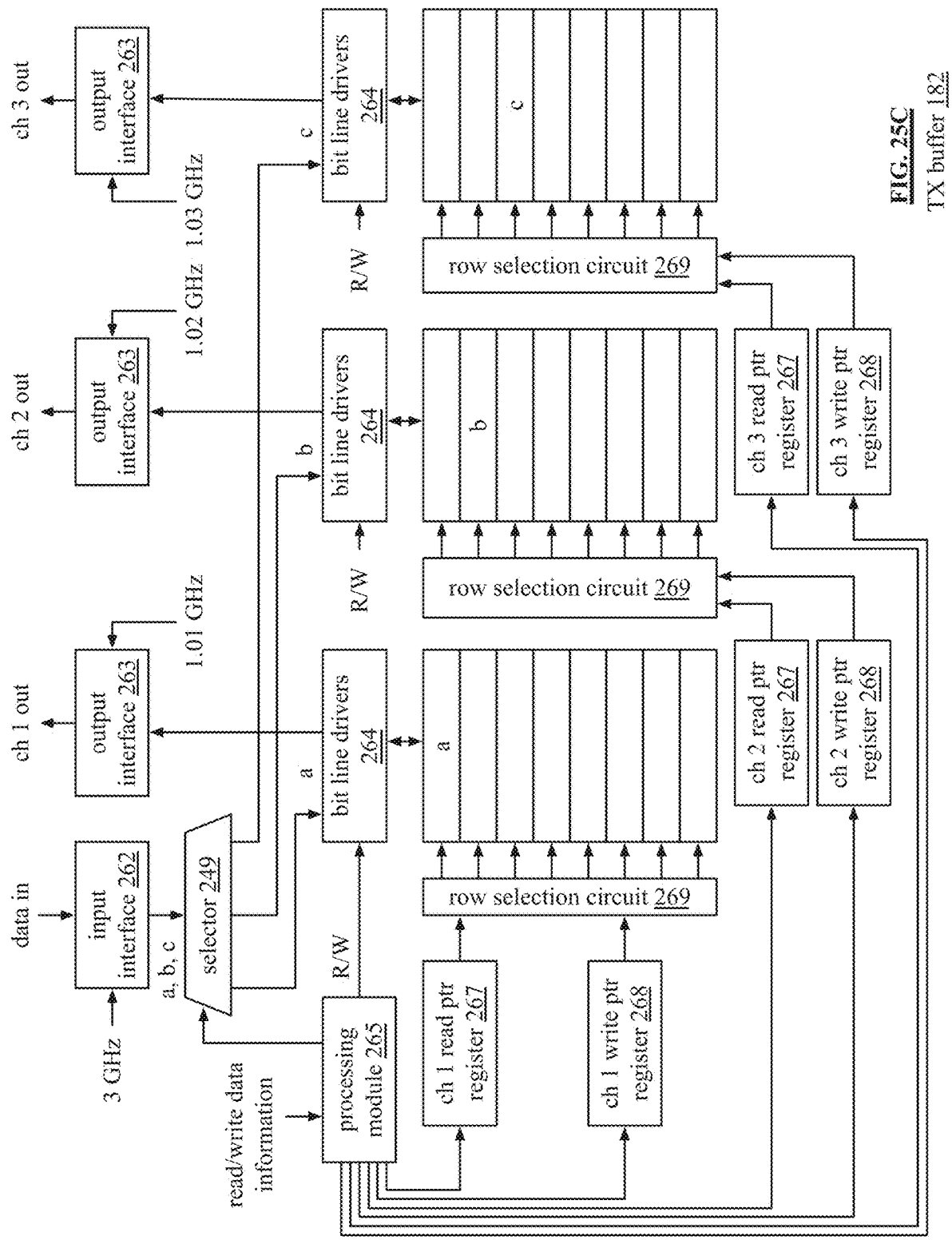
Figure 29:
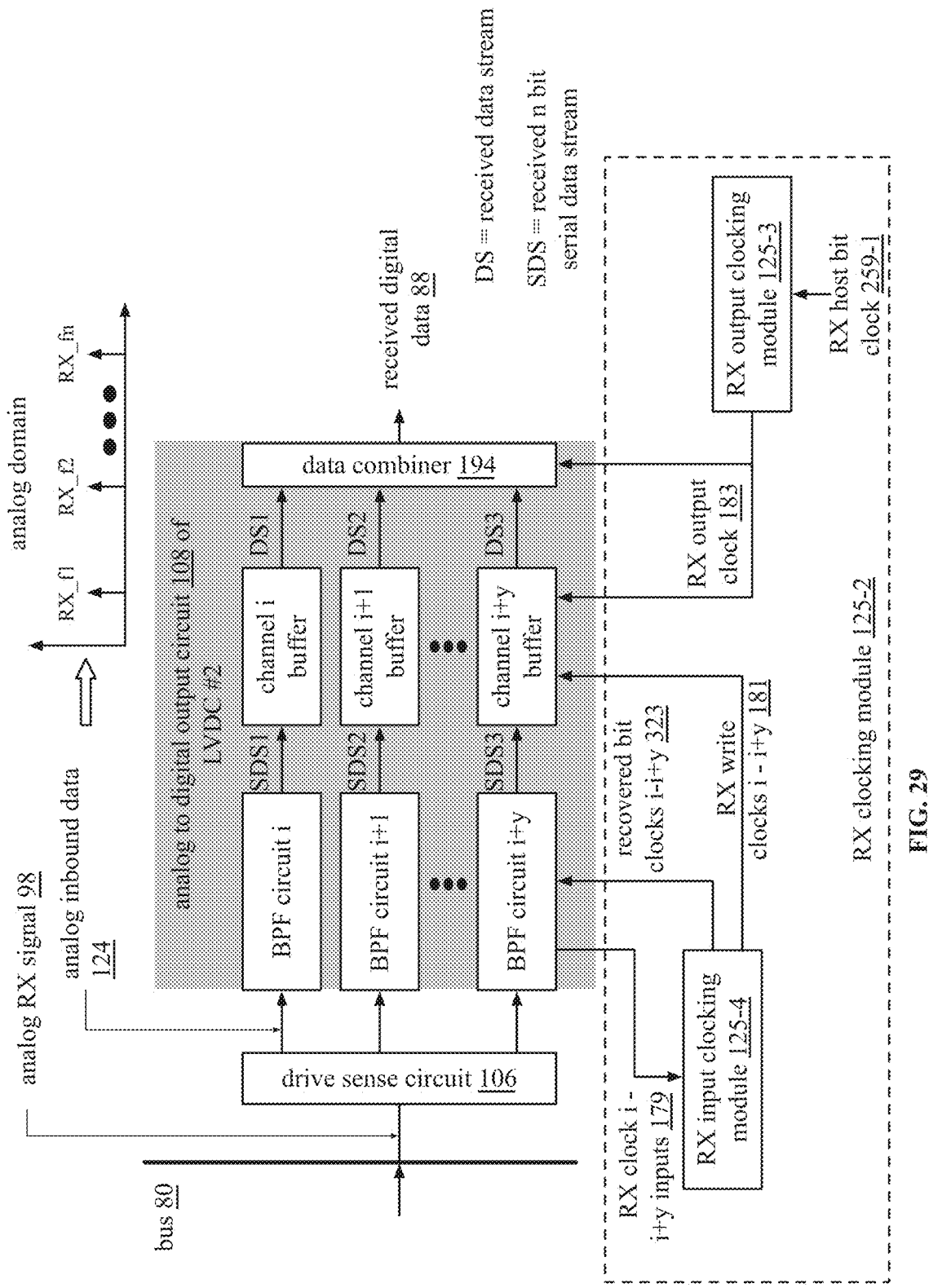
Figures 30A, 30B:
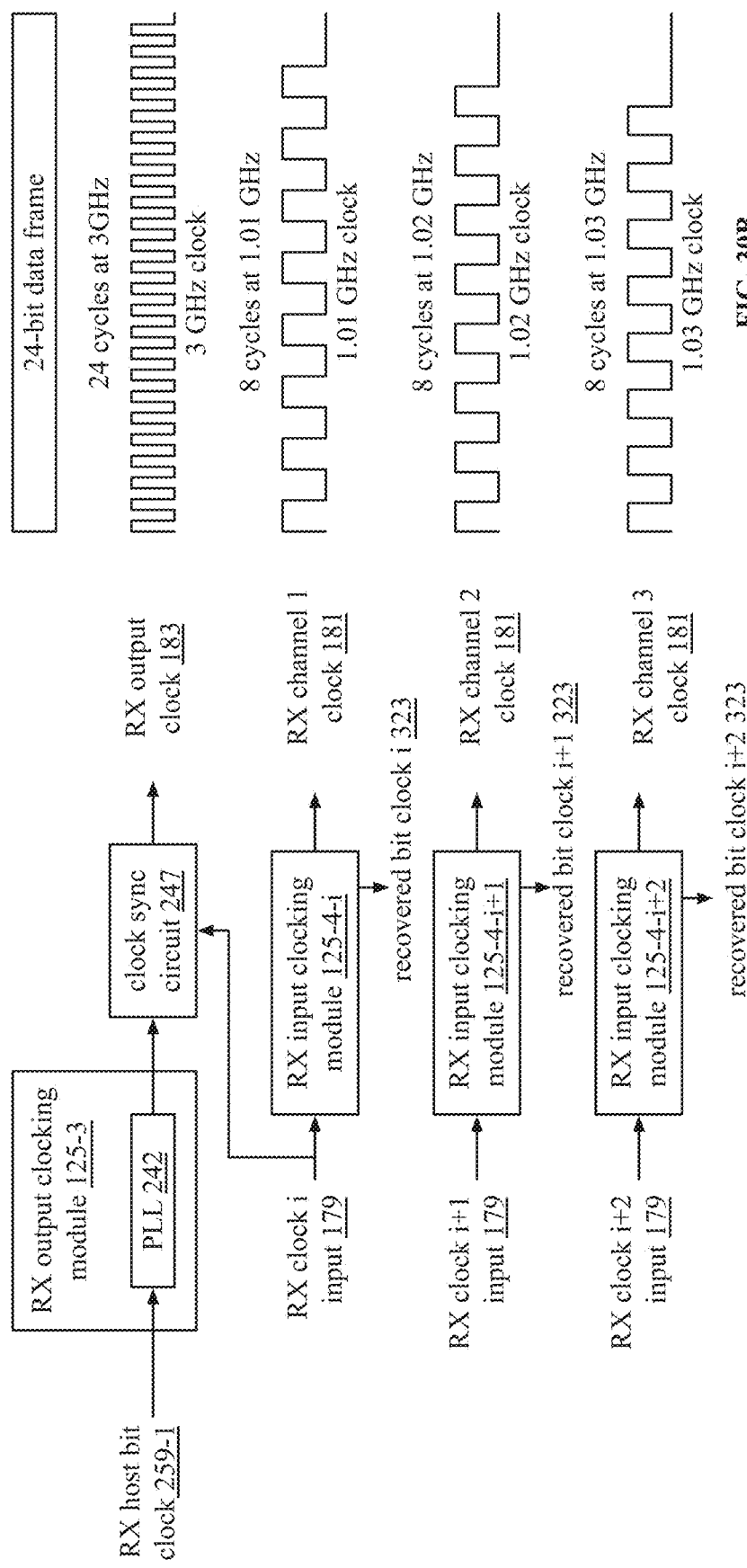
Figure 32A:
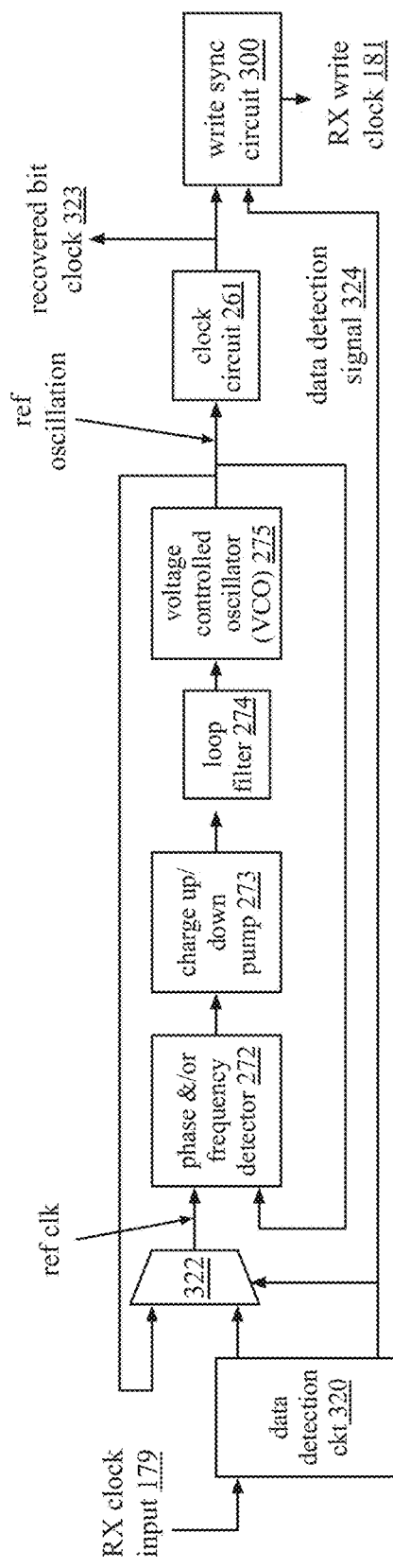
Figure 32B:
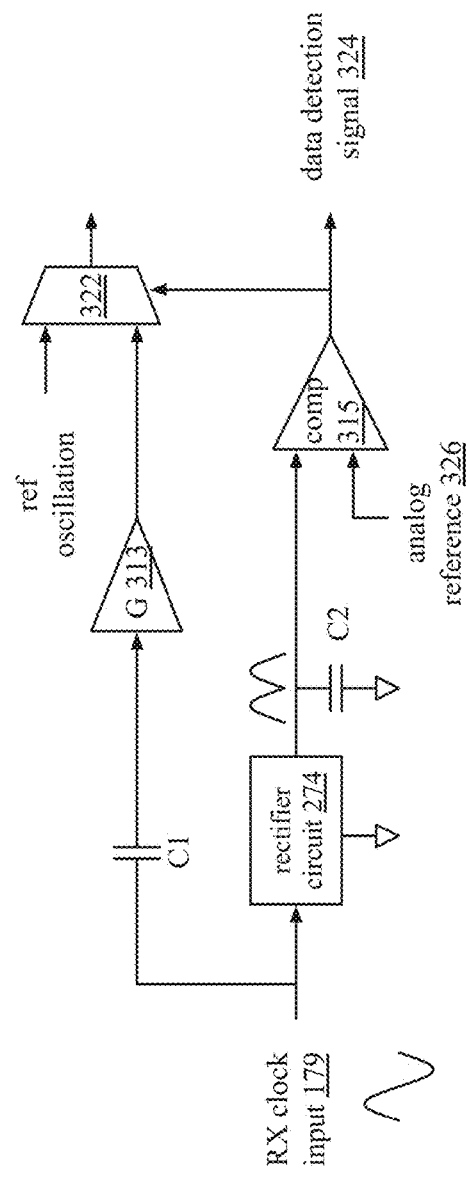
Figure 33A:
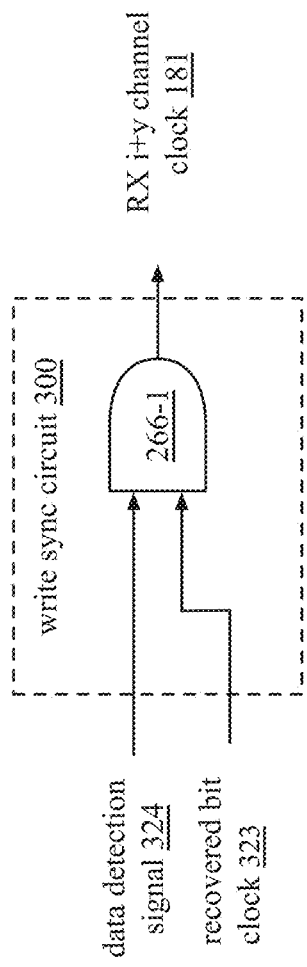
Figure 33B:
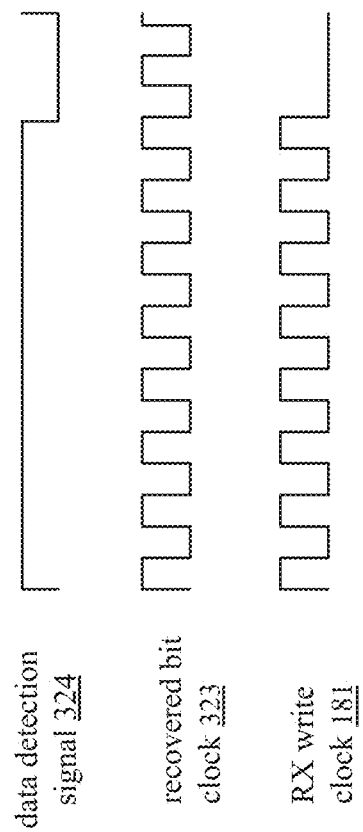
Figure 35:
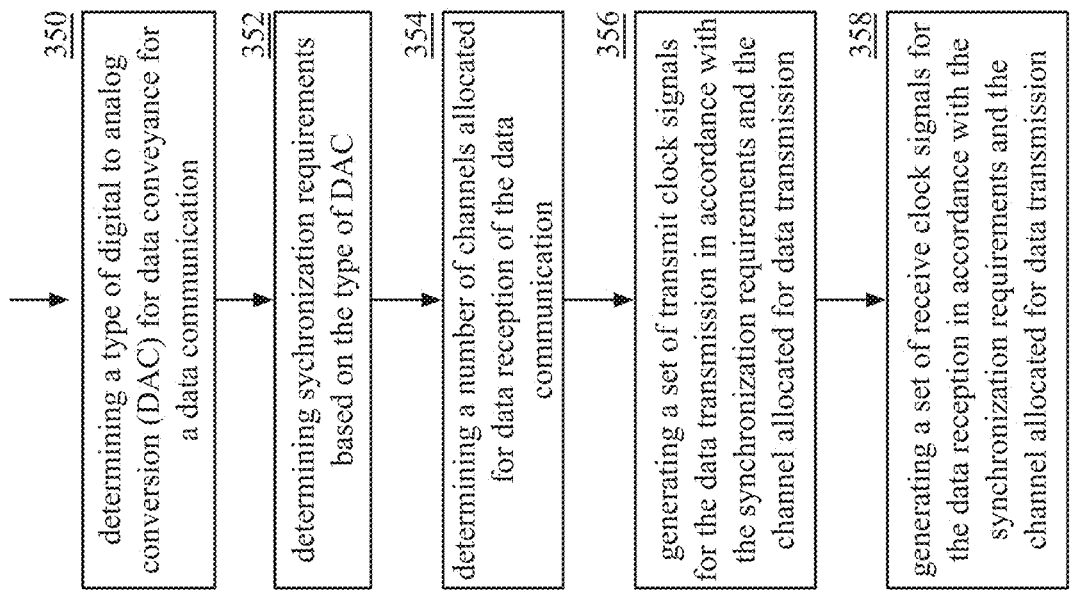
Figure 36:
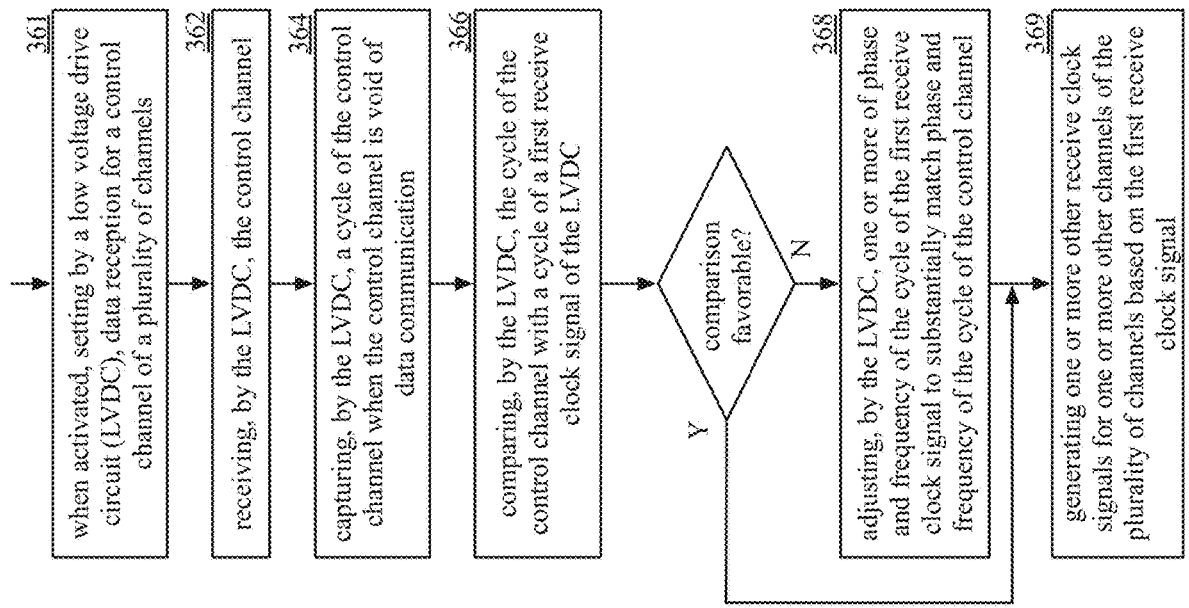
Figure 37:
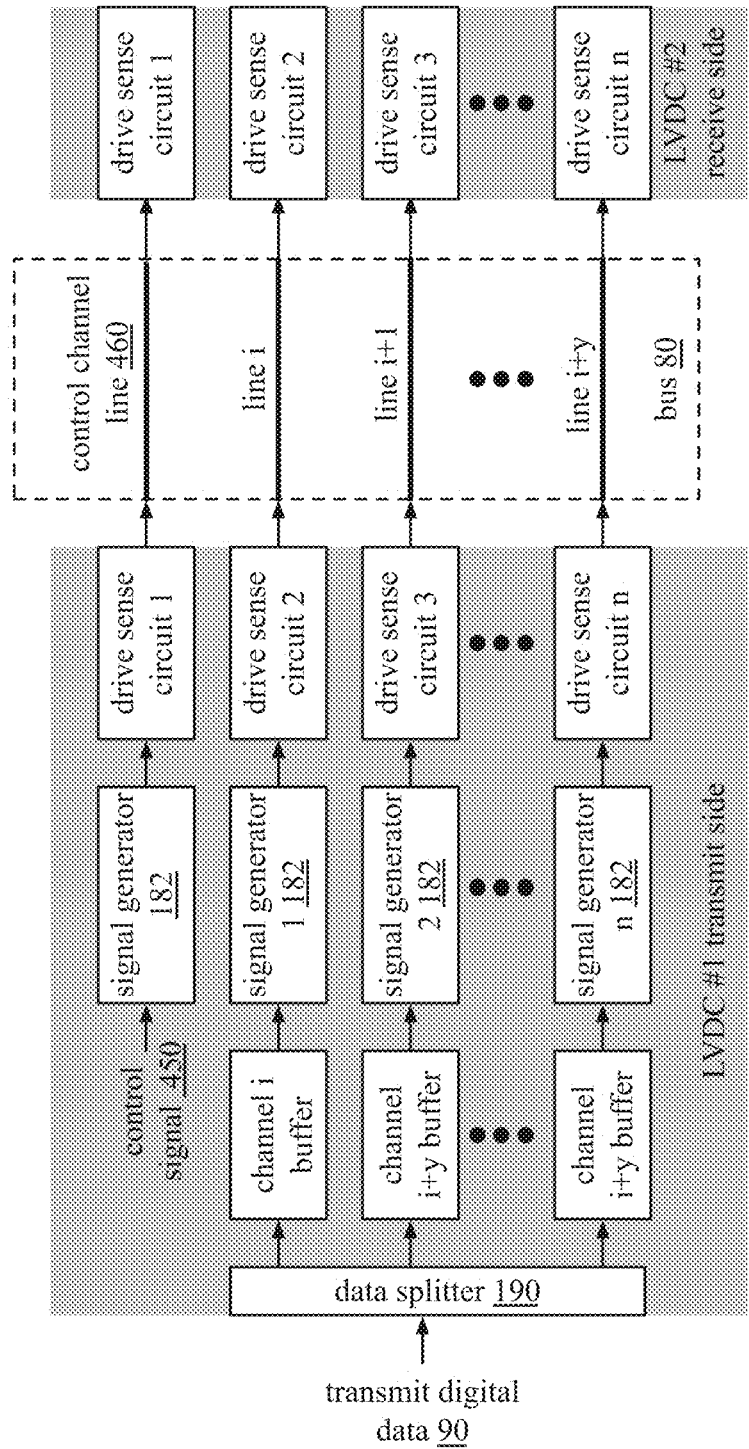

FIGS. 15A-E are schematic block diagrams of examples of variable circuits in accordance with the present invention;

FIG. 16 is a schematic block diagrams of another embodiment of a drive sense circuit in accordance with the present invention;

FIG. 17 is a schematic block diagram of an embodiment of a transmit side of a Low Voltage Drive Circuit (LVDC) in accordance with the present invention;

FIG. 18 is a schematic block diagram of an embodiment of a signal generator of a Low Voltage Drive Circuit (LVDC) in accordance with the present invention;

FIG. 19 is a schematic block diagram of an embodiment of a direct current (DC) reference source in accordance with the present invention;

FIG. 20 is a schematic block diagram of another embodiment of a DC reference source in accordance with the present invention;

FIG. 21 is a schematic block diagram of another embodiment of a DC reference source in accordance with the present invention;

FIG. 22 is a schematic block diagram of an embodiment of a signal generator in accordance with the present invention;

FIG. 23 is a schematic block diagram of an embodiment of transmitting data via a plurality of communication channels in accordance with the present invention;

FIG. 24A is a schematic block diagram of an embodiment of bit level interleaving a data frame of transmit digital data in accordance with the present invention;

FIG. 24B is a schematic block diagram of an embodiment of bit level interleaving a data frame of received digital data in accordance with the present invention;

FIG. 25A is a schematic block diagram of an embodiment of a transmit buffer in accordance with the present invention;

FIG. 25B is a schematic block diagram of an embodiment of transmit buffer clock signals in accordance with the present invention;

FIG. 25C is a schematic block diagram of another embodiment of transmit buffer in accordance with the present invention;

FIG. 26A is a schematic block diagram of an embodiment of a transmit (TX) clocking module in accordance with the present invention;

FIG. 26B is a schematic block diagram of an embodiment of transmit clock signals in accordance with the present invention;

FIG. 27A is a schematic block diagram of an embodiment of a read sync circuit in accordance with the present invention;

FIG. 27B is a schematic block diagram of an embodiment of a read sync circuit clock signals in accordance with the present invention FIG. 28A is a schematic block diagram of an example of a phase locked loop (PLL) in accordance with the present invention;

FIG. 28B is a schematic block diagram of another example of a phase locked loop (PLL) in accordance with the present invention;

FIG. 29 is a schematic block diagram of a receive side of a low voltage drive circuit (LVDC) in accordance with the present invention;

FIG. 30A is a schematic block diagram of another embodiment of a receive (RX) clocking module in accordance with the present invention;

FIG. 30B illustrates the clock signals output by the RX clocking module in accordance with the present invention;

FIG. 31 is a schematic block diagram of an embodiment of a bandpass filter (BPF) circuit in accordance with the present invention;

FIG. 32A is a schematic block diagram of a receive (RX) input clocking module in accordance with the present invention;

FIG. 32B is a schematic block diagram of an embodiment of a data detection circuit in accordance with the present invention;

FIG. 33A is a schematic block diagram of an embodiment of a write sync circuit in accordance with the present invention;

FIG. 33B is a schematic block diagram of an embodiment of signals associated with a write sync circuit in accordance with the present invention;

FIG. 34A is a schematic block diagram of an embodiment of a receive (RX) buffer in accordance with the present invention;

FIG. 34B is a schematic block diagram of an embodiment of receive clock signals in accordance with the present invention;

FIG. 35 is a flowchart illustrating an example of a method of programming receive and transmit channels in accordance with the present invention;

FIG. 36 is a flowchart illustrating an example of a method of syncing low voltage drive circuit (LVDC) clock signal with a bus clock signal in accordance with the present invention; and FIG. 37 is a schematic block diagram of an embodiment of utilizing a control channel between two or more LVDCs in accordance with the present invention.

DETAILED DESCRIPTION OF THE INVENTION

Figure 1:
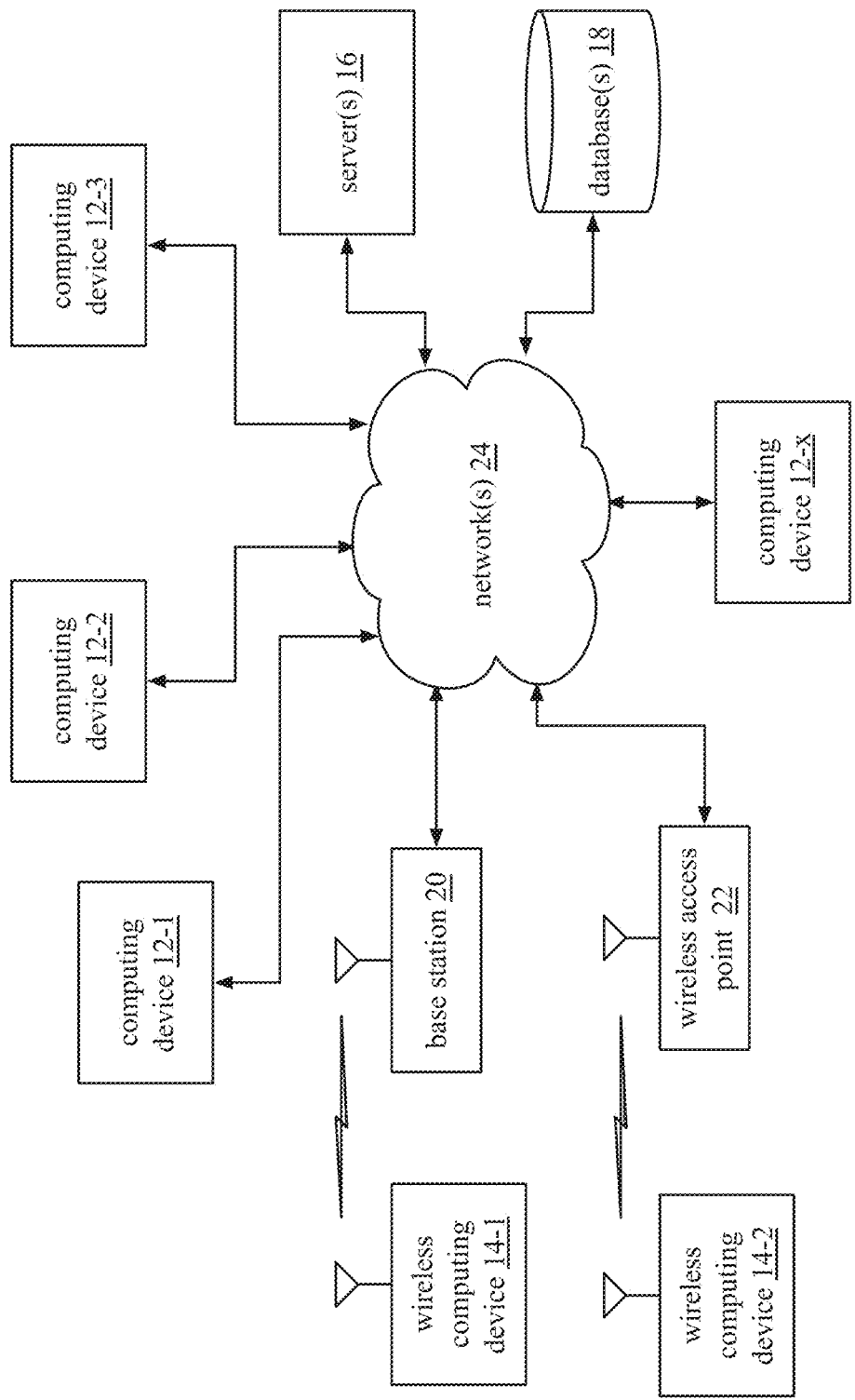
FIG. 1 is a schematic block diagram of an embodiment of a data communication system in accordance with the present invention.

FIG. 1 is a schematic block diagram of an embodiment of a data communication system 10 that includes a plurality of computing devices 12, a plurality of wireless computing devices 14, one or more servers 16, one or more databases 18, one or more networks 24, one or more base stations 20, and/or one or more wireless access points 22. Embodiments of computing devices 12 (i.e., 12-1, 12-2, 12-3, 12-x, etc.) and 14 (i.e., 14-1, 14-2, etc.) are similar in construct and/or functionality with a difference being the computing devices 12 couple to the network(s) 24 via a wired network card and the wireless communication devices 14 coupled to the network(s) via a wireless connection. In some examples, a computing device includes functionality and capability of both a wired network card and a wireless network card such that the computing device includes the features of both computing devices 12 and 14.

A computing device 12 and/or 14 may be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. The computing devices 12 and 14 will be discussed in greater detail with reference to one or more of FIGS. 3-4.

A server 16 is a special type of computing device that is optimized to process large amounts (e.g., thousands, millions, billions, etc) of data requests in parallel. A server 16 includes similar components to that of the computing devices 12 and/or 14 with more robust processing modules, more main memory, and/or more hard drive memory (e.g., solid state, hard drives, etc.). Further, a server 16 is typically accessed remotely; as such it does not generally include user input devices and/or user output devices. In addition, an embodiment of a server is a standalone, separate computing device and/or may be a cloud computing device.

A database 18 is a special type of computing device that is optimized for large scale data storage and retrieval. A database 18 includes similar components to that of the computing devices 12 and/or 14 with more hard drive memory (e.g., solid state, hard drives, etc.) and potentially with more processing modules and/or main memory. Further, a database 18 is typically accessed remotely; as such it does not generally include user input devices and/or user output devices. In addition, an embodiment of a database 18 is a standalone separate computing device and/or may be a cloud computing device.

The network(s) 24 includes one or more local area networks (LAN) and/or one or more wide area networks (WAN), which may be a public network and/or a private network. A LAN may be a wireless-LAN (e.g., Wi-Fi access point, Bluetooth, ZigBee, etc.) and/or a wired LAN (e.g., Firewire, Ethernet, etc.). A WAN may be a wired and/or wireless WAN. For example, a LAN is a personal home or business's wireless network and a WAN is the Internet, cellular telephone infrastructure, and/or satellite communication infrastructure.

The computing devices 12, the wireless communication devices 14, the server 16, the database 18, the base station 20, and/or the wireless access point 22 include one or more low voltage drive circuits (LVDC) for communicating data via a line of a bus (e.g., a bus includes one or more lines, each line is a wired connection, a wire, a trace on a PCB, etc.). The data communication is between devices and/or is within a device. For example, two computing devices communicate with each other via their respective LVDCs. As another example, components within a computing device have associated LVDCs and the components communicate data via the LVDCs.

Figure 2:
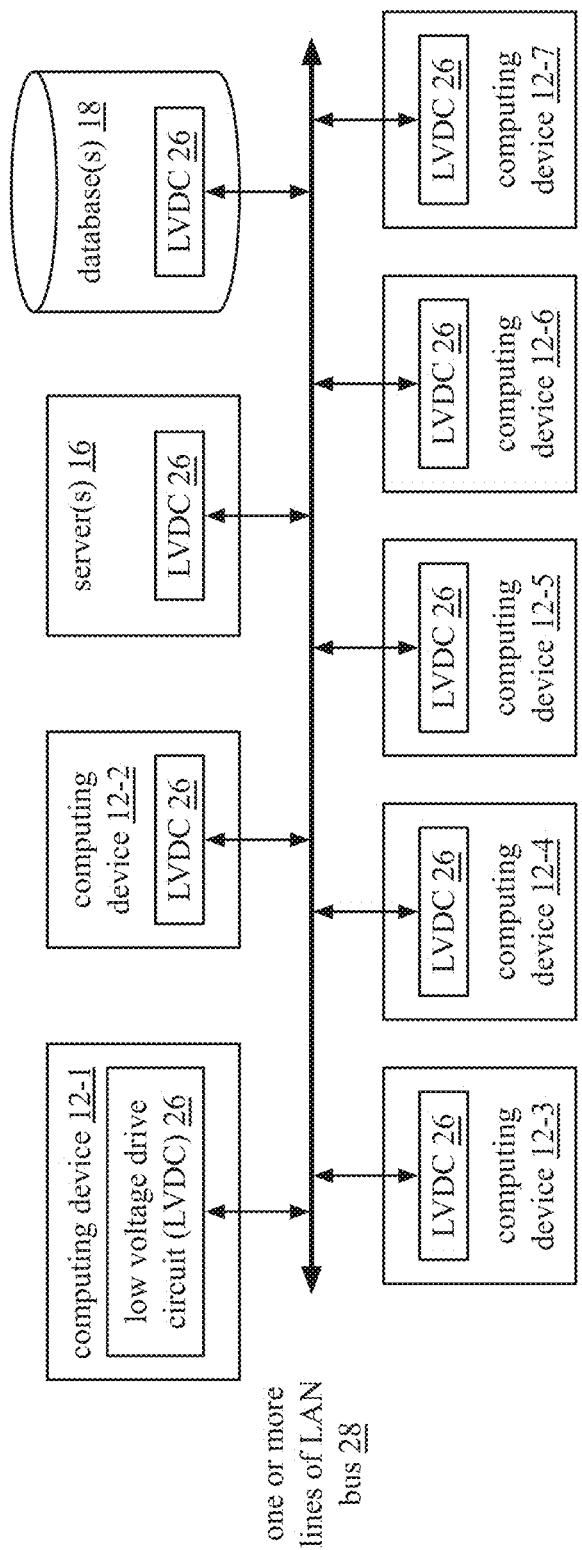
FIG. 2 is a schematic block diagram of another embodiment of a data communication system in accordance with the present invention.

FIG. 2 is a schematic block diagram of another embodiment of a data communication system 10 that includes the computing devices 12, the server 16, and the database 18 coupled to one or more lines of a LAN bus 28. Each device 12, 16, and 18 includes one or more LVDCs 26 for communicating data via the line of the LAN bus 28.

An LVDC 26 functions to convert transmit digital data from its host device into an analog transmit signal. As an example, a host device is a computing device, a server, or a database. As another example, a host device is an interface of one of the computing device, the server, or the database. As yet another example, a host device is an integrated circuit of the computing device, the server, or the database. As a further example, a host device is a die of an integrated circuit.

The LVDC 26 produces the analog transmit signal to have an oscillating component at a given frequency (having a very small magnitude, amplitude, etc) that represents the transmit digital data. For example, the magnitude of the oscillating component is between 5 percent and 75 percent of the rail to rail voltage (or current) of the LVDC (e.g., Vdd–Vss of the LVDC). By keeping the magnitude of the oscillating component very low with respect to the rail to rail voltage (or current), data is transmitted with very low power and very good noise immunity. As a specific example, if the voltage magnitude of the oscillating component is 25 mV (milli-volts) and the current is 0.1 mA (milli-amps), then the power is 2.5 µW (micro-watts).

The LVDC 26 also functions to convert an analog receive signal into received digital data that is provided to its host. The analog receive signal is an analog transmit signal from another LVDC of the same host or a different host and is received from the same line of the bus as which the LVDC transmits its analog transmit signal. For an LVDC, the analog receive signal is at the same frequency as its analog transmit signal for half duplex communication and is at a different frequency for full duplex communication.

An LVDC 26 is capable of communicating data with one or more other LVDCs using a plurality of frequencies. Each frequency supports a conveyance of data. For example, the transmit digital data can be divided up into data streams, where each data stream is transmitted on a different frequency of the analog transmit signal. This increases the data rate per line of the bus with very little increase in power. One or more other LVDCs can receive the multiple frequencies of the analog transmit signal, recover the data streams, and recover the transmitted digital data.

Figure 3:
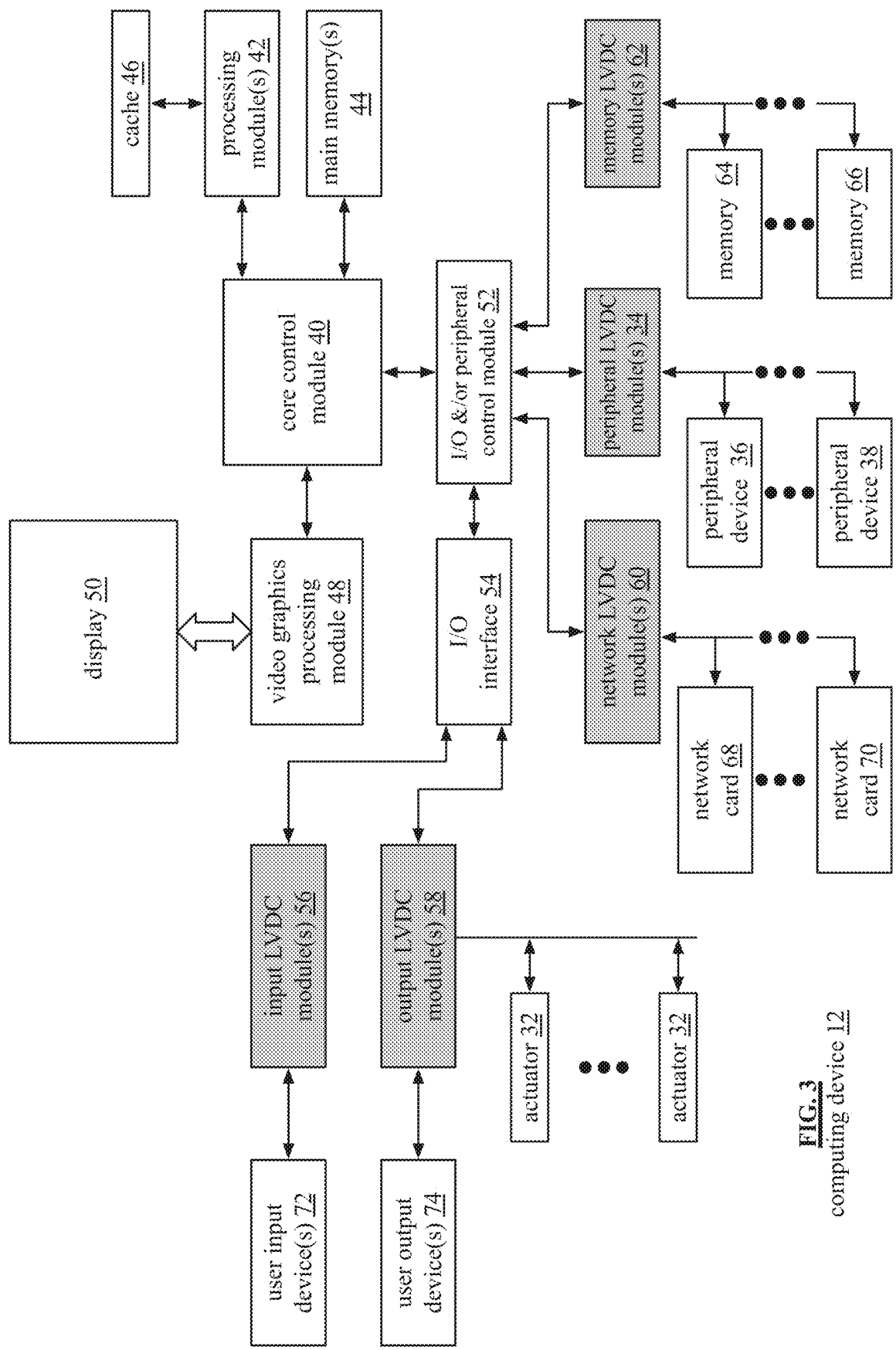
FIG. 3 is a schematic block diagram of an embodiment of a computing device in accordance with the present invention.

FIG. 3 is a schematic block diagram of an embodiment of a computing device 12 that includes a plurality of actuators 32, a core control module 40, one or more processing modules 42, one or more main memories 44 (e.g., volatile memory), cache memory 46, a video graphics processing module 48, a display 50, an Input-Output (I/O) and/or peripheral control module 52, an I/O interface 54, one or more input LVDC modules 56, one or more output LVDC modules 58, one or more network LVDC modules 60, one or more peripheral LVDC modules 34, and one or more memory LVDC modules 62. A processing module 42 is described in greater detail at the end of the detailed description of the invention section and, in an alternative embodiment, has a direct connection to the main memory 44. In an alternate embodiment, the core control module 40 and the I/O and/or peripheral control module 52 are one module, such as a chipset, a quick path interconnect (QPI), and/or an ultra-path interconnect (UPI).

Each of the main memories 44 includes one or more Random Access Memory (RAM) integrated circuits, or chips. For example, a main memory 44 includes four DDR4 ($4^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieved from memory 64-66 are the data and/or operational instructions requested by the processing module 42 or will most likely be needed by the processing module 42. When the processing module 42 is done with the data and/or operational instructions in main memory, the core control module 40 coordinates sending updated data to the memory 64-66 for storage.

The memory 64-66 (i.e., non-volatile memory) includes one or more hard drives, one or more solid state memory chips, and/or one or more other large capacity storage devices that, in comparison to cache memory and main memory devices, is/are relatively inexpensive with respect to cost per amount of data stored. The memory 64-66, which includes an LVDC, is coupled to the core control module 40 via the I/O and/or peripheral control module 52 and via one or more memory LVDC modules 62. In an embodiment, the I/O and/or peripheral control module 52 includes one or more Peripheral Component Interface (PCI) buses to which peripheral components connect to the core control module 40. A memory LVDC module 62 includes a software driver and hardware as discussed in one or more subsequent Figures.

The core control module 40 coordinates data communications between the processing module(s) 42 and the network(s) 24 via the I/O and/or peripheral control module 52, the network LVDC module(s) 60, and a network card 68 or 70. A network card 68 or 70 includes an LVDC and a wired communication unit. A wired communication unit includes a Gigabit LAN connection, a Firewire connection, and/or a proprietary computer wired connection. A network LVDC module 60 includes a software driver and hardware as described with reference to one or more subsequent Figures.

The core control module 40 coordinates data communications between the processing module(s) 42 and the user input device(s) 72 via the input LVDC module(s) 56 and the I/O and/or peripheral control module 52. A user input device 72 includes an LVDC and further includes one or more of a keypad, a keyboard, control switches, a touchpad, a microphone, a camera, etc. An input LVDC module 56 includes a software driver and hardware as discussed in one or more subsequent Figures.

The core control module 40 coordinates data communications between the processing module(s) 42 and the user output device(s) 74 via the output LVDC module(s) 58 and the I/O and/or peripheral control module 52. A user output device 74 includes an LVDC and a speaker, a tactile actuator, etc. An output LVDC module 58 includes a software driver and hardware as discussed in one or more subsequent Figures.

The core control module 40 coordinates data communications between the processing module(s) 42 and peripheral devices 36 and 38 via the I/O and/or peripheral control module 52 and the peripheral LVDC module(s) 34. A peripheral device 36 or 38 includes an external hard drive, a headset, a speaker, a microphone, a thumb drive, a camera, etc. A peripheral LVDC module 34 includes a software driver and hardware as discussed in one or more subsequent Figures.

The core control module 40 communicates directly with a video graphics processing module 48 to display data on the display 50. The display 50 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the display, and provides the rendered data to the display 50. In some examples, the computing device 12 further includes a BIOS (Basic Input Output System) memory coupled to the core control module 40.

Figure 4:
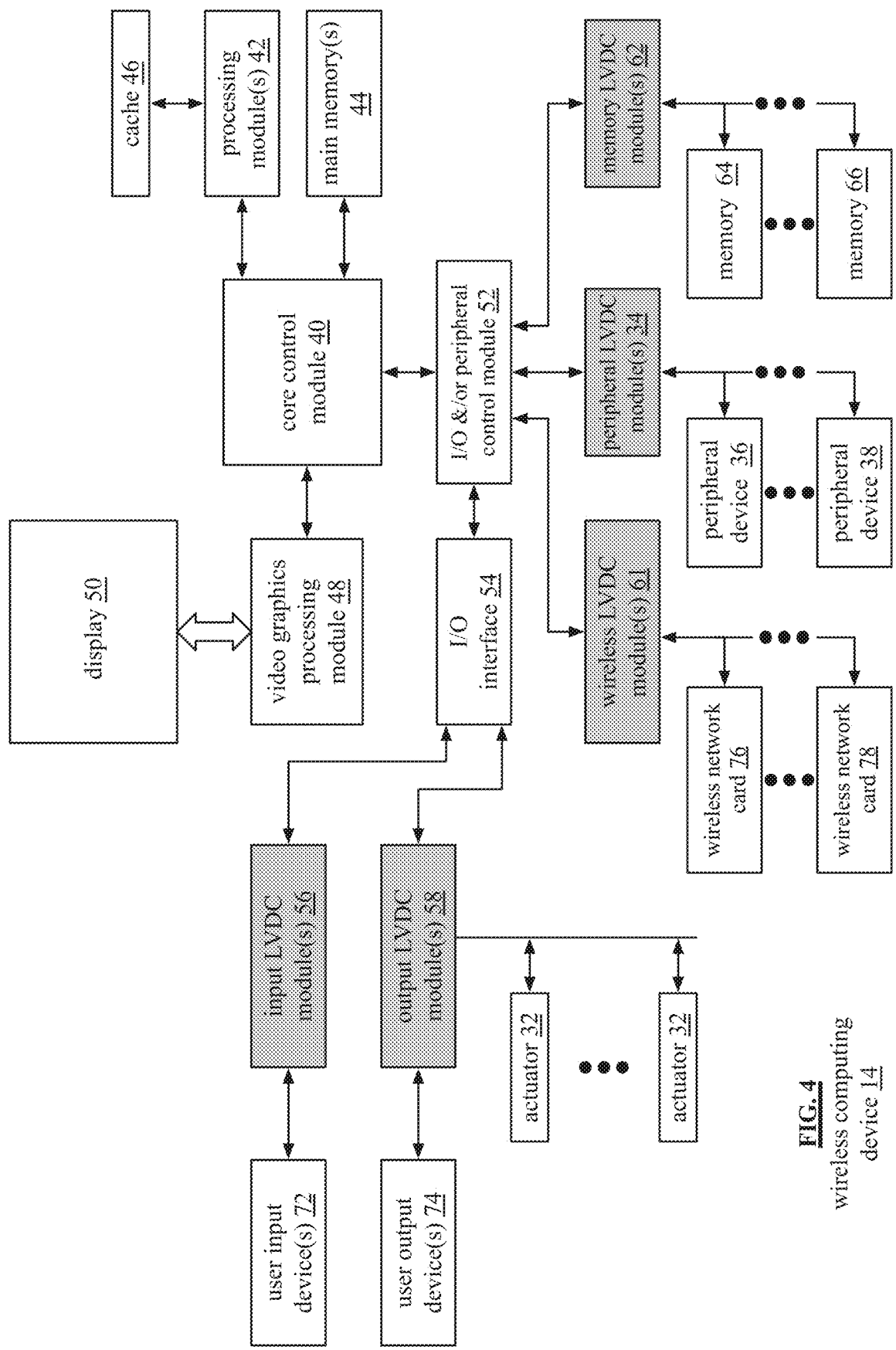
FIG. 4 is a schematic block diagram of an embodiment of a wireless computing device in accordance with the present invention.

FIG. 4 is a schematic block diagram of an embodiment of a wireless computing device 14 that includes a core control module 40, one or more processing modules 42, one or more main memories 44 (e.g., volatile memory), cache memory 46, a video graphics processing module 48, a display 50, an Input-Output (I/O) and/or peripheral control module 52, one or more input LVDC modules 56, one or more output LVDC modules 58, one or more wireless network LVDC modules 61, and one or more memory LVDC modules 62. The common components of the wireless computing device 14 and the computing device 12 function as discussed with reference to FIG. 3. In this embodiment, communication with the network 24 is done wirelessly.

In particular, the core control module 40 coordinates data communications between the processing module(s) 42 and network(s) 24 wirelessly via the I/O and/or peripheral control module 52, the wireless LVDC module(s) 61, and a wireless network card 76 or 78. A wireless network card 76 or 78 includes an LVDC and a wireless communication unit. A wireless communication unit includes a wireless local area network (WLAN) communication device, a cellular communication device, a Bluetooth device, and/or a ZigBee communication device. A wireless LVDC module 61 includes a software driver and hardware as discussed in one or more subsequent Figures.

Figure 5:
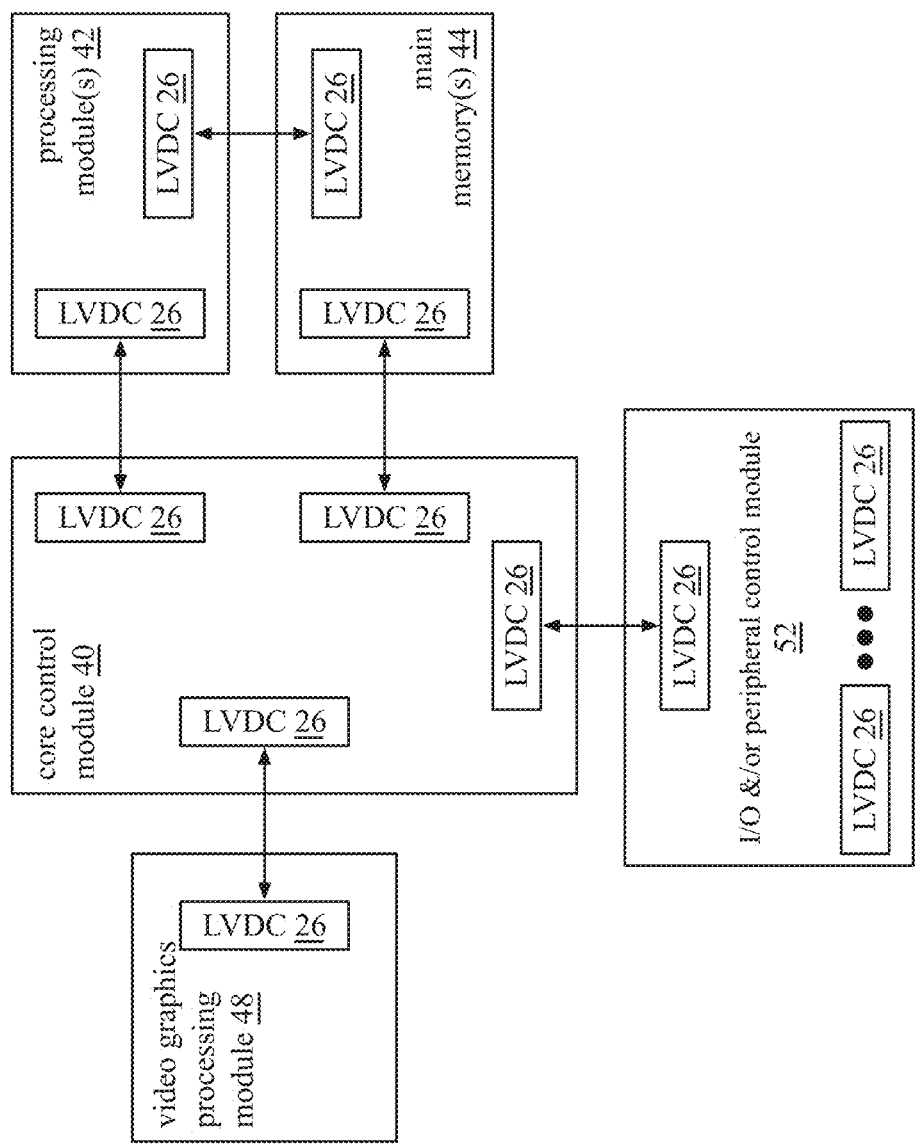
FIG. 5 is a schematic block diagram of an embodiment of a computing core of a computing device in accordance with the present invention.

FIG. 5 is a schematic block diagram of an embodiment of a computing core of a computing device 12 or 14. The computing core includes the core control module 40, the processing module(s) 42, the main memory 44, the video graphics processing module 48, and the IO and/or peripheral control module 52. These components are generally implemented as integrated circuits (ICs) and mounted on a mother board. The mother board includes traces that form buses for data to be communicated between the components.

In this embodiment, the data communication between components 40-52 is done via Low Voltage Drive Circuits (LVDCs). Each component 40-52 includes one or more LVDCs implemented to facilitate communicating with one or more other components. For example, the core control module 40 includes four LVDCs: A first LVDC implemented to facilitate one-to-one communication with the processing module 42; a second LVDC implemented to facilitate one-to-one communication with the main memory 44; a third LVDC implemented to facilitate one-to-one communication with the video graphics processing module 48; and a fourth LVDC implemented to facilitate one-to-one communication with the IO and/or peripheral control module 52.

In this embodiment, the core control module 40 is coupled to the processing module(s) 42 via a single trace for data communication there-between. The core control module 40 is also coupled, via a single trace, to the main memory 44, the video graphics processing module 48, and to the IO and/or peripheral control module 52. Similarly, the processing module 42 is coupled to the main memory via a single trace. In this manner, the number of traces on the mother board is substantially reduced in comparison to mother boards that use conventional data communication between the components. In addition, the power utilized to convey data is substantially reduced in the present embodiment in comparison to mother boards that use conventional data communication.

In an alternate embodiment, each of the core control module 40, the processing module(s) 42, the main memory 44, the video graphics processing module 48, and the IO and/or peripheral control module 52 includes one LVDC that is coupled to one or more lines of a bus. In an example, the core control module 40 communicates with the processing module 42 using a first set of channels of a frequency band; communicates with main memory 44 using a second set of channels of the frequency band; communicates with the video graphics processing module 48 using a third set of channels of the frequency band; and communicates with the I/O and/or peripheral control module 52 using a fourth set of channels of the frequency band. In an example, the frequency band ranges from 1.000 GHz to 1.100 GHz with channels at frequencies every 10 MHz. As such, there are 10 channels: the first channel starting at 1.000 GHz (e.g., includes a range from 1.000 GHz to 1.009 GHz, with a center frequency of 1.005 GHz), the second channel starting at 1.010 GHz, and so on through the tenth channel starting at 1.090 GHz. A specific channel includes a sinusoidal signal at a particular frequency within the frequency band.

In another example of alternative embodiment, the channels are allocated to the components on an as needed basis. For example, when the main memory has data to write to memory device(s) via the I/O and/or peripheral control module 52, one or more channels are allocated for this communication. When the data has been conveyed, the allocated channels are released for reallocation to another communication.

Figure 6:
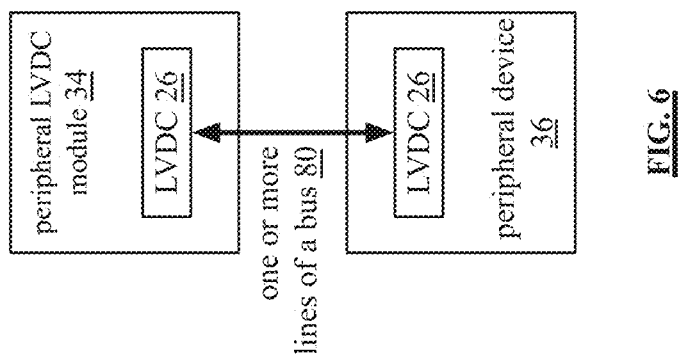
FIG. 6 is a schematic block diagram of an embodiment of a peripheral Low Voltage Drive Circuit (LVDC) module of a computing device coupled to a peripheral device in accordance with the present invention.

FIG. 6 is a schematic block diagram of an embodiment of a peripheral Low Voltage Drive Circuit (LVDC) module 34 of a computing device 12 coupled to a peripheral device 36 via LVDCs 26. The LVDCs are coupled together via one or more lines of a bus 80. The devices communicate data in a full duplex mode per line using multiple channels or in a half-duplex mode per line using a single channel. For example, the LVDC of peripheral LVDC module 34 uses channels 1-3 (e.g., frequencies 1-3 of the frequency band) to transmit data to the LVDC of the peripheral device 36. In addition, the LVDC of the peripheral device 36 uses channels 4-6 (e.g., frequencies 4-6 of the frequency band) to transmit data to the LVDC of the peripheral LVDC module 34.

FIG. 7 is a schematic block diagram of another embodiment of a data communication system that includes a plurality of devices 82-1 through 82-6. Each of the devices includes a Low Voltage Drive Circuit (LVDC) 26 coupled to one or more lines of a bus 80. The devices are one or more devices that includes a die of an integrated circuit (IC), an integrated circuit (IC), a printed circuit board with components mounted thereon, and a sub-system of a plurality of printed circuit boards.

The devices communicate with each other via their respective LVDCs and the one or more lines of the bus. For each line of the bus, the LVDCs are assigned (e.g., permanently, on an as needed basis, etc.) channels to transmit data to one or more other devices. An LVDC of a device is tuned to the channel(s) of another device to receive the data transmissions from the other device.

Figure 8:
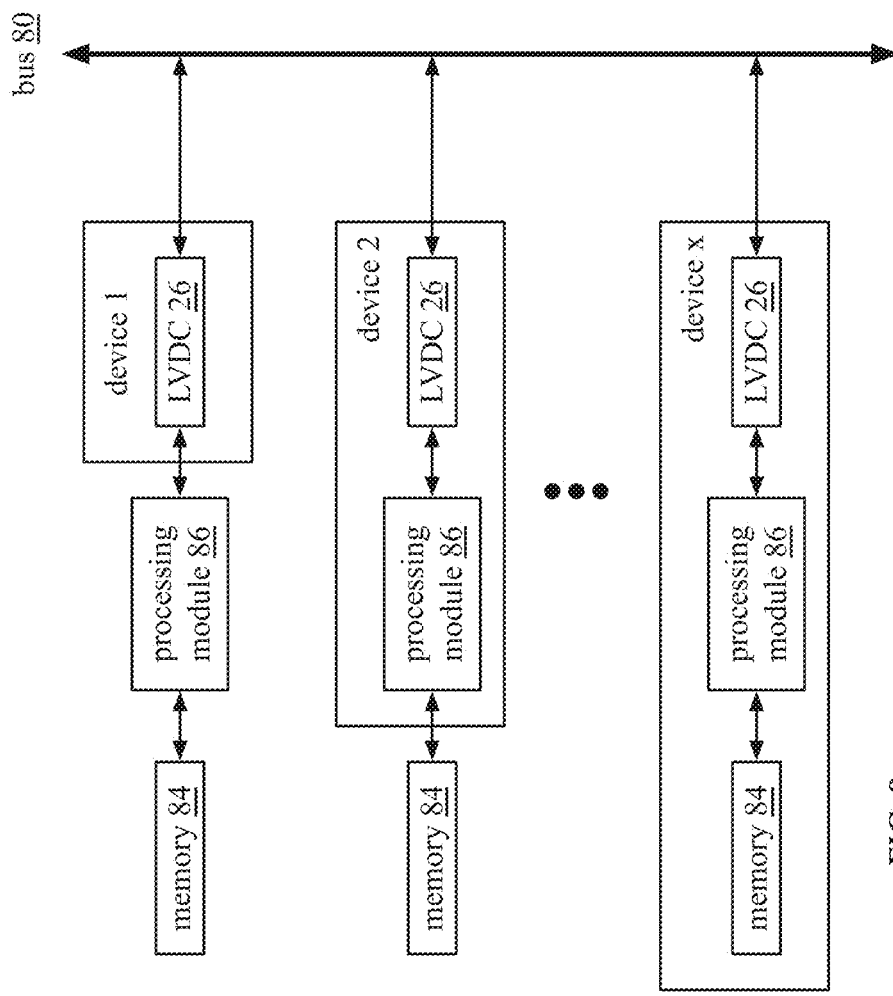
FIG. 8 is a schematic block diagram of another embodiment of a data communication system in accordance with the present invention.

FIG. 8 is a schematic block diagram of another embodiment of a data communication system that includes a plurality of devices 1-x. Each of the devices includes a Low Voltage Drive Circuit (LVDC) 26 coupled to one or more lines of a bus 80. The types of devices vary. For example, device 1 is an interface device that includes a limited amount of additional circuitry beyond the LVDC 26. In particular, device 1 does not include a processing module 86 or memory 84 (e.g., volatile or non-volatile memory). Device 1 is coupled to the processing module 86 of a next level higher component of a computing device. The processing module 86 coupled to device 1 is also coupled to memory 84.

Device 2 includes the LVDC and the processing module 86. The memory 84, however, is associated with the next higher component of the computing device. Device x includes the LVDC, the processing module 86, and the memory 84. As an example, the bus 84 is a backplane of server; device 1 is an interface for a thumb drive; device 2 is a video graphics card, and device x is a mother board. Regardless of the specific implementation of a device including an LVDC, in some examples, a driver for the LVDC is stored in the memory 84.

FIG. 9 is a schematic block diagram of examples of digital data formats. As is known, digital data includes binary values in some particular format. A binary value is either a logic "1" or a logic "0". One binary value corresponds to a bit of the digital data. How the bits are organized into data words establishes the meaning for the data words. For example, American Standard Code for Information Interchange (ASCII) defines characters using 8-bits of data. For example, a capital "A" is represented as the binary value of 0100 0001 and a lower case "a" is represented as the binary value of 0110 0001.

A binary value can be expressed in a variety of forms. In a first example format, a logic "1" is expressed as a positive rail voltage for the duration of a 1-bit clock interval and logic "0" is expressed as a negative rail voltage for the duration of the 1-bit clock interval; or vice versa. The positive rail voltage refers to a positive supply voltage (e.g., Vdd) that is provided to a digital circuit (e.g., a circuit that processes and/or communicates digital data as binary values), the negative rail voltage refers to a negative supply voltage or ground (e.g., Vss) that is provided to the digital circuit, and the common mode voltage (e.g., Vcm) is half way between Vdd and Vss. The 1-bit clock interval corresponds to the inverse of a 1-bit data rate. For example, if the 1-bit data rate is 1 Giga-bit per second (Gbps), then the 1-bit clock interval is 1 nano-second).

In a second example format, a logic "1" is expressed as a non-return to zero waveform that, for the first half of the 1-bit interval, is at the positive rail voltage (Vdd) and for the second half of the 1-bit interval is at the negative rail voltage (Vss). A logic "0" is expressed as a non-return to zero waveform that, for the first half of the 1-bit interval, is at the negative rail voltage (Vss) and for the second half of the 1-bit interval is at the positive rail voltage (Vdd). Alternatively, a logic "0" is expressed as a non-return to zero waveform that, for the first half of the 1-bit interval, is at the positive rail voltage (Vdd) and for the second half of the 1-bit interval is at the negative rail voltage (Vss). A logic "1" is expressed as a non-return to zero waveform that, for the first half of the 1-bit interval, is at the negative rail voltage (Vss) and for the second half of the 1-bit interval is at the positive rail voltage (Vdd).

In a third example format, a logic "1" is expressed as a return to zero waveform that, for the first half of the 1-bit interval, is at the positive rail voltage (Vdd) and for the second half of the 1-bit interval is at the common mode voltage (Vcm). A logic "0" is expressed as a return to zero waveform that, for the first half of the 1-bit interval, is at the negative rail voltage (Vss) and for the second half of the 1-bit interval is at the common mode voltage (Vcm). Alternatively, a logic "0" is expressed as a return to zero waveform that, for the first half of the 1-bit interval, is at the positive rail voltage (Vdd) and for the second half of the 1-bit interval is at the common mode voltage (Vcm). A logic "1" is expressed as a return to zero waveform that, for the first half of the 1-bit interval, is at the negative rail voltage (Vss) and for the second half of the 1-bit interval is at the common mode voltage (Vcm).

With any of the digital data formats, a logic value needs to be within 10% of a respective rail voltage to be considered in a steady data binary condition. For example, for format 1, a logic 1 is not assured until the voltage is at least 90% of the positive rail voltage (Vdd). As another example, for format 1, a logic 0 is not assured until the voltage is at most 10% of the negative rail voltage (Vss).

FIG. 10 is a functional diagram of an embodiment of a Low Voltage Drive Circuit (LVDC) 26. In general, the LVDC 26 functions to convert transmit (TX) digital data 90 into an analog transmit (TX) signal 96 and to convert an analog receive (RX) signal 98 into receive (RX) digital data 88. The LVDC 26 receives the transmit digital data 90 from its host device and transmits the analog TX signal 96 to another LVDC coupled to the line of the bus 80. The analog transmit signal 96 includes a DC component 92 and an oscillating component 94. The oscillating component 94 includes data encoded into one or more channels of a frequency band and has a very low magnitude (e.g., 5% to 75% of the rail to rail voltage and/or current powering the LVDC and/or the host device). This allows for low power high data rate communications in comparison to conventional low voltage signaling protocols.

As an example, the transmit digital data is encoded into one channel, as such the oscillating component includes one frequency: the one corresponding to the channel. As another example, the transmit digital data is divided into x number of data streams. The LVDC encodes the x number of data streams on to x number of channels. Thus, the oscillating component 94 includes x number of frequencies corresponding to the x number of channels.

The LVDC 26 receives the analog receive signal 98 from another LVDC (e.g., one that sent its analog TX signal to and/or another LVDC coupled to the line of the bus 80). The analog receive signal 98 includes a DC component 100 and a receive oscillating component 102. The receive oscillating component 102 includes data encoded into one or more channels of a frequency band by the other LVDC and has a very low magnitude. The LVDC converts the analog receive signal 98 into the receive digital data 88, which it provides to its host device.

FIG. 11 is a schematic block diagram of an embodiment of a Low Voltage Drive Circuit (LVDC) 26 coupled to a host device 104 and to one or more lines of a bus 80. The host device 104 includes a processing module 114 and memory 112 (e.g., volatile memory and/or non-volatile memory). The memory 112 stores at least part of an LVDC driver 116 application. The LVDC 26 includes a drive sense circuit 106, a receive analog to digital output circuit 108, a digital to analog input circuit 110, and a clocking module 125.

In an example of operation, the processing module 114 of the host device 104 accesses the LVDC driver 116 to set up the LVDC 26 for operation. For example, the LVDC driver 116 includes operational instructions and parameters that enable the host device 104 to use effectively the LVDC for data communications. For example, the parameters include two or more of: one or more communication scheme parameters; one or more data conveyance scheme parameters, one or more receive parameters, and one or more transmit parameters. A communication scheme parameter includes one of: independent communication (e.g., push data to other device without prompting from other device); dependent communication (e.g., push or pull data to or from other device with coordination between the devices); one to one communication; one to many communication; many to one communication; many to many communication; half duplex communication; and full duplex communication.

A data conveyance scheme parameter includes one of: a data rate per line; a transmit frequency per line; a number of bits per data rate interval; data coding scheme per line and per number of bits per data rate interval; direct data communication; modulated data communication; power level of signaling per line of the bus; voltage/current level for a data coding scheme per line (e.g., function of signal to noise ratio, power level, and data rate); number of lines in the bus; and a number of lines of the bus to use.

A receive parameter includes one of: a digital data format for the received digital data; a packet format for the received digital data; analog to digital conversion scheme in accordance with parameter(s) of the communication scheme and of the data conveyance scheme of transmitted data by other LVDCs; and digital filtering parameters (e.g., bandwidth, slew rate, center frequency, digital filter coefficients, number of taps of digital filtering, stages of digital filtering, etc.).

A transmit parameter includes one of: a digital data format for the transmit digital data; a packet format for the transmit digital data; and digital to analog conversion in accordance with parameter(s) of the communication scheme and of the data conveyance scheme.

Once the LVDC 26 is set up for a particular data communication, the digital to analog input circuit 110 receives the transmit digital data 90 from its host device 104 in one of the formats of FIG. 9, or another format, and at a data rate of the host device (e.g., 100 Mbps, 1 Gbps, 60 Gbps, etc.) If necessary, the digital to analog input circuit 110 converts the format of the transmit digital data 90 in accordance with one or more transmit parameters 132. In addition, the clocking module 125 provides transmit (TX) clock signals 117 to the digital to analog input circuit 110 for synchronizing the transmit digital data 90 with a bus data rate (e.g., the data rate at which data is transmitted via a line of the bus 80) to produce a digital input of n-bits per interval of the bus data rate, where "n" is an integer greater than or equal to one.

The digital to analog input circuit 110 converts the digital input into analog outbound data 134 via a range or output limited digital to analog converter (DAC) and a DC reference source, which are discussed in greater detail with reference to FIGS. 21-25. The drive sense circuit 106 converts the analog outbound data 134 into the analog transmit signal 96 and drives it on to a line of the bus 80.

The drive sense circuit 106 also operates to receive an analog receive (RX) signal 98 from the bus 80 and convert it into analog inbound data 124. The analog to digital output circuit 108 synchronizes conversion of the analog inbound data 124 at the bus rate into received digital data 88 at a data rate of the host device 104 based on receive (RX) clock signals 115. The analog to digital output circuit 108 may also filter the analog inbound data 124 in accordance with one or more receive parameters 126 to produce the received digital data 88. The analog to digital output circuit 108 is further operable to generate digital data based on the analog inbound data, and format and packetize the digital data in accordance with one or more receive parameters 126 to produce the received digital data 88. The analog to digital output circuit 108 provides the received digital data 88 to the host device 104. The conversion of transmit digital data 90 into the analog transmit signal 96 and the conversion of the analog receive signal 98 to received digital data 88 is discussed in further detail with reference to one or more subsequent Figures.

In one example, the clocking module includes a crystal oscillator for generating one or more of the RX and TX clock signals. Due to the low power of the LVDC, the temperature (e.g., heat from power dissipation) to which the crystal oscillator generating the clock signal(s) for the LVDC is exposed to is decreased, (e.g., remains substantially constant). Maintaining the temperature the crystal oscillator is exposed to increases the accuracy of the resonation of the crystal, which allows the clock signal to more accurately (e.g., within 0.001%) maintain a particular frequency.

FIG. 12A is a schematic block diagram of an embodiment of a drive sense circuit 106 of a Low Voltage Drive Circuit (LVDC) 26 coupled to one or more lines of a bus 80. The line(s) of the bus are coupled to one or more other LVDCs. The drive sense circuit 106 includes a change detection circuit 120, a regulation circuit 122, and a power source circuit 128.

The change detection circuit 120, the regulation circuit 122, and the power source circuit 128 operate in concert to keep the inputs of the change detection circuit 120 to track one another (e.g., substantially match (e.g., voltage to substantially match (e.g., +/−0.001% or finer), current to substantially match (e.g., +/−0.1%), impedance to substantially match (e.g., 99.9999%), etc.)). The inputs to the change detection circuit 120 include the analog outbound data 134 and the signals on the line(s) of the bus 80 (e.g., an analog RX signal 98, an analog TX signal 96, etc.).

In an example, when there is no analog RX signal(s) 98, the only signal(s) on the bus is the analog transmit signal(s) 96. An analog transmit signal is created by adjusting the operation of the change detection circuit 120, the regulation circuit 122, and the power source circuit 128 to match the analog outbound data 134. Since the analog transmit signal 96 tracks the analog outbound data 134 within the drive sense circuit 106, when there is no analog RX signal 98, the analog inbound data 124 is a DC value.

When an analog RX signal 98 is being received, the change detection circuit 120, the regulation circuit 122, and the power source circuit 128 continue to operate in concert to keep the inputs of the change detection circuit 120 to substantially match. With the presence of the analog RX signal 98, the output of the change detection circuit 120 will vary based on the analog RX signal 98, which produces the analog inbound data 124. The regulation circuit 122 converts the analog inbound data 124 into a regulation signal 119. The power source circuit 124 adjusts the generation of its output (e.g., a regulated voltage or a regulated current) based on the regulation signal 119 to keep the inputs of the change detection circuit 120 substantially matching.

Figure 12B:
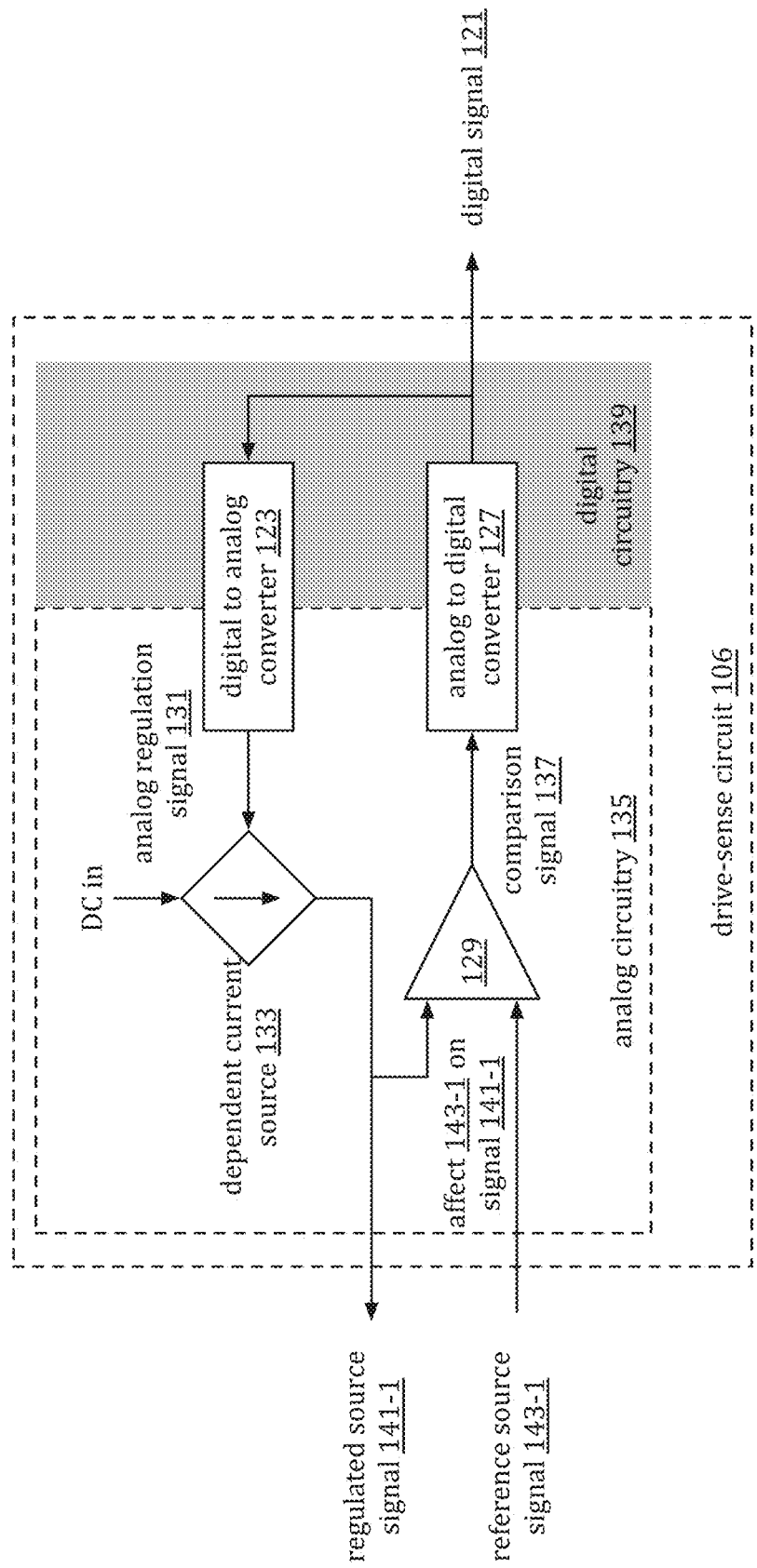
FIG. 12B is a schematic block diagram of another embodiment of a drive sense circuit in accordance with the present invention.

FIG. 12B is a schematic block diagram of another embodiment of a drive sense circuit 106 that includes analog circuitry 135 and digital circuitry 139. The analog circuitry 135 includes a dependent current source 133, a comparator 129, an analog portion of an analog to digital converter 127, and an analog portion of a digital to analog converter 123. The digital circuitry 139 includes a digital portion of the analog to digital converter 127, and a digital portion of the digital to analog converter 123. The analog to digital converter (ADC) 127 may be a flash ADC, a successive approximation ADC, a ramp-compare ADC, a Wilkinson ADC, an integrating ADC, a delta encoded ADC, and/or a sigma-delta ADC. The digital to analog converter (DAC) 123 may be a sigma-delta DAC, a pulse width modulator DAC, a binary weighted DAC, a successive approximation DAC, and/or a thermometer-coded DAC.

The dependent current source 133 generates the regulated source signal 141-1 as a regulated current signal based on the analog regulation signal 131. The comparator 129 compares the regulated source signal 141-1 with a reference source signal 143-1 to produce a comparison signal 137, where the reference source signal is a current reference signal having a DC component and/or an oscillating component. The comparator 129 provides the comparison signal 137 to the analog to digital converter 127, which generates the digital signal 121. The digital to analog converter 123 converts the digital signal into the analog regulation signal 131.

Figure 13A:
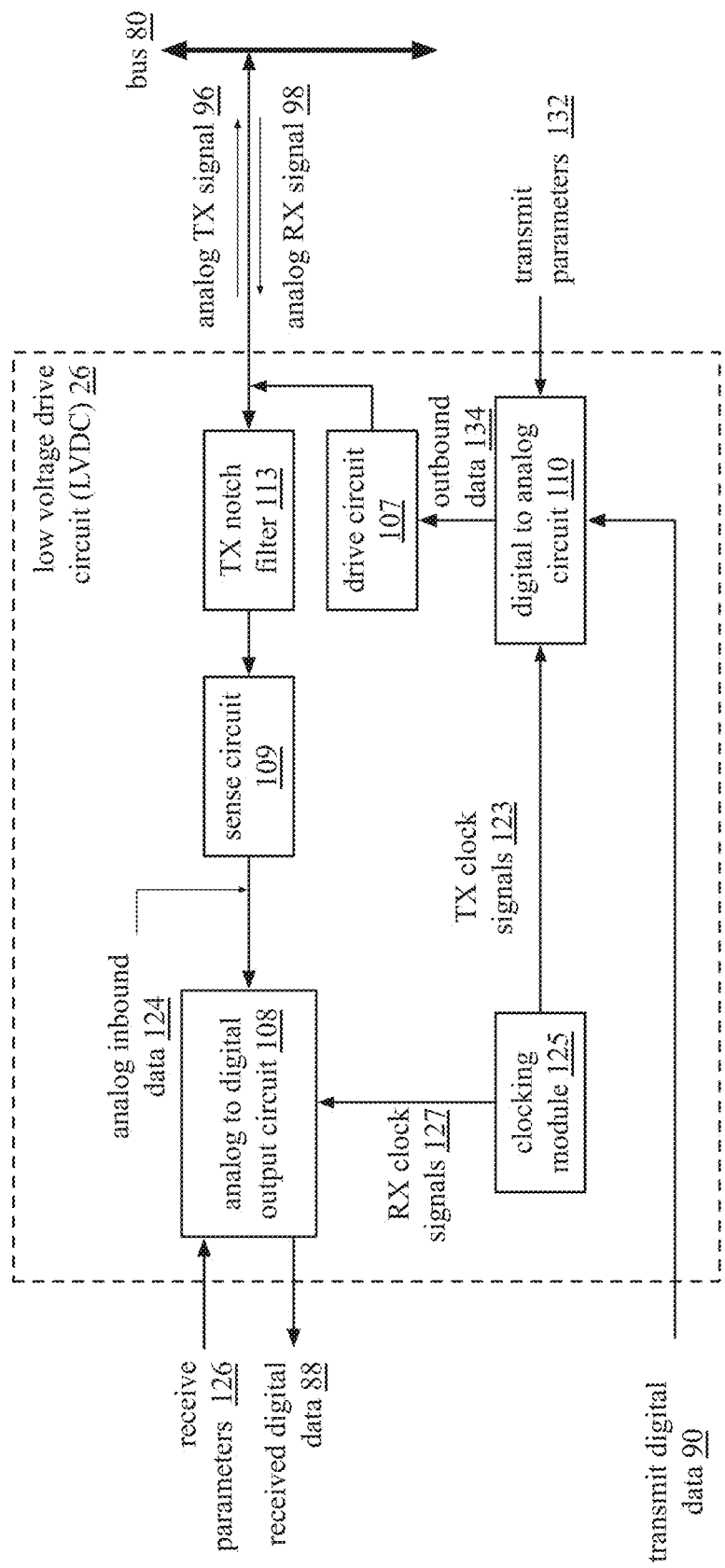
FIG. 13A is a schematic block diagram of another embodiment of a Low Voltage Drive Circuit (LVDC) in accordance with the present invention.

FIG. 13A is a schematic block diagram of another embodiment of a Low Voltage Drive Circuit (LVDC) 26 coupled to a host device 104 and to one or more lines of a bus 80. The LVDC 26 includes the digital to analog input circuit 110, a drive circuit 107, a sense circuit 109, a transmit (TX) notch filter 113, an analog to digital output circuit 108 and a clocking module 125. The analog to digital output circuit 108 the digital to analog input circuit 110 function as described herein.

The drive circuit 107 generates an analog transmit signal 96 based on the analog outbound data 134. Various embodiments of the drive circuit 107 are described with reference to FIGS. 14-15E. The sense circuit 109 is coupled to the bus 80 via the TX notch filter 113. The TX notch filter 113 substantially attenuates (e.g., operates to ensure the TX signal 96 is not injected into the sense circuit 109) the analog TX signal 96 produced by the drive circuit 107 and passes, substantially unattenuated, the analog RX signal 98 to the sense circuit 109. The sense circuit 109 generates analog inbound data 124 based on analog receive signal 98. One or more embodiments of the sense circuit 109 are described in one or more subsequent figures. Note that, if the drive circuit's transmit power is low (e.g., power level of analog TX signal is about two to ten times the power level of the analog RX signal 98), then the TX notch filter 113 may be omitted or bypassed.

Figure 13B:
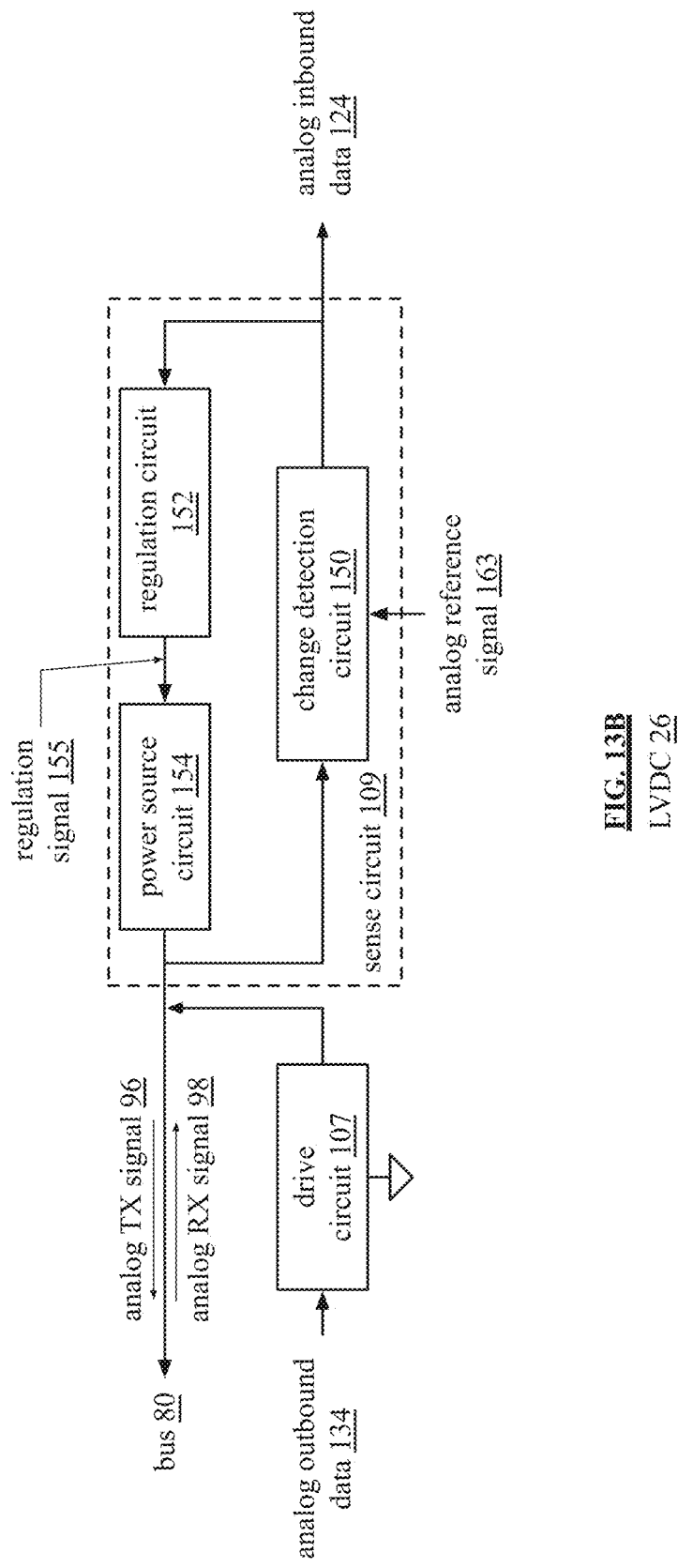
FIG. 13B is a schematic block diagram of another embodiment of a drive sense circuit in accordance with the present invention.

FIG. 13B is a schematic block diagram of another embodiment of a drive circuit 107 and a sense circuit 109 of an LVDC 26. The sense circuit 109 includes a change detection circuit 150, a regulation circuit 152, and a power source circuit 154. The change detection circuit 150, operates to keep the inputs of the change detection circuit 150 to track one another (e.g., one of a first input tracks a second input, and the second input tracks the first input). In this embodiment, the inputs to the change detection circuit 150 are one or more of the analog transmit signal 96 and the analog receive signal 98 and an analog reference signal 163. Thus, when no data is being received or transmitted, the regulation signal 155 is substantially (e.g., 99.999%) the same as the analog reference signal 163. Further, because the analog transmit signal 96 is being created outside of the feedback loop of the change detection circuit 150, the regulation circuit 152, and the power source circuit 154, the analog inbound data 124 will also include a component corresponding to the analog transmit signal 96.

The drive circuit 107 produces analog transmit (TX) signals 96 based on the analog outbound data 134 and drives the analog TX signals 96 on to the bus 80. As one example, the drive circuit 107 changes the loading on the bus in accordance with the analog outbound data 134 to produce the analog transmit signal 96. Additional embodiments of the drive circuit 107 will be discussed with reference to FIGS. 14-15E.

FIG. 14 is a schematic block diagram of an embodiment of a drive circuit 107 that includes an input circuit 141, a variable circuit 157 and an operational amplifier 158. The input circuit 141 may be implemented in a variety of ways. For example, the input circuit includes one or more of an operational amplifier (op-amp), a comparator, a level shift circuit, another drive sense circuit, a digital to analog converter, a modulator, an encoder, etc. The variable circuit 157 may be implemented via one or more electrical components having one or more variable electrical characteristics (e.g., resistance, reactance, impedance, magnitude, voltage, current, capacitance, inductance, etc.), examples of which are discussed in FIGS. 15A-E.

In one example of operation, the input circuit 141 produces a drive signal 147 at a particular frequency f based on analog outbound data 134. The variable circuit 157 varies its loading based on the drive signal 147 received from the input circuit 141. For example, the variable circuit changes an electrical characteristic in accordance with the drive signal 147 to vary the loading on the bus at the particular frequency. As a particular example, the variable circuit is a variable capacitor and varies its capacitance based on the drive signal at the frequency. With the drive signal 147 at a particular frequency, the impedance of the capacitor changes based on the drive signal. The changing impedance is driven onto the bus 80 as analog transmit (TX) signal 96. The analog TX signal 96 is received by a low voltage drive circuit (LVDC) connected to one or more lines of the bus 80 and converted into digital data. In one example, the LVDC then sends the digital data to a host device connected to the LVDC.

The drive circuit 107 may also modulate the analog outbound data 134 in accordance with one or more modulation protocols (e.g., amplitude modulation (AM), amplitude shift keying (ASK), pulse width modulation (PWM), phase shift keying (PSK), quadrature PSK (QPSK), etc.) to produce one or more modulated signals. As a specific example, the drive circuit uses one or more modulation protocols to produce a modulated signal using a single carrier frequency (e.g., f1). As another specific example, the drive circuit 107 uses one or more modulation protocols to produce two modulated signals using two carrier frequencies (e.g., f1 and f2).

FIGS. 15A-E are schematic block diagrams of examples of a variable circuit 157. While FIGS. 15A-E depict individual electrical components operating as a variable circuit 157, variable circuit 157 may include one or more, or a combination of, the electrical components of FIGS. 15A-E depending on the nature of data (e.g., word size, data rate, etc.) the data communication circuit 143 is to receive.

In FIG. 15A, the variable circuit 157 is a variable resistor receiving a drive signal at a frequency "f1." In an embodiment, the variable resistor includes one or more rheostats. The drive signal is an input to the rheostat(s) that adjusts its resistance. In another embodiment, the variable resistor includes a switching resistor network, where the switching resistor network couples, based on the drive signal 147, resistors of the resistor network in parallel and/or in series to produce desired resistance values.

In FIG. 15B, the variable circuit 157 is a variable capacitor receiving a drive signal at a frequency "f2." In an embodiment, the variable capacitor includes one or more varactors. The drive signal is an input to the varactor(s) that adjusts its capacitance. In another embodiment, the variable capacitance includes a switching capacitance network, where the switching capacitance network couples, based on the drive signal 147, capacitors of the capacitor network in parallel and/or in series to produce desired capacitance values.

In FIG. 15C, the variable circuit 157 is a variable inductor receiving a drive signal at a frequency "f3." In another embodiment, the variable capacitance includes a switching inductor network, where the switching inductor network couples, based on the drive signal 147, inductors of the inductor network in parallel and/or in series to produce desired inductance values.

In FIG. 15D, the variable circuit 157 is a transistor receiving a drive signal at a frequency "fn." In an embodiment, the transistor is a field effect transistor (FET) that varies the loading on the bus to produce the analog transmit signal 96 based on the drive signal 147 being applied to the gate-source of the FET. The drive signal 147 is within a range to keep the FET operating in the gain mode (e.g., in a linear mode prior to being fully turned on) and to avoid saturating the FET (e.g., avoid turning it fully on). In another embodiment, the variable circuit 157 includes a plurality of transistors coupled in series and/or in parallel. In the embodiment, the drive signal includes a plurality of components; one for each transistor.

With transistor(s), the input signal can contain multiple frequency components representative of the analog outbound data 134. For example, in FIG. 15E, the variable circuit 157 is a transistor receiving a drive signal that includes two frequency components: one at frequency "f1" and the other at frequency "f2." As such, for a given word of the input data, a portion of the word is represented by the first frequency f1 and another portion of the word is represented by the second frequency f2.

FIG. 16 is a schematic block diagram of an embodiment of a drive-sense circuit 106 of a low voltage drive circuit (LVDC) 26 coupled to one or more lines of a bus 80. The drive sense circuit 106 includes a sense circuit 109, a drive circuit 107, a current source 148, a transistor T1, and a current based analog to digital converter (ADC) 142. The sense circuit 109 includes an operational amplifier 144 (e.g., a unity gain amplifier). Alternatively, the sense circuit 109 includes a comparator. The transistor T1 receives bias voltage 149 on a gate of the T1 and source voltage Vdd.

In an example of operation, the drive circuit 107 converts the analog outbound data 134, which is on a channel having a first frequency (f1), into an analog outbound current signal (i5). For example, the first frequency is 3.010 GHz. The analog outbound current signal i5 affects current i3 (e.g., a load) on the bus 80 to produce analog transmit signal 96 at the first frequency. The analog transmit signal 96 is then able to be detected by another drive sense circuit of another LVDC coupled to the bus 80.

As a specific example, the drive circuit 107 includes one or more variable circuits 157 of FIGS. 15A-15E. The drive circuit changes an electrical characteristic (e.g., impedance, resistance, etc.) of the variable circuit to transmit a portion of the analog transmit signal (i3) on to the bus. For example, for a first portion (e.g., a time period indicating n-bits of data) of the analog outbound data 134 at the first frequency, the drive circuit changes the resistance of the variable circuit from 25 kΩ to 5 kΩ. With a constant voltage of 0.25 V, the current (e.g., i3) on the bus changes from 10 microamps (uA) to 50 uA at 3.010 GHz. For a second portion of the analog outbound data, the drive circuit changes the resistance of the variable circuit from 5 kΩ to 10 kΩ. With a constant voltage of 0.25 V, the current on the bus changes from 50 uA to 25 uA at 3.010 GHz. For a third portion of the analog outbound data, the drive circuit changes the resistance of the variable circuit from 10 kΩ to 3.33 kΩ. With a constant voltage of 0.25 V, the current on the bus changes from 25 uA to 75 uA at 3.010 GHz.

In this specific example, in the digital domain, each cycle (e.g. portion) represents 4-bits, where digital 0000 is represented as 25 uA, digital 0001 is represented as 30 uA, digital 0010 is represented as 35 uA, and so on up to digital 1111 is represented as 100 uA. Thus, three portions of the analog TX signal (e.g., 50 uA, 25 uA, 75 uA) to be converted by a current based ADC 142 of another LVDC 26 (e.g., into digital inbound data 145) represents digital data of 0101 0000 1010. Note the number of bits per cycle may include any number of bits (e.g., 1-n).

In another example of operation, the sense circuit 109 receives an analog receive (RX) signal 98 (e.g., variance in i3 at a second frequency (e.g., 3.080 GHz)) from the bus and converts the analog receive signal 98 into the analog inbound data 124 at the second frequency. As an example, the analog inbound data 124 is represented within the analog receive signal as variances in the loading of the bus at the second frequency (e.g., 3.080 GHz). The sense circuit 109 compares the analog receive signal to analog reference signal 146 to produce analog inbound data 124. A current based ADC 142 converts the analog inbound data into digital inbound data 145, which may be further processed (e.g., filtered, formatted, etc.) by the LVDC to produce received digital data 88, which is provided to a host device associated with the LVDC.

As another specific example, for a first portion of the analog receive signal at a second frequency, the sense circuit 109 detects a first current (e.g. i3) of 75 nanoamps (nA). For a second portion of the analog receive signal at the second frequency, the sense circuit 109 detects a second current of 100 nA. For a third portion of the analog receive signal at the second frequency, the sense circuit 109 detects a third current of 40 nA. In this specific example, the current based ADC 142 converts the first current to a digital "1010", the second current to a digital "1111", and the third current to a digital "0011".

FIG. 17 is a schematic block diagram of an embodiment of a transmit side (e.g., digital to analog input circuit 110, transmit clocking module 125-1, and drive sense circuit 106) of a Low Voltage Drive Circuit (LVDC) #1 coupled to one or more lines of a bus 80. The digital to analog input circuit 110 includes a data splitter 190, a plurality of channel buffers (i through i+y, where "i" and "y" are positive integers greater than or equal to 1), a plurality of signal generators (i through i+y), and a signal combiner. Note the drive sense circuit may be implemented by a separate drive circuit 107 and sense circuit 109 as discussed in FIGS. 13A-B, 14 and 16. With reference to FIGS. 11, 13A, one or more of the data splitter 190, the channel buffers (i through i+y), the signal generators (i through i+y), and the signal combiner 192 may be included in the digital to analog input circuit 110.

The transmit clock module 125-1 produces a transmit (TX) input clock 170 based on a host bit clock 259 and provides it to the data splitter 190 and corresponding channel buffers i-i+y to synchronize receiving the transmit digital data 90 from a host and storing it in the buffers in accordance with a host data rate (e.g., a host clock*bits per cycle of the host that sent transmit digital data 90). The data splitter operates to divide the transmit digital data 90 into a plurality of data streams 179 (e.g., DS1-DS3). The plurality of data streams 179 are written into the channel buffers i-i+y based on the transmit (TX) clock 170 received from TX clocking module 125-1. For each channel, a corresponding channel buffer stores a data stream of the plurality of data streams. For instance, channel buffer i stores data stream i, channel buffer i+1 stores data stream i+1, and so on.

Each data stream, however, is read out of the channel buffers in accordance with transmit i+y channel clock 172 to be transmitted on a separate channel (e.g., different frequency) by each of the signal generators i-i+y. Thus, while each data stream is written into the channel buffers at substantially the same data rate, each data stream is read out of each channel buffer at a unique data rate compared to other channel buffers of the digital to analog input circuit 110. In some embodiments, one or more of the signal generators may operate at substantially the same frequency as the host clock or another signal generator. For example, a host frequency is 1 GHz, and one of the signal generators operates at 1 GHz. As another example, a first signal generator operates at 1 GHz and transmits data during a first time period, and a second signal generator operates at 1 GHz and transmits data during a second time period.

The TX clock module 125-1 also generates transmit i-i+y channel clocks 172, which correspond to the frequency of the channel being used by a signal generator. The transmit clocking module 125-1 provides transmit channel clocks 172 to each channel buffer and signal generator of a communication channel. For example, the transmit clock module 125-1 provides a transmit i channel clock 172 to channel i buffer and signal generator i at a first frequency, and provides a transmit i+1 channel clock 172 to channel i+1 buffer and signal generator i+1 at a second frequency, and so on.

In an example, a block of data is inputted into the data splitter 190 in accordance with a data rate of the host device coupled to the first LVDC (e.g., LVDC #1). As a specific example, assume the data block includes 24-bits and is clocked into the data splitter serially over 24 intervals of a data clock of host 1. Further assume that the 24-bits are divided into three data streams, each 8-bits. As such, three paths will be activated between the data splitter 190 of LVDC #1 and a data combiner of another LVDC (e.g., an LVDC #2).

Each activated path operates independently of the other paths and at different rates to process their respective data streams of the data block. For example, the first path (e.g., via signal generator i) operates in accordance with frequency f1, which is at least a slightly higher frequency than that of the data rate of host 1 divided by the number of communication channels; the second path (e.g., via signal generator i+1) operates in accordance with frequency f2, which is at slightly higher frequency than that of frequency f1; and the third path (e.g., via signal generator i+2) operates in accordance with frequency f3, which is at slightly higher frequency than that of frequency f2.

Continuing with this example, further assume that the data clock of host 1 is 3.000 GHz for a 375 Mega Byte per second (MBps) data rate, which corresponds to a 3 Gbps data rate; data is provided to the data splitter a byte at a time; frequency f1 is at 1.010 GHz (e.g., slightly greater than 3.000 Gbps/3 communication channels), frequency f2 is at 1.020 GHz, and frequency f3 is at 1.030 GHz. There are a variety of ways the data splitter 190 can divide the data and put it into the channel buffers. As one example, the data splitter 190 uses a bit-by-bit round robin distribution.

As data is input into the channel buffers on the transmit side, the signal generators begin to process them. In this example, one bit at a time. Since signal generator i+y is operating at a rate that is faster than the other two signal generators, it will finish processing its 8-bits slightly before the others. As such, a corresponding bandpass filter (BPF) circuit i+y (discussed in further detail with reference to FIG. 29) will finish recovering the 8-bits of data slightly before the other BPF circuits. The timing difference is compensated for by the buffers on each end such that, as 24-bits goes into the transmitting LVDC #1 at the rate of the first host device, the same 24-bits will come out of the receiving LVDC #2 at the rate of the host device of the second LVDC.

Each enabled signal generator uses a different channel to convert bits of its respective data stream into respective portions of the analog outbound data 134. For example, signal generator i uses channel 1, which has a first frequency (f1), signal generator i+1 uses channel 2, which has a second frequency (f2), and so on. Note that, one or more of the signal generators are activated to convert the transmit digital data 90 into the analog outbound data 134. Alternatively, each enabled signal generator uses the same channel at a different time to convert bits of its respective data stream into respective portions of the analog outbound data 134.

As a specific example, signal generator i converts n-bits of its data stream at a time into an analog signal component of the analog outbound data 134, where n is an integer greater than or equal to one. For an n-bit sample of its data stream, the signal generator encodes the n-bit sample into a sinusoidal signal having a frequency at f1 using amplitude shift keying (ASK) signal and/or a phase shift keying (PSK) signal. Signal generator i+1 functions similarly by encoding an n-bit sample of its data stream into a sinusoidal signal having a frequency at f2 using ASK and/or PSK.

The signal combiner 192 combines the respective portions of analog outbound data 134 into combined analog outbound data 134-1. The drive sense circuit 106 of the first LVDC converts the analog outbound data 134 into an analog transmit (TX) signal 96, and transmits analog TX signal 96 onto a line of the bus 80.

FIG. 18 is a schematic block diagram of an embodiment of a signal generator 182 coupled to a channel buffer 180, a signal combiner circuit 192, and a drive sense circuit 106. The signal generator 182 includes a DC reference source circuit 210, a summing module 177, an output limited digital to analog converter 214, and a digital to digital converter 212. The channel buffer 180 is coupled to a data splitter 190.

The data splitter 190 divides the transmit digital data 90 into one or more data streams 179; one for each channel buffer 180. The channel buffer 180 receives a data stream 179 in a serial manner at 1 or more bits in accordance with a transmit input clock 170 (e.g., a write clock). The channel buffer 180 outputs an "n" bit serial data stream 175 to the digital to digital converter 212 of the signal generator 182 in accordance with a transmit channel clock 172 (e.g., a read clock). In this example, the "n' bit serial data stream 175 is a 1-bit data stream that is provided to the digital to digital converter 212. Various examples of the transmit input clock 170 and the transmit channel clock 172 are described with reference to one or more subsequent figures.

The digital to digital converter 212 functions to convert the "n" bit serial data stream 175 into a digital input 213. For example, the digital to digital converter 212 converts the format of the "n" bit serial data stream 175 into a different format as previously discussed with reference to FIG. 9. As another example, the digital to digital converter 212 converts "n" bits per clock interval of the transmit channel clock 172 into "m" bits per clock interval of the transmit channel clock 172. As a specific example, the digital to digital converter 212 converts 1-bit per interval into 2-bits per interval. As another example, the digital to digital converter 212 converts 2-bits per interval into 1-bit per interval. As a further example, the digital to digital converter 212 converts 1-bit per interval into 1-bit per interval (i.e., no change). An embodiment of the digital to digital converter 212 is discussed with reference to FIG. 22.

The output limited digital to analog converter (DAC) 214 converts the digital input 213 into an oscillating component 215. The oscillating component 215 has a frequency corresponding to the transmit channel clock 172. For example, if the transmit channel clock 172 is a 1.01 GHz clock, then the oscillating component 215 oscillates at a transmit frequency of 1.01 GHz. The magnitude of the oscillating component 215 is relatively small in comparison to the rail to rail voltage of the signal generator 182. For example, if the rail to rail voltage is 1 volt to 1.5 volts, the peak to peak magnitude of the oscillating component 215 is between 10 millivolts and 250 millivolts. An embodiment of the output limited DAC 214 is discussed with reference to FIG. 22.

The DC reference circuit 210 generates a DC component 211 based on a voltage on the bus 80. The DC component 211 will substantially match a DC voltage on the bus 80 to reduce current flow between LVDCs 26. For example, if one LVDC 26 were to generate a DC component of 500 millivolts and another LVDC 26 were to generate a DC component of 503 millivolts, then there would be a 3 millivolt difference between the LVDCs on the bus. If the bus's impedance is 1 milli-Ohm, then there would be 3 amps of current on the bus. The DC reference circuit 210 ensures that each LVDC uses substantially the same DC component 211 such that negligible current flows on the bus due to differences between the DC components 211. Various embodiments of the DC reference circuit 210 are discussed with reference to FIGS. 19-21.

The summing module 177 sums the oscillating component 215 with the DC component 211 to produce the analog output data 134 for this channel. The signal combiner circuit 192 combines the analog output data 134 of this channel with the analog output data 134 of the other channels to produce combined analog outbound data 134-1. The drive sense circuit 106 converts the combined analog outbound data 134-1 into the analog transmit (TX) signal 96.

FIG. 19 is a schematic block diagram of an embodiment of a direct current (DC) reference source 210 that includes a feedback circuit 220, an input reference voltage generating circuit 224 and a reference generating circuit 226. In one embodiment, the feedback circuit 220 includes a unity gain operational amplifier and a low pass filter, which is discussed further with reference to FIG. 20. In another embodiment, the input reference voltage generating circuit 224 includes a multiplexer that is controlled via a control signal, which is discussed further with reference to FIG. 20. In yet another embodiment, the input reference voltage generating circuit 224 includes a combining circuit, which is discussed further with reference to FIG. 21.

In an example of operation, the feedback circuit 220 of the DC reference source 210 is coupled to the bus 80 and is operable to generate a feedback voltage reference 221 from signaling 209 on the bus. In one example, the signaling 209 on the bus 80 is a voltage that indicates that an LVDC 26 has been added or removed to the bus and/or that an LVDC 26 has changed its DC component voltage. In one embodiment, the signaling is a particular frequency used to setup oncoming LVDCs. In another embodiment, the signaling indicates a change in current indicating a change in the LVDCs on the bus (e.g., current at frequency, total current on bus, etc.)

The input reference voltage generating circuit 224 generates an input reference voltage 225 based on the feedback voltage reference 221 and a voltage source 222. The reference generating circuit 226 produces the DC component 211 based on the input voltage reference such that DC component voltage differences between two or more LVDCs are regulated out. For example, the input reference voltage generator determines the input voltage 225 based on a difference between the feedback voltage 221 and the source voltage 222. The input reference voltage generator 224 generates an input voltage 225 based on the difference such that reference generating circuit 226 generates a regulated DC component 211 (e.g., the DC component 211 matches the DC component on the bus 80 and/or the DC component of other LVDCs coupled to the bus 80).

FIG. 20 is a schematic block diagram of another embodiment of a DC reference source 210 that includes an operational amplifier 230, a low pass filter 232, a multiplexer 234, a bandgap operational amplifier 236, two resistors R1 and R2, and an output operational amplifier 238.

In an example of operation, the operational amplifier 230 compares signaling 209 on the bus 80 to a feedback signal of its output to produce a regulated feedback signal 231. The low pass filter 232 operates to block all channel frequencies (e.g., transmit oscillating components) and to pass a DC component voltage 221 ($V_{fdbk}$). The multiplexer 234 produces a voltage $V_{in}$ 225 based on a control signal 233 that selects between the $V_{fdbk}$ 221 and a $V_{source}$ 222. For example, when the LVDC is a master LVDC, the multiplexer 234 selects $V_{source}$ 222 and when the LVDC is a follower LVDC the multiplexer 234 selects $V_{fdbk}$ 221.

The bandgap operational amplifier 236 produces a $V_{out}$ signal 237 based on $V_{in}$ 225 and a feedback of its output that has been voltage divided. The output operational amplifier 238 produces a DC component 211 based on the $V_{out}$ signal 237 and a feedback of its output, such that DC component voltage differences between two or more LVDCs are regulated out (e.g., the DC component 211 matches the DC component on the bus 80 and/or the DC component of other LVDCs coupled to the bus 80). In an example, one setting of the control signal 233 is for sourcing the DC component to the bus and a second setting of the control signal is for following the DC component from the bus. In an embodiment, a control channel is utilized to coordinate selection of master LVDC and follower LVDC between a plurality of LVDCs. In another embodiment, a first LVDC to transmit signals on the bus is, by default, the master, and subsequent LVDCs are followers.

FIG. 21 is a schematic block diagram of another embodiment of a DC reference source 210 that is similar to the DC reference source 210 of FIG. 20. However, in this example the DC reference source 210 includes a combining circuit 240 instead of a multiplexer. The combining circuit 240 operates to combine (e.g., average) a DC component voltage of the LVDC (e.g., $V_{source}$ 222) with a component voltage (e.g., $V_{fdbk}$ 221) from one or more other LVDCs such that DC component 211 regulates out voltage differences between two or more LVDCs connected to the bus 80.

FIG. 22 is a schematic block diagram of an embodiment of a signal generator 182 that includes a controller 246, a digital to digital converter 212, a range limited digital to analog converter (DAC) 214, a direct current (DC) reference source 210 and a summing circuit 177. The digital to digital converter 212 includes a frequency adjust circuit (*n), an 1-bit to n-bit adjust circuit 250, multiplexers 252 and 256, and a digital format converter 254. In one embodiment, the digital format converter 254 may be implemented based on a look up table. The output limited DAC 214 includes a plurality of gain stages (G1-Gk) and a multiplexer 258.

In an example of operation, a per channel transmit clock (e.g., transmit channel clock 172) is supplied to the output limited DAC 214 and the digital to digital converter 212. In one example, the transmit channel clock 172 is generated by a host device connected to the LVDC. As another example, the transmit channel clock 172 is generated by a clock circuit that is synchronized with a host clock of the host device. As another example, the transmit channel clock 172 is generated by a fan out buffer operably connected to the host device The digital to digital converter 212 operates to multiply the transmit channel clock 172 by "n" when the 1-bit to n-bit adjust circuit 250 is activated to synchronize the conversion of the n-bit serial data stream input 175 from 1-bit to n-bits. For example, the transmit channel clock 172 frequency is 101 MHz and "n" is 4, the digital to digital converter 212 produces a 404 MHz signal based on the transmit channel clock 172 to synchronize adjusting the n-bit serial data stream 175 read out of a buffer from 1 bit to 4 bits per cycle of the transmit channel clock 172. As another example, when the "n" number is 1, the data (e.g., n bit serial data stream 175) is read out of a buffer in accordance with the transmit channel clock 172 (e.g., 101 MHz).

The first multiplexer 252 of the digital to digital converter 212 receives a control signal from controller 246 to select either a bit of data from the buffer 180 or n-bits of data from the 1-bit to n-bit adjust 250. The second multiplexer of the digital to digital converter 212 receives a control signal from controller 246 to select either formatted data (e.g., as discussed with reference to FIG. 19) from the digital format converter 254 or data output directly from the first multiplexer 252. The second multiplexer outputs n-bit digital input 255, which is provided to the range limited DAC 214.

The range limited DAC 214 includes a plurality of gain stages (G1-Gk) that when activated, operate to produce a plurality of oscillating signals (Vp-p1-Vp-pk) based on a frequency of the TX channel clock 172. In one example, the peak to peak voltage of the gain stages range from 10 nV to 100's of nV. The range limited DAC 214 also includes a multiplexer 258 that operates to select an oscillating signal (e.g. one of Vp-p1-Vp-pk) of the plurality of oscillating signals based on the n-bit digital input 255. In one example, when "n" of the "n-bit digital input is 1, the number "k" of gain stages activated is two. A first gain stage produces a first oscillating signal that represents a logic "0", and a second gain stage produces a second oscillating signal that represents a logic "1". Thus, when the n-bit digital input 255 is a logic "0", the multiplexer 258 selects the first oscillating signal, which is output as f_TX oscillating component 248. When the n-bit digital input 255 is a logic "1", the multiplexer 258 selects the second oscillating signal, which is output as f_TX oscillating component 248.

The DC reference source 210 produces a direct current (DC) component 211. The DC component 211 and the f_TX oscillating component 248 are combined (e.g., via a summing circuit 177) to produce the analog outbound data 134. Note that additional embodiments of the signal generator 182 are discussed with reference to U.S. application Ser. No. 16/246,772.

FIG. 23 is a schematic block diagram of an embodiment of transmitting data via a plurality of communication channels that includes a transmit (TX) clocking module 125-1, a receive clocking module 125-2, a data splitter 190, a plurality of transmit buffers 182-1, a plurality of channels (e.g., each operating at a unique frequency and/or time), a plurality of receive buffers 182-2 and a data combiner 194. In some examples, a channel includes a signal generator, a signal combiner, a line of a bus, drive sense circuits, and a bandpass filter.

In an example of operation, the transmit clocking module 125-1 provides a TX input clock 170 to the data splitter and each activated TX buffer 182-1 to synchronize dividing the transmit digital data into a plurality of data streams and writing each data stream into a corresponding transmit buffer 182-1. For example, the transmit digital data 90 has a data rate of 3 Gbps sent from a host device operating at 3 GHz. The transmit digital data is divided into three data streams and written into each channel buffer in accordance with the 3 GHz transmit input clock 170. In one example, the data (e.g., 1.01 GHz signal, 1.02 GHz signal, etc.) conveyed via the bus is in accordance with a frequency pattern (e.g., orthogonal frequency-division multiplexing (OFDM)).

The transmit clock module 125-1 also provides a transmit channel clock 172 to each transmit buffer 182-1 and each channel 1-3. For example, the transmit clock module 125-1 sends a transmit i channel clock 172 with a frequency of 1.01 GHz to transmit buffer i 182-1 and channel 1, sends a transmit i+1 channel clock 172 with a frequency of 1.02 GHz to transmit buffer i+1 182-1 and channel 2, and sends a transmit i+y channel clock 172 with a frequency of 1.03 GHz to transmit buffer i+y 182-1 and channel 3. Each of the transmit channel clocks i-i+y operates to synchronize reading data from a transmit buffer and transmitting the data via the respective channel to another LVDC.

The receive clocking module 125-2 generates a plurality of receive (RX) channel clocks 181 based on RX clock inputs 179 to synchronize writing data received via the channels 1-3 into receive buffers i-i+y 182-2. For example, the RX clocking module 125-2 generates a 1.01 GHz clock and provides it to channel 1 (e.g., a bandpass filter circuit) and RX buffer i 182-2, generates a 1.02 GHz clock and provides it to channel 2 and RX buffer i+1 182-2, and generates a 1.03 GHz clock and provides it to channel 3 and RX buffer i+y 182-2.

The receive clocking module 125-2 also generates an RX output clock 183 based on a host bit clock 259-1 and in sync with RX clock inputs 179. The receive clocking module 125-2 provides the RX output clock 183 to each receive buffer i-i+y 182-2 and the data combiner 194 to synchronize reading stored data out of the buffers and combining the data with a host clock frequency. For example, when a host device is operating at 3 GHz, the RX clocking module 125-2 produces a 3 GHz clock signal and provides it to each RX buffer 182-2. The RX clocking module 125-2 is discussed in further detail in one or more subsequent figures.

FIG. 24A is a schematic block diagram of an embodiment of bit level interleaving a data frame of transmit digital data 90. In this example, a data frame includes nine bits b08, b07, b06, b05, b04, b03, b02, b01 and b00. In operation, a first bit b00 is written into transmit buffer 1, a second bit b01 is written into transmit buffer 2, and a third bit b02 is written into transmit buffer 3. This repeats for bits b03-b05 and bits b06-08. For example, after writing the first 3 bits b00-b02, a fourth bit b03 is written into transmit buffer 1, a fifth bit b04 is written into transmit buffer 2 and a sixth bit b05 is written into transmit buffer 3.

FIG. 24B is a schematic block diagram of an embodiment of recovering a data frame of transmit digital data 90. In operation, the data frame is recovered by reading in order, a first bit b00 out of a first receive buffer, reading a second bit b01 out of a second receive buffer 2, reading a third bit b02 out of a third receive buffer, reading a fourth bit b03 from the first receive buffer and so on in the order until reading a ninth bit b08 out of the third receive buffer 3. As such, the data frame is recovered with the 9 bits b00-b08 in the same order as when they were transmitted in the example of FIG. 24A.

FIG. 25A is a schematic block diagram of a transmit buffer 182 that includes an input interface 262, a plurality of output interfaces 263, bit line drivers circuit 264, processing module 265, read pointer register 267, write pointer register 268, and a row selection circuit 269.

In this example, data is written into the TX channel buffer 182 in accordance with a 3 GHz clock and written out in accordance with a channel clock (e.g., 1.01 GHz clock, 1.02 GHz clock, 1.03 GHz clock) as illustrated in FIG. 25B. The processing module 265 instructs the read pointer register 267 and the write point register 268 to read/write the data from/in the buffer based on read/write information (e.g., from a host device). The read/write information indicates how data (a, b, c) is to be stored and read.

In an example of operation, the input interface 262 receives data in (a, b, c) in accordance with a 3 GHz clock signal, which is synced with a host device. At least some of the bit line drivers 264, processing module 265, the write pointer register 267 and the row selection circuit 269 function to write data a, b, c, into the buffer. Data a is read out of the buffer 182 in accordance with a 1.01 GHz clock signal by at least some of bit line drivers 264, processing module 265, and a channel 1 read pointer register 267. Data b is read out of the buffer 182 in accordance with a 1.02 GHz clock signal by at least some of bit line drivers 264, processing module 265, and a channel 2 read pointer register 267. Data c is read out of the buffer 182 in accordance with a 1.03 GHz clock signal by at least some of bit line drivers 264, processing module 265, and channel 3 read pointer register 267. Thus, in this example, data is input into the buffer at a first rate, and output from the buffer at a second, third, and fourth rate.

FIG. 25C is a schematic block diagram of another embodiment of transmit buffer 182 that includes a selector 249, an input interface 262, a plurality of output interfaces 263, a plurality of bit line drivers 264, a processing module 265, a plurality of channel read pointer registers 267, a plurality of channel write pointer registers 268, a plurality of row selection circuits 269.

The transmit buffer 182 operates in similar fashion to the embodiment of FIG. 25A; however, in this embodiment, each channel has a dedicated buffer. The selector 249 selects a corresponding buffer of the channel buffers to write data a, b, c, into and out of based on read/write data information. For example, data a is written into and read from a first buffer, data b is written into and read from a second buffer, and data c is written into and read from a third buffer.

FIG. 26A is a schematic block diagram of an embodiment of a transmit (TX) clocking module 125-1 that includes a plurality of phase locked loops (PLLs) 242 and a plurality of read sync circuits 260. In an embodiment, when utilizing 3 communication channels transmitting 1-bit per cycle, transmit channel clocks are set collectively to have a greater frequency and/or data rate than a host device. For example, the host frequency (3 GHz) is divided by the number of channels (3), which equals 1.00 GHz. Since the rate of data going into transmit buffers of the 3 channels should be greater than or equal to the host clock rate (e.g., to prevent transmit buffer overflow), a first channel is set at 1.01 GHz, a second channel is set a 1.02 GHz, and a third channel is set at 1.03 GHz. As another example, the host data rate (3 Gbps) is divided by the number of channels (3), which equals 1 Gbps. In this example, each channel sends 2-bits per cycle. Thus, a first channel is set at 500 MHz (*2-bits=1.00 Gbps data rate), a second channel is set at 510 MHz (1.02 Gbps data rate) and a third channel is set at 520 MHz (1.04 Gbps data rate). Thus the data rate (3.06 Gbps) of the communication channels is greater than the data rate (3.00 Gbps) of the host device, which prevents transmit buffer overflow.

In an example of operation, the TX clocking module 125-1 produces a plurality of clocks (e.g., a 3 GHz clock, a 1.01 GHz clock, a 1.02 GHz clock, a 1.03 GHz clock as illustrated in FIG. 26B) based on a host bit clock 259. For example, a first PLL 242 locks onto a frequency and/or phase of the host bit clock 259 to produce the transmit input clock 170, which is at substantially the same frequency as the host bit clock (e.g., 3 GHz). The PLLs 2-4 242 lock onto the frequency and/or phase of the host bit clock 259 to produce oscillation signals 2-4 each at a particular frequency (e.g., less than the host bit clock, greater than the host bit clock, substantially the same as the host bit clock) that are provided to read sync circuits 260 1-3.

Each read sync circuit 260 operates to produce a transmit channel clock 1-3 172-1 based on the oscillation signal. For example, read sync 1 circuit 260 produces a transmit channel 1 clock 172-1 at a frequency of 1.01 GHz based on the oscillation signal from PLL 2 242, read sync 2 circuit 260 produces a transmit channel 2 clock 172-1 at a frequency of 1.02 GHz based on the oscillation signal from PLL 3 242, and read sync 3 circuit 260 produces a transmit channel 3 clock 172-1 at a frequency of 1.03 GHz based on the oscillation signal from PLL 4 242. In one example, each of the transmit channel clocks produce "y" number of cycles during "x" number of cycles of a host clock ("x" and "y" are positive integers greater than or equal to one). For example, when a data frame is 24-bits and there are 3 communication channels active, "x" is set at 24, and "y" is set at 8. Once the "y" number of cycles have been completed, the transmit channel clock goes low until the "y" number of cycles have been completed. In one embodiment, two or more of the PLLs 242 may be implemented by a single PLL circuit.

FIG. 27A is a schematic block diagram of an embodiment of a read sync circuit 260 that includes a clock circuit 261, a first counter circuit 241, a second counter circuit 243, a logic circuit 245, and an AND circuit 266. The read sync 1 circuit 260 is operably coupled to a phase locked loop (PLL) 242 that produces an oscillating signal based on a host bit clock 259. Note that when PLL 2 is digital, then clock circuit 261 may be omitted.

As a specific example of operation, the read sync 1 circuit 260 receives a transmit input clock 170 (e.g., 3 GHz) and an oscillating signal from PLL 2 242 (e.g., at 1.01 GHz). The clock circuit 261 produces a clock signal 295 (e.g., 1.01 GHz clock) based on the oscillating signal. The first counter 241 utilizes clock signal 295 to count "y" number (e.g., 8) of cycles. The second counter 243 utilizes the transmit input clock 170 to count "x" number (e.g., 24) of cycles. As illustrated in FIG. 27B, the logic circuit 245 outputs 296 a high signal (e.g., logic "1") until the $1^{st}$ counter 241 counts "y" number of cycles and then outputs 296 a low signal (e.g., logic "0"). Once the $2^{nd}$ counter counts "x" number of cycles, the logic circuit 245 is reset to a logic "1". Note the "x" and "y" numbers may be set based on a comparison of a frequency of the clock signal to a frequency of the TX input clock.

FIG. 28A is a schematic block diagram of an example of a phase locked loop (PLL) 242 that includes an input scaler (1/R) 276, a phase and/or frequency detector 272, a charge up/down pump 273, a loop filter 274, a voltage controlled oscillator 275, a feedback scaler (1/P) 276, and a feedback divider (1/N) 277.

In an example of operation, the input scaler (1/R) 271 receives a reference oscillation 270 and scales the reference oscillation 270 based on a frequency control 280 (which sets coefficients R 278 and P 279) to produce a scaled reference oscillation. The phase and/or frequency detector 272 detects a phase and/or frequency difference (e.g., error) between the scaled reference oscillation signal and a feedback oscillation signal corresponding to an output oscillation signal 282 and generates an error signal (e.g., voltage, current) based on the difference. The charge up/down pump 273 provides a change signal (e.g., increase in current, decrease in current) to the loop filter 274. The loop filter 274 filters out unwanted noise and provides the changed signal to the voltage controlled oscillator (VCO) 275.

The VCO 275 generates an output oscillation 282 based on the changed signal. The output oscillation (Fout) is equal to the reference oscillation (Fin)*(NP/R), where N is a feedback divider coefficient, P is a feedback scaler coefficient, and R is an input scaler coefficient. The feedback scaler (1/P) 276 scales the output oscillation based on a frequency control P 279 and provides the scaled oscillation to the feedback divider (1/N) 277. The feedback divider (1/N) 277 generates a divided scaled oscillation to the phase and/or frequency detector 272.

FIG. 28B is a schematic block diagram of another example of a phase locked loop (PLL) 242 that is similar to the PLL of FIG. 28A with the exception that the PLL also includes a sigma-delta modulator 284. The sigma-delta modulator 284 provides the N coefficient 282 to the feedback divider 177 to fine tune the feedback loop. In one example, the sigma-delta modulator 284 includes dithering to convert Nsd[k] 281 into [N]k 282.

FIG. 29 is a schematic block diagram of a receive side (e.g., analog to digital output circuit 108, receive (RX) clocking module 125-2, and a drive sense circuit 106) of a low voltage drive circuit (LVDC) #2 connected to a second host device (e.g., host 2). The analog to digital output circuit 108 includes a plurality of bandpass filter circuits (BPF i through i+y), a plurality of channel buffers (i through i+y), and a data combiner 194. The RX clocking module 125-2 includes a receive (RX) output clocking module 125-3 and a receive (RX) input clocking module 125-4.

The RX input clocking module 125-4 operates to detect one or more frequencies of the analog inbound data 124 and convert the frequencies into one or more recovered bit clocks 323 and one or more digital receive (RX) write clock signals i-i+y 181 to synchronize writing a received respective data stream (e.g., of analog inbound data 124) into a corresponding channel buffer i-i+y.

The RX output clocking module 125-3 operates to produce RX output clock signals 183 based on an RX host bit clock 259-1 input. The analog to digital output circuit 108 utilizes the RX output clock signals 183 to synchronize reading data out of each channel buffer and combining the read data to produce received digital data in accordance with a host data rate. Note the RX clock signals 183 are all substantially the same frequency (e.g., 3 GHz) as provided to each channel buffer i-i+y and the data combiner 194.

Referring back to the example of FIG. 17, the drive sense circuit 106 of the second LVDC (e.g., LVDC #2) receives the analog transmit signal 96 from the LVDC #1 as an analog receive (RX) signal 98 and converts it into analog inbound data 124. As such, without conversion, transmission, or reception errors, the analog inbound data 124 is substantially identical to the analog outbound data 134.

Continuing the example with reference to FIG. 29, each bandpass filter (BPF) circuit includes an analog to digital converter and a bandpass filter. Each active BPF circuit receives the analog inbound data 124. In addition, each active BPF circuit is tuned for a different channel. For example, BPF circuit i is tuned for frequency 1, BPF circuit i+1 is tuned for frequency 2, and so on. For example, each BPF circuit bandpass filter the signals (e.g., receive signals 98), where the bandpass filtering substantially attenuates signals having frequency components outside of a bandpass region centered at a particular frequency and to pass, substantially unattenuated, the analog inbound data (e.g., for the particular frequency) to produce filtered inbound data. The bandpass filters then convert the filtered inbound data into received digital data.

As an example, BPF circuit i converts the analog inbound data into digital inbound data, filters it, and outputs the n-bit digital values (e.g., SDS1) corresponding to the data stream processed by signal generator i. Similarly, BPF circuit i+1 converts the analog inbound data into digital inbound data, filters it, and outputs the n-bit digital values (e.g., SDS2) corresponding to the data stream processed by signal generator i+1; and so on. The channel buffers of the receive side of LVDC #2 store the n-bit digital values outputted by their respective BPF circuits. The data combiner 194 retrieves data streams (e.g., DS1, DS2, DS3) from the channel buffers, combines the data streams to produce received digital data 88, and periodically outputs the received digital data 88 to a host (e.g., a second host operably connected to LVDC #2) operable connected to the analog to digital output circuit 108. The BPF circuit is discussed in further detail with reference to FIG. 31.

In one example, the first host (e.g., host 1 of FIG. 17) is operably connected to LVDC #1, and the second host (e.g., host 2) is operably connected to LVDC #2. Host 1 and host 2 both have their own clock signal of 3.000 GHz. Over time, clock drift or other imperfections within the system (e.g., jitter, clock skew, cross talk, electromagnetic interference, supply noise, etc.) may cause the host clocks to be out of synchronization, which can cause data corruption. For example, at time 1, host 1 clock signal is 3.000 GHz and host 2 clock signal is 3.000 GHz, and at time 2, host 1 clock signal is 3.001 GHz and host 2 clock signal is 2.998 GHz. The RX clocking module 125-2 operates in concert with the analog to digital output circuit 108 to synchronize reception of the data via the bus such that the received data accurately represents the transmitted data.

In an alternative embodiment, a reference signal (e.g., 100 MHz) is sent via one or more lines of the bus to utilize as a clock signal to coordinate recovering respective recovered bit clocks and/or received channel clocks. For example, the analog to digital output circuit 108 generates the receive write channel clocks i-i+y 181 and/or the recovered bit clocks i-i+y 323 based on the reference signal. As a specific example, the analog to digital output circuit 108 multiples (e.g., by 10.1) the 100 MHz reference signal to produce a receive write channel clock 181 at 1.01 GHz.

FIG. 30A is a schematic block diagram of another embodiment of a receive (RX) clocking module 125-2 that includes a receive (RX) output clocking module 125-3, a clock sync circuit 247 and a plurality of RX input clocking modules 125-4-$i$ through 125-4-$i$+2. The RX output clocking module 125-3 includes a phase locked loop (PLL) 242.

The clock sync circuit 247 operates to synchronize (e.g., aligning triggering edges) the RX output clock with the RX input signals in accordance with a synchronization protocol. The synchronization protocol may be one of Global Positioning System (GPS), Network Time Protocol (NTP), Precision Time Protocol (PTP), Reference Broadcast Synchronization (RBS), Data-Plane Tim-synchronization Protocol (DPTP), Clock-sampling mutual network synchronization (CS-MNS) and other synchronization protocols.

In operation, the phase locked loop 242 of the RX output clocking module 125-3 operates to produce a reference clock based on a frequency of an RX host bit clock 259-1. The clock sync circuit operates to produce an RX output clock 183 based on the reference clock and an RX clock i input. For example, the clock sync circuit operates to sync a triggering edge of the RX clock i input with a triggering edge of the reference clock to produce the RX output clock synced with the RX clock inputs 179.

The activated RX input clocking module 125-4-$i$ through 125-4-$i$+$y$ produce recovered bit clocks i-i+2 and RX channel clocks 1-3 183 based on corresponding RX clock i-i+2 inputs 179. The RX input clock module 125-4 is discussed in further detail with reference to FIGS. 32A-B.

FIG. 30B illustrates the clock signals output by the RX clocking module 125-2. In this example, the RX output clock has a frequency of 3 GHz and is synced respectively with each RX channel clock 181. The RX channel 1 clock 181 has a frequency of 1.01 GHz, the RX channel 2 clock 181 has a frequency of 1.02 GHz, and the RX channel 3 clock 181 has a frequency of 1.03 GHz.

FIG. 31A is a schematic block diagram of an embodiment of a bandpass filter (BPF) circuit 286 that includes an analog band pass filter 290 and an n-bit analog to digital (ADC) converter 291. In operation, the analog BPF 290 operates (e.g., is tuned) to pass analog signals of a particular frequency or range of frequencies. For example, the analog BPF 290 is tuned to pass analog signals having a frequency between 995 MHz and 1.05 GHz. As another example, the analog BPF 290 is tuned to pass analog signals having a frequency below 999 MHz. As yet another example, the analog BPF 290 is tuned to pass analog signals oscillating at a frequency of 1.02 GHz.

The analog BPF 290 outputs an oscillating signal. In one embodiment, the oscillating signal is utilized as a receive clock input 179 as discussed with reference to FIGS. 29-30B. The n-bit ADC 291 utilizes the recovered bit clock 323 to convert a cycle of the oscillating signal into a received n-bit serial data stream 316. For example, when the communication channel is utilizing ASK, an oscillation with a first amplitude is converted to a logic "0", and an oscillation with a second amplitude (e.g., greater than the first, less than the first) is converted to a logic "1". In an alternate embodiment, the received n-bit serial data stream 316 is utilized as a receive clock input 179 as discussed with reference to FIGS. 29-30B.

FIG. 32A is a schematic block diagram of a receive (RX) input clocking module 125-4 that includes a data detection circuit 320, a multiplexer 322, a phase and/or frequency detector 272, a charge up/down pump 273, a loop filter 274, a voltage controlled oscillator (VCO) 275, a clock circuit 261, and a write synchronization circuit 300. The data detection circuit 320 is discussed in further detail with reference to FIG. 32B.

In an example of operation, the data detection circuit 320 either initially gets the loop of the RX input clocking module 125-4 started by detecting a data signal (e.g., a receive (RX) clock input 179) and producing a data detection signal 324 or by receiving a command to generate a reference oscillation (e.g., from a host device). The data detection signal 324 operates as a control signal to the multiplexer 322 to select input from data detection circuit 320.

The multiplexer outputs a reference clock signal (a representation of RX clock input 179) to the phase and/or frequency detector 272. The phase and/or frequency detector 272, the charge up/down pump 273, the loop filter 274 and the voltage controlled oscillator (VCO) 275 function as described in FIGS. 28A-B to produce a reference oscillating signal. The reference oscillation is fed back to the multiplexer 322 and the phase and/or frequency detector 272.

The clock circuit 261 operates to produce a recovered bit clock 323 based on the reference oscillation. For example, the clock circuit produces a square wave (e.g., recovered bit clock 323) with a frequency of 1.01 GHz from a reference oscillation that oscillates 1.01 GHz. The data detection circuit also sends the data detection signal 324 to the write sync circuit 300. The write sync circuit 300 produces an RX write clock 181 based on the recovered bit clock 323 and the data detection signal 324. The write sync circuit 300 is discussed in further detail with reference to FIGS. 33A-B.

Note that after the loop of the clock recovery circuit is started and there is no data detected by the data detection circuit 320, the data detection signal 324 goes low, which enables the feedback path from VCO 275 to the multiplexer 322, which maintains the oscillation (e.g., the reference oscillation) at the channel frequency. Thus, in one embodiment, the reference oscillation and the recovered bit clock 323 continues running even when the communication channel is void of data. Further note that each channel in a communication system (e.g., two or more LVDCs) may include a dedicated RX input clocking module 125-4.

FIG. 32B is a schematic block diagram of an embodiment of a data detection circuit 320 that includes capacitors C1 and C2, a rectifier circuit 274, an amplifier 313, a comparator 315. The amplifier 313 and the comparator 315 are operably coupled to the multiplexer 322 of FIG. 32A. In an example of operation, the capacitor C1 operates to remove a direct current (DC) component of an analog RX clock input 179 to produce an oscillating component. The amplifier 313 operates to increase a power and/or amplitude of the oscillating component, which is output to multiplexer 322 of FIG. 32A.

The rectifier circuit 274 rectifies the RX clock input and provides the rectified signal to comparator 315. Capacitor C2 is charged a small amount (e.g., 50 nV). The comparator 315 compares an analog reference signal 326 (e.g., 0.1 V) to the rectified signal to detect (e.g., based on the comparison) whether a receive clock input is currently being received, which indicates presence of data on a line of a bus connected to an LVDC operably connected to the RX input clocking module 125-4. The data detection circuit outputs a data detection signal 324 to multiplexer 322 and write sync circuit 300.

FIG. 33A is a schematic block diagram of an embodiment of a write sync circuit 300 that includes an AND circuit 266-1. The write sync circuit 300 operates to produce a receive (RX) write clock 181 based on a data detection signal 324 and a recovered bit clock 323. In operation, the AND circuit 266-1 operates to output an RX i+y channel clock 181 when the data detection signal 324 is present (e.g., high, logic "1", oscillating, etc.) as illustrated in FIG. 33B.

FIG. 34A is a schematic block diagram of an embodiment of a receive (RX) buffer 182 that includes an input interface 262, an output interface 263, bit line drivers 264, a processing module 265, a read point register 267, a write pointer register 268, and a row selection circuit 269. In operation, data for this channel is written into the buffer at a first rate (e.g., 1.01 GHz) and read from the buffer at a second rate (e.g., 3 GHz (e.g., in sync with a host clock)) as illustrated in FIG. 34B.

FIG. 35 is a flowchart illustrating an example of a method of programming receive and transmit channels. The method begins at step 350, where a low voltage drive circuit (LVDC) determines a type of digital to analog conversion (DAC) for data conveyance for a data communication. The type of DAC includes one or more of phase shifting, amplitude shifting and frequency shifting. The method continues with step 352, where the LVDC determines synchronization requirements based on the type of digital to analog conversion.

The method continues with step 354, where the LVDC determines a number of channels allocated for data transmission of the data communication. The method continues with step 356, where the LVDC generates a set of transmit clock signals for the data transmission in accordance with the synchronization requirements and the channel allocated for data transmission.

For example, the LVDC generates a transmit host clock signal for syncing transmit digital data from the host device to a digital to digital converter of the LVDC. As another example, the LVDC generates a set of transmit clock signals for syncing a set of analog outbound data to a set of transmit channels. The method continues with step 358, where the LVDC generates a set of receive clock signals for the data reception in accordance with the synchronization requirements and the channel allocated for data reception.

FIG. 36 is a flowchart illustrating an example of a method of syncing low voltage drive circuit (LVDC) clock signal with a bus clock signal. In one example, the syncing is performed when the LVDC couples to a bus. In another example, the syncing is performed when another LVDC couples to the bus. As yet another example, the syncing is performed on a periodic basis (e.g., every 30 seconds, every 10 minutes, etc.).

The method begins at step 361, where, when activated, the LVDC sets data reception for a control channel of a plurality of channels. The control channel is a dedicated one of the plurality of channels (e.g., a first of n channels on a bus), and is a sinusoidal signal having a known frequency (e.g., 3.5 GHz, 60 GHz, etc.). The method continues with step 362, where the LVDC receives a signal in the control channel.

The method continues with step 364, where the LVDC captures a cycle of the signal in the control channel when the control channel is void of a data communication. The capturing includes determining whether the control channel is void of the data communication. For example, the LVDC determines the control channel is void of the data communication by detecting an absence of phase shifting of phase of the sinusoidal signal. As another example, the LVDC determines the control channel is void of the data communication by detecting an absence of amplitude shifting of an amplitude of the sinusoidal signal.

The method continues with step 366, where the LVDC compares the cycle of the control channel with a cycle of a first receive clock signal of the LVDC. When the cycle of a first receive clock signal compares favorably to the cycle of the control channel, the method continues to step 369. When the cycle of a first receive clock signal compares unfavorably to the cycle of the control channel, the method continues with step 368, where the LVDC adjusts one or more of phase and frequency of the cycle of the first receive clock signal to substantially match phase and frequency of the cycle of the control channel to produce an adjusted first receive clock signal.

The method then continues to step 369, where the LVDC generates one or more other receive clock signals for one or more other channels of the plurality of channels based on the first receive clock signal.

In one embodiment, the capturing includes converting the sinusoidal signal into a digital signal based on the first clock signal. Having produced the digital signal, the LVDC filters (e.g., digital bandpass) the digital signal based on the first clock signal to produce a first digital filter output. The comparing includes the LVDC determining whether the first digital filter output substantially matches an expected digital filter output for a sinusoidal signal having the known frequency. The adjusting includes when the first digital filter output does not substantially match the expected digital filter output, the LVDC adjusting the one or more of phase and frequency of the cycle of the first receive clock signal to produce a partially adjusted first receive clock signal and repeating the capturing and the comparing using the partially adjusted first received clock signal. When the first digital filter output does substantially match the expected digital filter output, the LVDC producing the adjusted first receive clock signal.

FIG. 37 is a schematic block diagram of an embodiment of utilizing a control channel between two or more LVDCs. In this example, a dedicated control channel line 460 on the bus is utilized for a control channel. The control channel line 460 may be used (e.g., based on control signal 450) in a variety of ways. For example, the control channel is used to transmit a continuous clock signal. As another example, the control channel is used to send a clock signal when transmitting analog frequencies on one or more lines of the bus. As another example, the control channel is used to communicate setup parameters between two or more LVDCs for subsequent data communication.

In an alternate embodiment, the control channel does not have a dedicated line of the bus. Instead, the control channel is a specific frequency (e.g., 1.115 GHz). As one example, the control channel frequency may be agreed upon by two or more LVDCs. As another example, the control channel frequency is determined by a communication protocol. Alternatively, the control channel frequency between two or more LVDCs is programmed (e.g., set) by a particular bit-pattern (e.g., 000100010001000111101110111011110).

As may be used herein "clock signals" may be one or more of various types of clock signals (e.g., analog, digital, squarewave, triangular, sawtooth, pulsetrain, etc.). In one example, the clock signal is digital squarewave and has a duty cycle of 50%. As another example, the clock signal is an analog sinewave. As another example, the clock signal is a digital pulse train signal with a duty cycle of 20%. One or more of the various clock signals may be utilized for different implementations of syncing data transfer from a first host device to a second host device.

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A low voltage drive circuit (LVDC) operable to convey data via a bus, the LVDC comprises:
   a digital to analog circuit operable to convert transmit digital data into analog outbound data having a transmit signal component at a first frequency, wherein the transmit signal component represents at least a portion of the transmit digital data, wherein the portion of the transmit digital data has the first frequency, and wherein the magnitude of the transmit signal component is between five and seventy-five percent of the magnitude of the portion of the transmit digital data;
   a drive circuit that includes one or more variable circuits, wherein the drive circuit is operable to:
       convert the analog outbound data into an analog transmit signal, which includes a representation of the transmit signal component at the first frequency, wherein the converting includes varying one or more electrical characteristics of the one or more variable circuits based on the analog outbound data to produce the analog transmit signal; and
       drive the analog transmit signal on to the bus;
   a sense circuit operable to:
       receive an analog receive signal from the bus, wherein the analog receive signal includes a representation of a receive signal component at a second frequency; and
       convert the analog receive signal into analog inbound data, wherein the analog inbound data includes the receive signal component at the second frequency; and
   an analog to digital output circuit operable to convert the analog inbound data into receive digital data, wherein the receive signal component represents at least a portion of the receive digital data, and wherein the portion of the receive digital data has the second frequency.

2. The LVDC of claim 1, wherein the sense circuit comprises:
   an operational amplifier having a first input, a second input, and an output, wherein the first input is coupled to the bus to receive the analog receive signal, the second input is coupled to receive a reference signal, and the output produces the analog inbound data; or a comparator operable to compare the analog receive signal to the reference signal to produce the analog inbound data.

3. The LVDC of claim 1, wherein the analog to digital output circuit comprises:
an analog to digital converter operable to convert the signals on the bus into digital signals, wherein the signals on the bus include the analog receive signal and the analog transmit signal;
a digital bandpass filter operable to filter the digital signals to produce the filtered inbound data; and
a data formatting module operable to convert the filtered digital signal into the received digital data.

4. The LVDC of claim 1, wherein the drive circuit further comprises:
an input circuit operable to generate a drive signal, wherein the drive signal causes a change to the one or more electrical characteristics of the one or more variable circuits.

5. The LVDC of claim 4, wherein a variable circuit of the one or more variable circuits comprises one of:
a variable resistor;
a transistor;
a variable inductor; and
a variable capacitor.

6. The LVDC of claim 4, wherein the electrical characteristic of the one or more electrical characteristics comprises one of:
an impedance;
a resistance;
a reactance;
a capacitance;
a gate voltage;
a source voltage; and
a drain voltage.

7. The LVDC of claim 1, wherein the analog outbound data comprises:
a DC (direct current) component; and
an oscillating component that oscillates at the first frequency, wherein variances of at least one of magnitude and phase of one or more cycles of the oscillating component corresponds to one or more bits of the transmit digital data.

8. The LVDC of claim 1 further comprises:
a clock circuit operable to:
synchronize a rate of a receiving of the transmit digital data from a host device with a clock rate of the host device;
synchronize converting the transmit digital data at the clock rate to the analog outbound data at a bus clock rate;
synchronize a rate of receiving the received analog receive signal from the bus with the bus clock rate;
synchronize converting the analog receive signal into the received digital data at the bus clock rate; and
synchronize converting the received digital data at the bus clock rate into transmit digital data at a second clock rate of a second host device.

9. A method for communicating data, the method comprises:
receiving, by a first low voltage drive circuit (LVDC), transmit digital data from a first host device:
converting, by the first LVDC, the transmit digital data into analog outbound data having a transmit signal component at a first frequency, wherein the transmit signal component represents at least a portion of the transmit digital data, wherein the portion of the transmit digital data has the first frequency, and wherein the magnitude of the transmit signal component is between five and seventy-five percent of the magnitude of the portion of the transmit digital data;
converting, by the first LVDC, the analog outbound data into an analog transmit signal, which includes a representation of the transmit signal component at the first frequency, wherein the converting the analog outbound data includes varying one or more electrical characteristics of one or more variable circuits of the first LVDC based on the analog outbound data to produce the analog transmit signal;
driving, by the first LVDC, the analog transmit signal on to one or more lines of a bus;
receiving, by a second LVDC, the analog transmit signal as an analog receive signal via the one or more lines of the bus, wherein the analog receive signal includes a representation of a receive signal component at the first frequency, wherein the receive signal component corresponds the transmit signal component at the first frequency;
converting, by the second LVDC, the analog receive signal into analog inbound data, wherein the analog inbound data includes the receive signal component at the first frequency;
converting, by the second LVDC, the analog inbound data into received digital data, wherein the receive signal component represents the at least the portion of the receive digital data, and wherein the portion of the receive digital data has the second frequency; and
sending, by the second LVDC, the received digital data to a second host device.

10. The method of claim 9, wherein the converting the analog receive signal into the analog inbound data comprises:
comparing the analog receive signal to a reference signal to produce the analog inbound data.

11. The method of claim 9, wherein the converting the analog inbound data into received digital data comprises:
converting the analog receive signal into digital signals;
digitally bandpass filtering the digital signals to produce filtered inbound data; and
data formatting the filtered digital signal into the received digital data.

12. The method of claim 9, wherein the converting the analog outbound data into the analog transmit signal comprises:
generating a drive signal, wherein the drive signal causes the one or more of the electrical characteristics of the one or more variable circuits to vary.

13. The method of claim 9, wherein an electrical characteristic of the one or more electrical characteristics comprises one of:
an impedance;
a resistance;
a reactance;
a capacitance;
a gate voltage;
a source voltage; and
a drain voltage.

14. The method of claim 9, wherein the converting the transmit digital data into the analog outbound data comprises:
generating a DC (direct current) component;

generating an oscillating component that oscillates at the first frequency, wherein variances of at least one of magnitude and phase of one or more cycles of the oscillating component corresponds to one or more bits of the transmit digital data; and combining the DC component and the oscillating component to produce the analog outbound data.

15. The method of claim 9 further comprises:

receiving, by the first LVDC, the transmit digital data from the first host device in accordance with a first clock rate of the first host device;

transmitting, by the first LVDC, the analog outbound data in accordance with a bus clock rate;

receiving, by the second LVDC, the analog receive signal from the bus in accordance with the bus clock rate; and sending, by the second LVDC, the received digital data to the second host device in accordance with a second clock rate of the second host device.

16. The method of claim 9, wherein the analog outbound data is represented within the analog transmit signal as variances in loading of the bus at the first frequency.

17. The LVDC of claim 1, wherein the analog outbound data is represented within the analog transmit signal as variances in loading of the bus at the first frequency.

* * * * *